United States Patent
Nishant et al.

(10) Patent No.: US 10,963,525 B2
(45) Date of Patent: Mar. 30, 2021

(54) ARTIFICIAL INTELLIGENCE SYSTEM FOR PROVIDING RELEVANT CONTENT QUERIES ACROSS UNCONNECTED WEBSITES VIA A CONVERSATIONAL ENVIRONMENT

(71) Applicant: Avnet, Inc., Phoenix, AZ (US)

(72) Inventors: Nishant Nishant, Phoenix, AZ (US); Kevin Geoffrey Yapp, Phoenix, AZ (US)

(73) Assignee: Avnet, Inc., Phoenix, AZ (US)

( * ) Notice: Subject to any disclaimer, the term of this patent is extended or adjusted under 35 U.S.C. 154(b) by 279 days.

(21) Appl. No.: 16/028,789

(22) Filed: Jul. 6, 2018

(65) Prior Publication Data
US 2019/0012390 A1 Jan. 10, 2019

Related U.S. Application Data

(60) Provisional application No. 62/529,925, filed on Jul. 7, 2017.

(51) Int. Cl.
| | | |
|---|---|---|
| *G06F 17/00* | (2019.01) | |
| *G06F 16/9535* | (2019.01) | |
| *G06F 17/30* | (2006.01) | |
| *H04L 12/58* | (2006.01) | |
| *G06N 99/00* | (2019.01) | |
| *G06N 20/00* | (2019.01) | |
| *G06F 16/248* | (2019.01) | |
| *G06N 3/00* | (2006.01) | |
| *G06F 3/0481* | (2013.01) | |

(52) U.S. Cl.
CPC ........ *G06F 16/9535* (2019.01); *G06F 16/248* (2019.01); *G06F 17/30554* (2013.01); *G06F 17/30867* (2013.01); *G06N 3/006* (2013.01); *G06N 20/00* (2019.01); *G06N 99/005* (2013.01); *H04L 51/02* (2013.01); *G06F 3/0481* (2013.01); *H04L 51/04* (2013.01)

(58) Field of Classification Search
None
See application file for complete search history.

(56) References Cited

U.S. PATENT DOCUMENTS 9,369,410 B2 * 6/2016 Capper .................. G06N 20/00
10,219,122 B1 * 2/2019 Scanlon ................. H04L 51/20
(Continued)

*Primary Examiner* — Hasanul Mobin
(74) *Attorney, Agent, or Firm* — DLA Piper LLP (US)

(57) ABSTRACT

Systems and methods for automated conversational querying. The system includes a client device associated with a user, content sources including a website and a platform associated with the website. The platform includes a chat bot comprising a machine learning engine, an intent analysis system and a query system. The chat bot generates an interface window overlaid on the website, when the website is displayed on the client device. The chat bot generates an automated conversational dialog with the user via the interface window, and receives user input from the client device via the interface window, responsive to the automated conversational dialog. The intent system identifies an intent from the user input. The query system automatically queries at least one source among the content sources and obtains query results, based on the identified intent. The chat bot displays the query results on the interface window.

19 Claims, 31 Drawing Sheets

(56) References Cited

U.S. PATENT DOCUMENTS

| | | | |
|---|---|---|---|
| 2010/0057854 A1* | 3/2010 | Chinnam | G06Q 10/10 709/206 |
| 2014/0081626 A1* | 3/2014 | Chang | G06F 40/30 704/9 |
| 2016/0217374 A1* | 7/2016 | Volkovs | G06Q 30/0251 |
| 2017/0324868 A1* | 11/2017 | Tamblyn | H04M 3/58 |
| 2018/0089212 A1* | 3/2018 | Deutsch Peled | G06F 16/9535 |
| 2018/0232741 A1* | 8/2018 | Jadhav | G06Q 30/016 |
| 2018/0308476 A1* | 10/2018 | Hirzel | G06F 40/295 |
| 2018/0324115 A1* | 11/2018 | Aggarwal | G10L 15/22 |
| 2019/0005024 A1* | 1/2019 | Somech | H04L 51/36 |
| 2019/0095048 A1* | 3/2019 | Schmidt | G06Q 20/20 |
| 2019/0122162 A1* | 4/2019 | Abhinav | G06Q 10/063118 |
| 2019/0130475 A1* | 5/2019 | Pisut, IV | G06Q 20/202 |

* cited by examiner

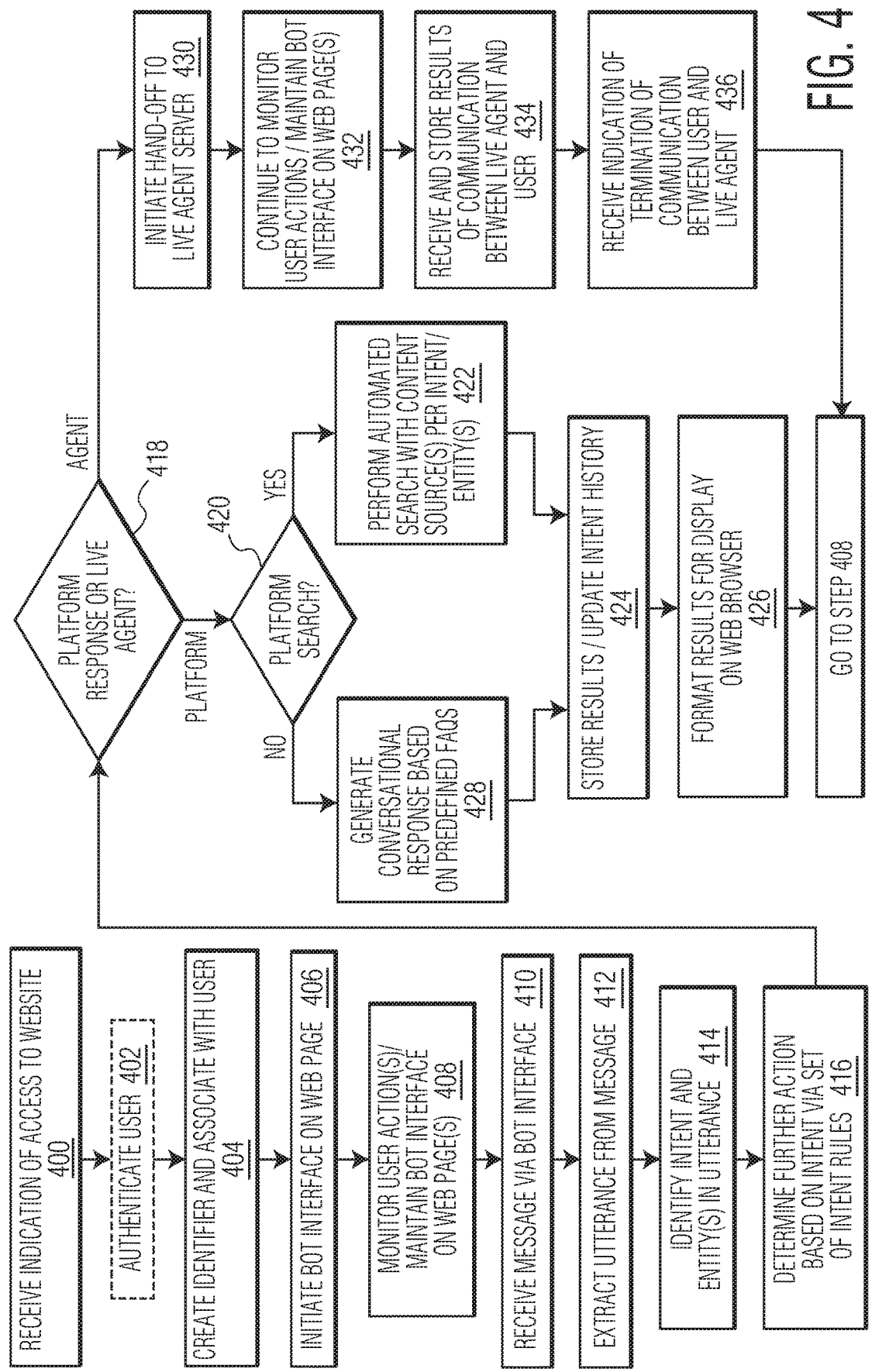

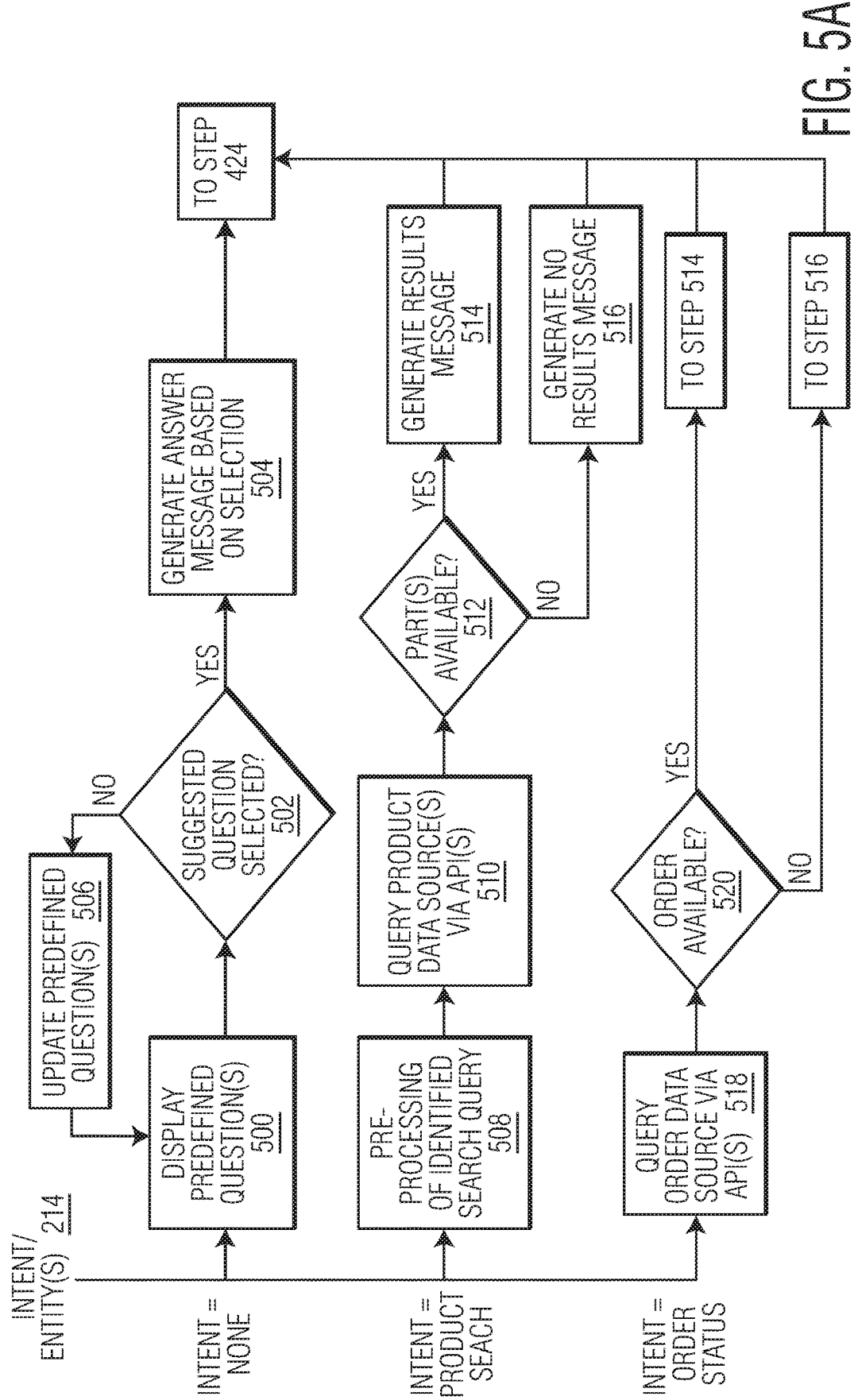

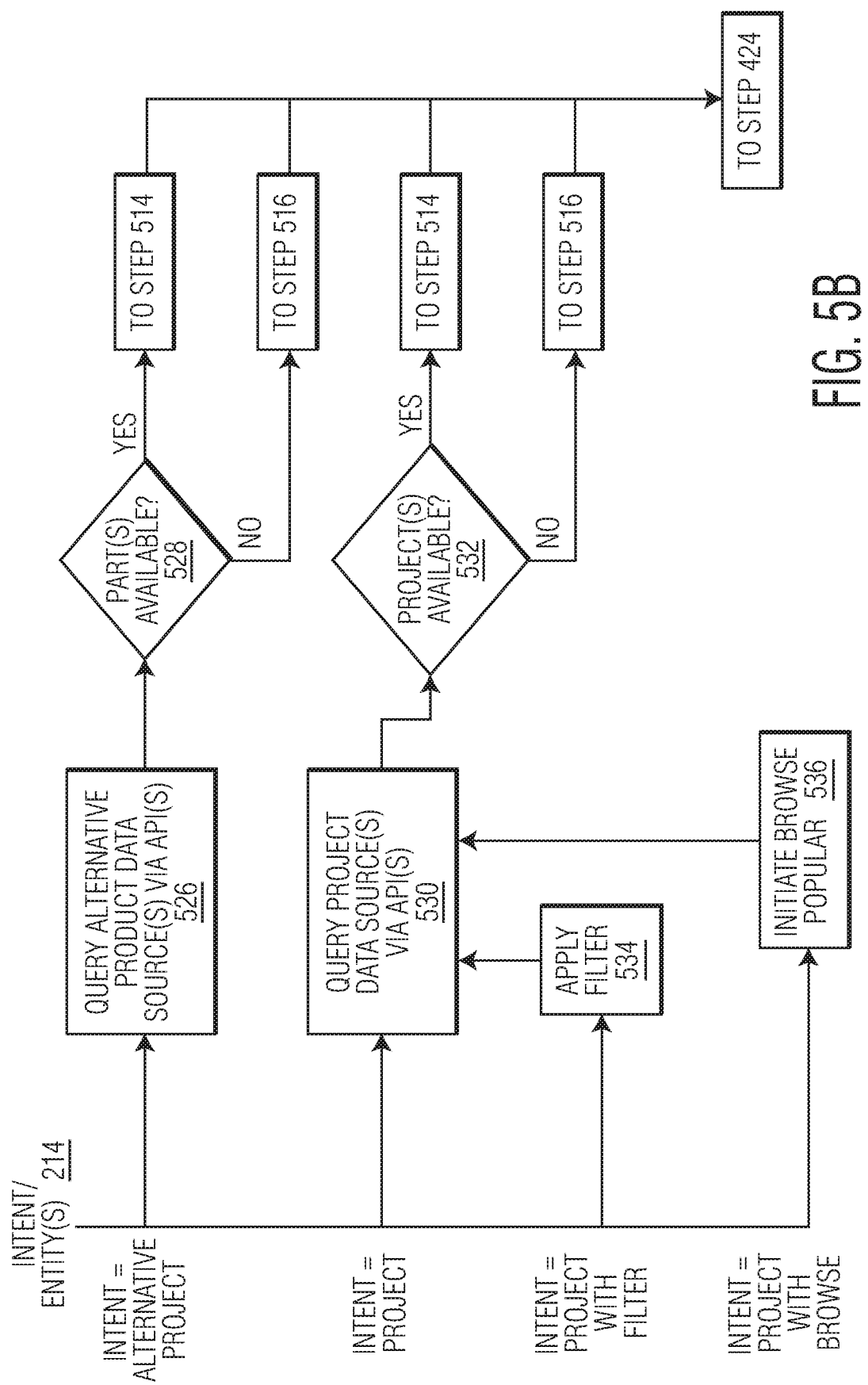

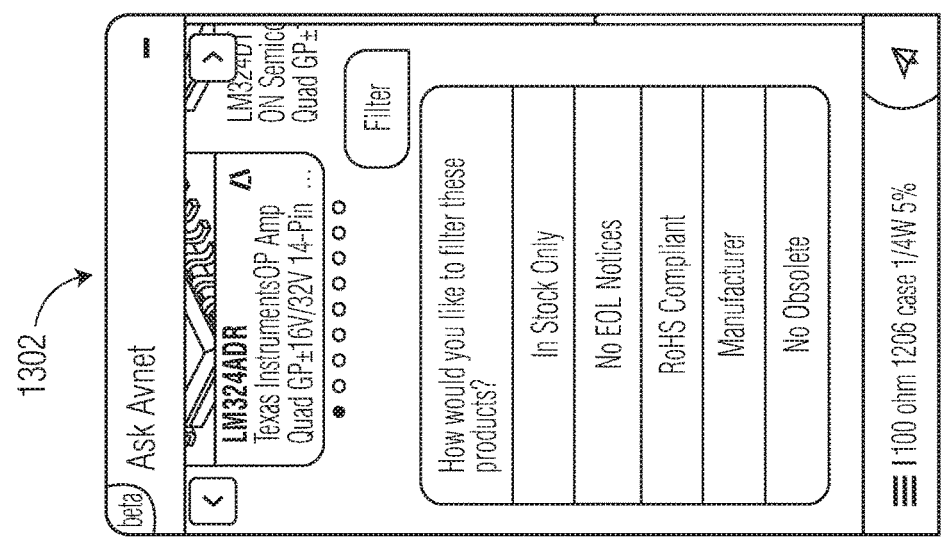
FIG. 14C
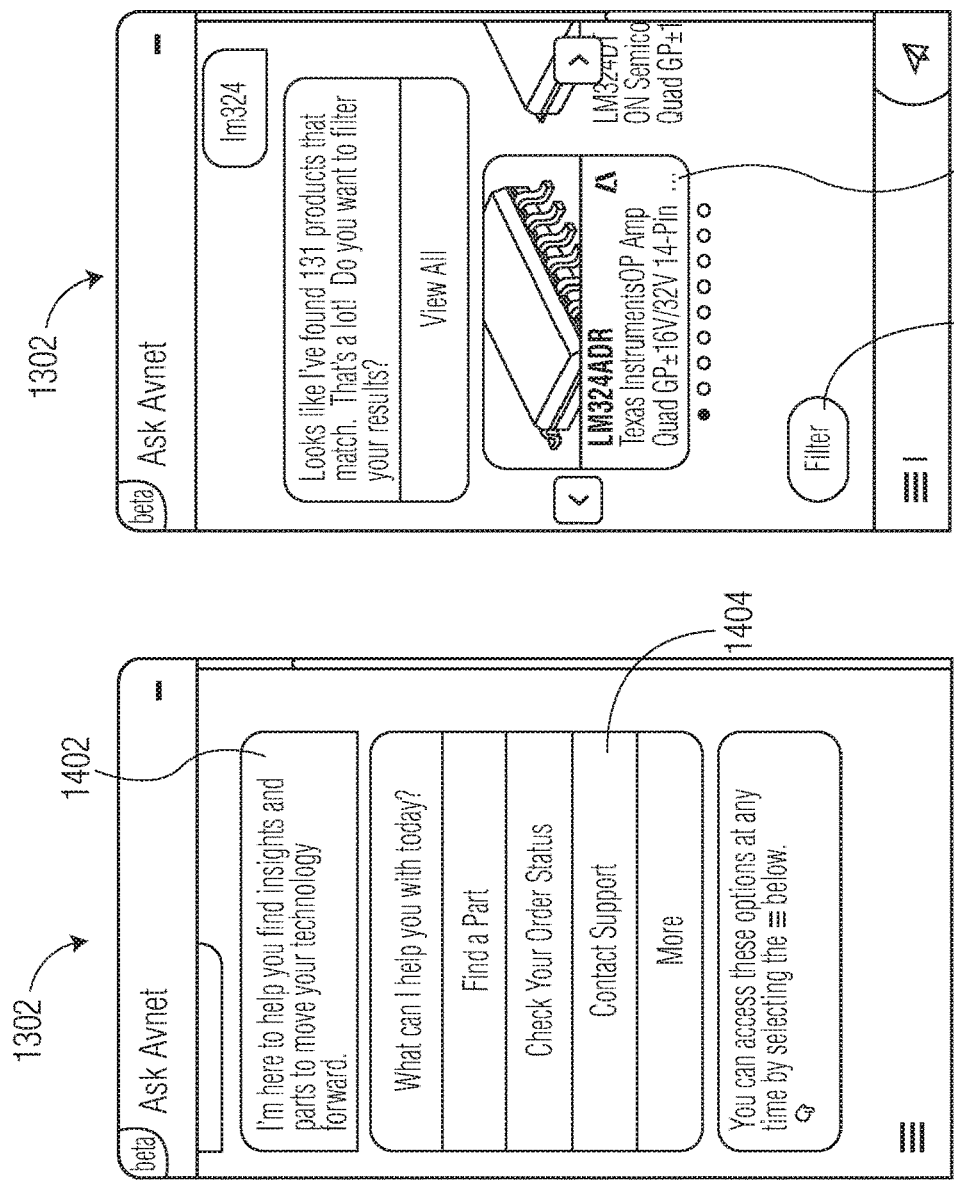
FIG. 14B
FIG. 14A

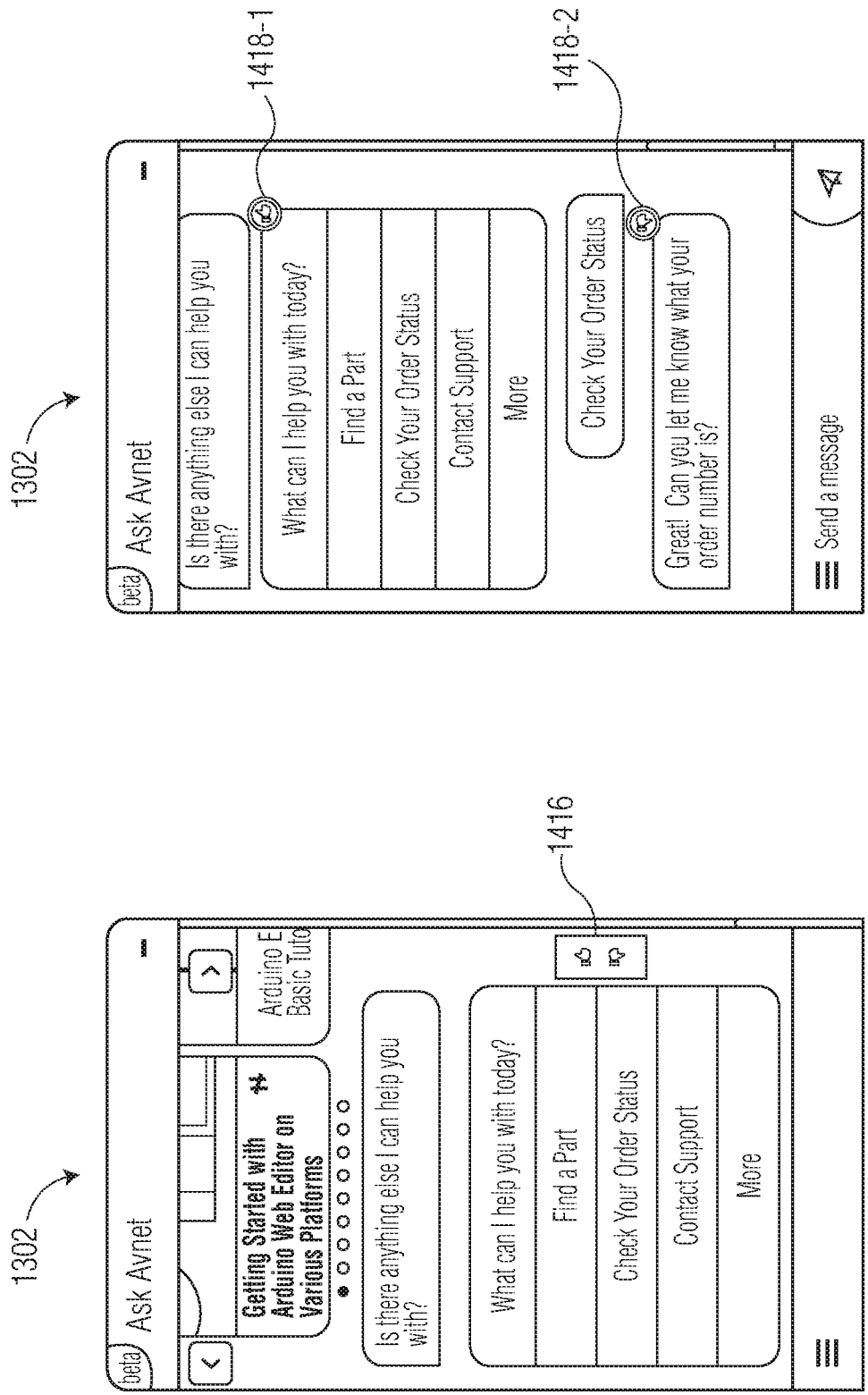

FIG. 15

ARTIFICIAL INTELLIGENCE SYSTEM FOR PROVIDING RELEVANT CONTENT QUERIES ACROSS UNCONNECTED WEBSITES VIA A CONVERSATIONAL ENVIRONMENT

TECHNICAL FIELD

The present disclosure relates generally to improving web-based data querying in network environments and, more particularly, to artificial intelligence systems and methods for providing relevant content across unconnected websites using an automated conversational environment including a single interactive chat bot interface.

BACKGROUND

The advent of the internet has allowed users to access vast repositories of data and information. However, challenges still exist with respect to identifying relevant content for a given subject matter over the internet. For example, a user may attempt to navigate various websites, which may or may not be connected to each other (e.g., independent websites), to identify relevant content. The user may ultimately find relevant content, but this process can be tedious and time consuming. And the user may miss some relevant content, if the user is unaware of particular internet content sources that may contain the information to be searched.

Search engines exist that attempt to search for information on the internet, to mine content (e.g., web pages, images, available data (e.g., data located in one or more databases, one or more directories), etc.) related to a query. However, conventional search engines typically provide a list of all possible answers, which answers may or may not be relevant to the user's search. Moreover, the resulting content that is provided is typically fragmented information from various sources. Yet further, in conventional search engines, users typically need to provide the exact keyword to be searched to identify related content. Even with an exact keyword search, identifying relevant content typically involves multiple web page turns and/or loads before a user may obtain a desired result. Thus, even with conventional search engines, problems exist with the usability of the identified content provided to a user's web browser (e.g., because the process can still be tedious and time consuming to the user), as well as the accuracy of search results.

There is a need for improving content querying in internet environments, to improve not only the accuracy of the query results, but also the usability of the query results provided to the user. There is also a need to provide intelligent interactive and conversational assistance that may automatically and proactively suggest relevant content to a user and for facilitating automated interactive discussions.

SUMMARY

Aspects of the present disclosure relate to systems and methods for automated conversational querying. The system may include a client device associated with a user, one or more content sources and a platform. The client device may include a web client and graphical user interface. At least one of the content sources may include a website. The platform may be associated with the website. The platform may be embodied on at least one computing device comprising memory and a processor executing instructions stored in the memory. The platform may be in communication with the client device, and the one or more content sources via at least one network. The platform may include a chat bot comprising a machine learning engine, an intent analysis system and a query system. The chat bot may be configured to generate an interface window, such that the interface window is overlaid on the website when the website is displayed on the graphical user interface of the client device via the web client. The chat bot may be configured to generate an automated conversational dialog with the user via the interface window, and to receive user input from the client device via the interface window, responsive to the automated conversational dialog. The intent analysis system may be configured to identify an intent from the user input received from the client device. The query system may be configured to automatically query at least one source among the one or more content sources and obtain query results, based on the identified intent. The chat bot may be configured to display the query results on the interface window.

BRIEF DESCRIPTION OF DRAWINGS

FIG. 4 is a flowchart diagram of an example method of performing automated conversational querying of intents on unconnected websites via a chat bot interface associated with the CQ platform shown in FIG. 1, according to an aspect of the present disclosure.

FIGS. 5A, 5B, 5C and 5D are flowchart diagrams of an example method of processing intents according to an example set of intent query rules associated with the CQ platform shown in FIG. 1, according to an aspect of the present disclosure.

FIGS. 13A, 13B and 13C are example screen shots of a chat bot interface, associated with the network architecture shown in FIG. 1, positioned on various unconnected websites, according to an aspect of the present disclosure.

FIGS. 14A, 14B, 14C, 14D, 14E, 14F, 14G, 14H, 14I, 14J, 14K, 14L, 14M, 14N, 14O, 14P and 14Q are example screen shots of a chat bot interface, associated with the network architecture shown in FIG. 1, for automated conversation with the client device regarding various example intents, according to an aspect of the present disclosure.

FIG. 15 is an example screen shot of a live agent console display which may be provided by a live agent server, associated with the network architecture shown in FIG. 1, for communication between the live agent and the client device, according to an aspect of the present disclosure.

DETAILED DESCRIPTION

Figure 1:
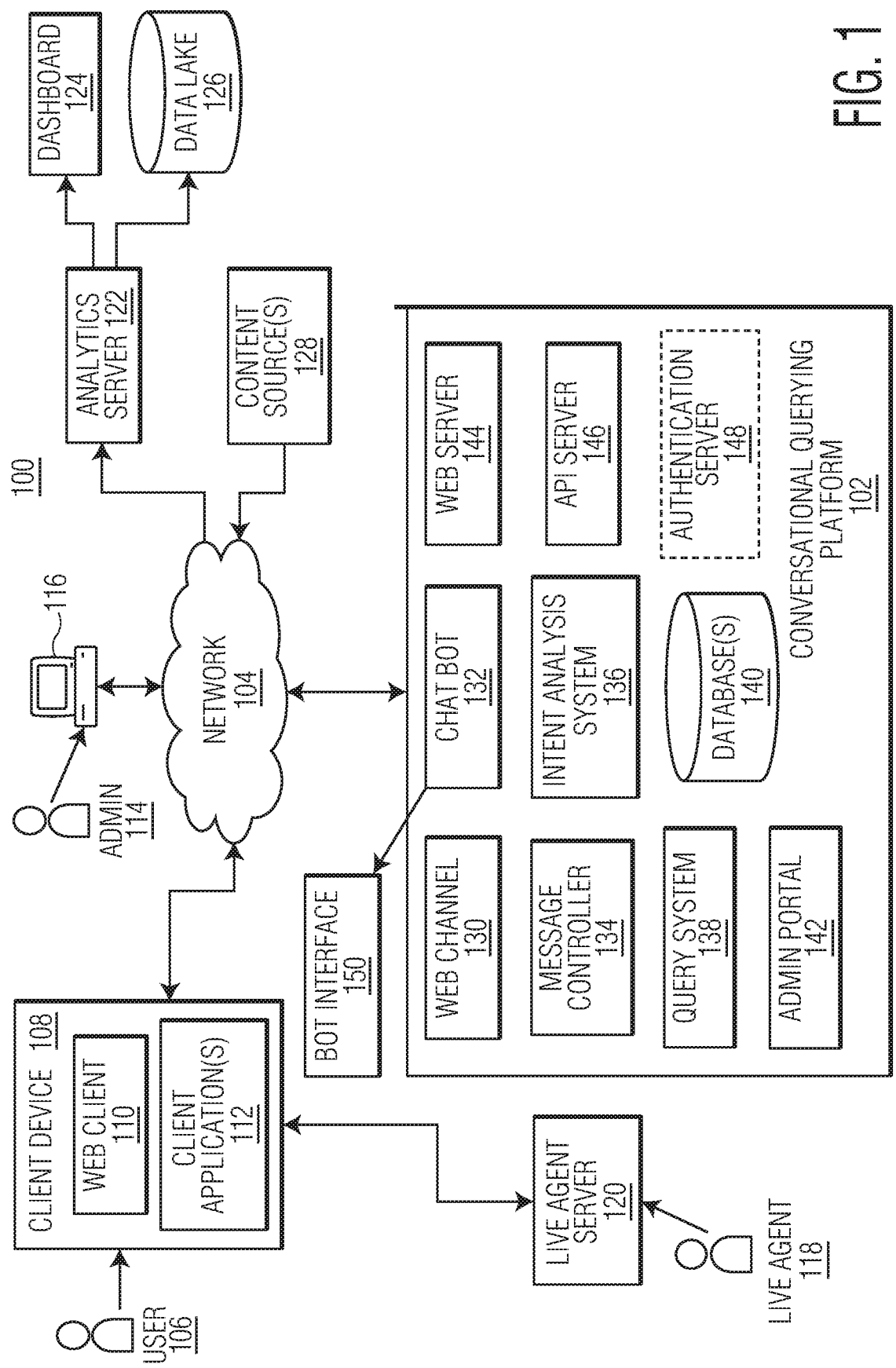
FIG. 1 is a functional block diagram of an example network architecture including an example artificial intelligence (AI)-based conversational querying (CQ) platform, according to an aspect of the present disclosure.

In a conventional internet environment, users can separately navigate various unconnected (e.g. independent) websites to identify relevant content. However, because the websites are unconnected, one website does not know what actions are occurring on another website, and the one website has no mechanism to obtain information from another website. Thus, for the user, navigating unconnected websites typically involves opening multiple websites in separate, multiple browser windows (i.e., with one browser window corresponding to one website), separately searching each unconnected website in each different browser window, and displaying relevant content for each unconnected website in separate, multiple browser windows. This process is tedious, time consuming and user un-friendly. Indeed, even after relevant content is identified, the user still has to switch between browser windows to review all of the relevant content.

The present disclosure recognized these technical problems, and developed a mechanism for linking to unconnected websites, to provide information from multiple websites on a single interactive chat bot interface. According to aspects of the present disclosure, an interactive chat bot interface may include a single interface window that is overlaid on unconnected websites (e.g., displayed on a portion of an unconnected website), and which window provides information queried from across multiple unconnected websites. The same (single) interface window may be maintained over multiple websites, as the user navigates from one to another unconnected website. Thus, the same (single) interface window may continue to be displayed over a portion of different unconnected website. Yet further, the same interface window may continue to provide relevant content to the user from across multiple websites, even when the user switches to another website. Still further, the single interface window provides additional information to the user (e.g., at all times, from multiple sources), while simultaneously displaying a website in the web browser window; thereby allowing the user to browse information on the currently displayed website while considering the additional information (in the interface window from multiple unconnected websites). Thus, contrary to a conventional internet environment, the interactive chat bot interface of the present disclosure provides results from multiple unconnected websites on a single interface window that is continually visible to the user in a separate window while simultaneously allowing the user to view and navigate across unconnected websites.

Moreover, the chat bot interface of the present disclosure may provide an interactive interface, in that the interface that generates an automated conversational dialog with the user via the interface window, through an artificial intelligence engine. Because the chat bot interface generates a conversational dialog with the user, the chat bot interface may anticipate a user's needs, thereby allowing the chat bot interface not only provide relevant content, but also to provide intelligent suggestions with respect to other related information (such as information on another website) that may also be relevant and/or helpful to the user.

Yet further, a chat bot of the present disclosure (that generates the chat bot interface) includes a very specific set of language rules that enable the chat bot to recognize a specific language and create an automated, artificial intelligence-based conversational dialog. Importantly, conventional chat bots are completely unable to recognize the language of the electronics industry and, thus, cannot provide any useful/meaningful conversation and query support for the electronics industry. In contrast, chat bots of the present disclosure, in some examples, include a set of language rules (previously unavailable) and created specifically for the electronics industry. This new set of language rules enable the chat bot to function in the specific electronics environment, provide suitable conversational dialog with the user, and obtain relevant query results in a manner that is understandable and useful to the user.

Aspects of the present disclosure generally relate to systems and methods for automated conversational querying, for providing relevant content queries across unconnected websites. An example system may include an AI-based conversational querying (CQ) platform that provides an automated conversational chat interface on a website accessed by a client device of a user. In an example, the chat interface may represent a chat bot interface window. The interface window may be configured to be overlaid on a portion of a web page of a website, and to be maintained on various websites, including unconnected websites, as a user navigates across the websites. Thus a single interface window may be provided across multiple independent websites. In some examples, the platform may be associated with one of the websites (e.g., a platform-associated website), for example, to initiate the interface window on a (first) website.

According to some aspects of the present disclosure, the CQ platform may include a chat bot comprising a machine learning engine, an intent analysis system and a query system. The chat bot may be configured to generate the interface window on the website when the website is displayed on the client device. The chat bot may be configured to generate an automated conversational dialog with the user via the interface window, and to receive user input from the client device via the interface window, responsive to the automated conversational dialog. The intent analysis system may be configured to identify an intent from the user input received from the client device. The query system may be configured to automatically query at least one source among the one or more content sources and obtain query results, based on the identified intent. The chat bot may be configured to display the query results on the interface window. In some examples, the chat bot may use a history of user intents (e.g., conversational dialog between the user and the chat bot, a history query results, user actions, etc.) to generate suitable automated conversational dialog.

In some examples, the CQ platform may be configured to determine whether to perform automated querying or to hand-off querying to a live agent (i.e., a human). The CQ platform may be configured to initiate the hand-off to the live agent and establish a communication session between the live agent and client device of the user, via the interface window managed by the CQ platform. Thus, the CQ platform may continue to monitor and store live chat information between the user and the live agent, and identify when the live chat is complete. When live chat is complete, the CQ platform may be able to seamlessly resume automated conversational dialog with the user via the chat bot, based on the chat history (e.g., both live chat and automated chat). The CQ platform may represent a proactive system capable of predicting a user's next move and providing the user with a best answer (e.g., a most relevant answer), rather than a list of all possible answers, while also facilitating interactive discussions, through both automated chat with the chat bot and live chat as needed.

As discussed above, conventional systems provide fragmented information from multiple sources, which cannot be accessed through a common user interface. In contrast, the CQ platform creates a single interface window that may be viewed across multiple websites, thereby providing information with improved usability. Moreover, unlike conventional search engines, the CQ platform of the present disclosure may provide a more conversational environment for searches, which may be viewed as a more interpersonal transaction than a search engine. Yet further, the CQ platform may ask follow up questions or provide additional options to refine the search. The CQ platform may also provide content suggestions based on one or more pages visited by a user. In this manner conversation with the chat bot may become more interactive over time.

Conventional systems may lack 24 hour/7 day per week support for user queries, which may result in lower customer engagement. Conventional systems also lack an ability to provide proactive offers for assistance when a user is stuck in a transaction; may lack easy access to frequently asked questions/answer information; and may lack an ability to provide both technical support and customer support through a single interactive system. In contrast, the CQ platform may be available 24/7 and hence there is no dependency of a customer service agent's availability.

The CQ platform may include less dependency on human knowledge compared to conventional systems. For example, in conventional systems, a response given to an end user during a customer support chat is based on the agent's knowledge, and the agent's understanding of the system and processes. However, this knowledge may vary to a large extent from one agent to another. In contrast, the CQ platform may automatically interact with multiple systems/content sources to provide an accurate result to the end user.

The CQ platform of the current disclosure may also provide a faster query response time compared to conventional systems supported by customer service representatives. For example, an agent may take longer time to respond because of many reasons, such as lack of knowledge etc., whereas the chat bot of the CQ platform can respond more quickly (e.g., through knowledge obtained through its dialog with the user and various content sources).

The CQ platform may also provide a single point of contact for multiple other content sources (e.g., systems, websites, etc.). For example, the CQ platform may interact with multiple other content sources based on a type of request. For example CQ platform may interact with a website (e.g., Avnet.com) for product requests, a community (e.g., hackster.io) for projects and another community (e.g., element14.com) for articles, and return results. Moreover, conventional systems may include one or more restrictions regarding the number of request that they can handle at a time, for example, depending upon agent availability etc. In contrast, CQ platform may be configured to handle multiple service requests at a time.

The CQ platform of the present disclosure may interact with multiple content sources to provide an accurate result to the end user. In one example, the platform may connect with an internal infrastructure (associated with CQ platform) for product related data, and may invoke one or more application program interfaces (APIs) for projects and discussions/articles related data. In an example, the external interactions may be performed via real-time Restful (Rest) API calls (e.g., using a JavaScript Object Notation (JSON) format) to send and receive data. The CQ platform may save a chat conversation (e.g., for providing the chat history of the conversation session), and the data fetched from external systems may be performed in real-time. The CQ platform may leverage an API of a live agent server application for hand off between the chat bot and a live agent, thereby providing a rich and seamless user experience. Moreover, the CQ platform may suggest additional content (e.g., projects and articles from different content sources) based on what content (e.g., a product) is reviewing on the interface window. The CQ platform also incorporates artificial intelligence to proactively identify when the user is having difficulty performing an action (e.g., finding it difficult to checkout an order due to some error) and may provide an option to have a live chat with a support representative.

In some examples, the CQ platform may provide advantages such as 24/7 (i.e., automated) answering of any product query through the chat bot, and product insights (e.g., real-time in-stock information, lead time, alternative parts) beyond basic product information. In addition, the CQ platform may provide intelligent content search insights within the conversational querying environment ecosystem (e.g., related articles and projects). Moreover, the CQ platform may anticipate a user's needs, and may connect the user to a relevant live agent or connect the user to one of multiple websites based on the user's needs. On some examples, the CQ platform may be used for transactional ecosystems, to provide a one-stop shopping experience for users regardless of their needs.

In some examples, the CQ platform may provide faster checking of order status. In conventional systems, to check the order status, the user typically signs into his account, navigates to a particular web page, select an 'Orders' tab and searches the status using an order identifier. However, these actions involve multiple page turns, clicks, and takes time. Another option is for the user to start a chat with the customer support team and provide order number. However, a live chat may take time to perform. In contrast, with the CQ platform, the user can just ask the status of the order by providing the order number to the interface window, and may not need to login. The CQ platform may, internally, fetch the relevant details and present the details to the user.

While it is generally known to query content, the CQ platform of the present disclosure overcame problems specifically tailored to unique situation for querying of electronics components. Importantly, the CQ platform was developed to address several key needs in the specific industry of electronics, including the ability to understand electronics queries, and provide round the clock support and recognize instances for providing human-based support. The CQ platform includes a specially created chat bot, in order to address queries that are unique and very specific to the particular industry of electronic components. Significantly, because of the unique language (e.g., vocabulary, slang, terminology, acronyms, symbols, etc.) of electronics, conventional chat bots simply will not work with queries in the electronics industry. Thus, the mere inclusion of a conventional chat bot to identify electronics queries will completely fail to understand such queries. This is because conventional chat bots lack any set of specific language rules for the electronics industry. In contrast, chat bots of the present disclosure have been taught the language of electronics industry, through a set of very specific electronics industry-based language rules, which rules do not exist outside of the present disclosure.

Moreover, because of the created chat bot (with the specific set of language rules) of the present disclosure, the CQ platform is able to provide an intelligent (automated) agent for round the clock (i.e., 24/7) support for anyone (e.g., expert, engineer, student, casual user, etc.) using the CQ platform. In addition, the CQ platform of the present disclosure recognizes that it may not be possible to rely on artificial intelligence alone (e.g., a chat bot) to understand all complex scenarios. Therefore, the CQ platform also creates a bot-human interface that is able to recognize instances where the chat bot may not be able to adequately answer a user's query and, in those instances, may perform a hand-off to a live agent, such that the live agent may address the user's query. Yet further, the CQ platform may be deployed in an internet environment such that a chat bot interface may seamlessly connect multiple different websites (including websites that may be specific to the electronics industry) and provide continuous conversational dialog with a user from one website to another. In this manner, the CQ platform may provide improved access to information across multiple websites, compared to being limited to one website which may not include all relevant content desired by the user for a query.

Importantly, the vocabulary of electronics parts is unique to that engineering field. The vocabulary includes slang (e.g., "cap" for capacitor), acronyms (e.g., LED for light emitting diode), symbols (e.g., $\Omega$). Yet further, the terminology used by engineers may differ from that of customers. Accordingly, understanding utterances related to electronics components remains a significant challenge.

The CQ platform solves this problem through training of the chat bot to understand the utterance, specifically related to electronics components. The training included an intent/entity (described further below) mapping, as there a "n" number of ways a user can ask a question which the chat bot needs to understand. The training included analysis of the chat transcripts and collected different questions asked by users. The analysis also include interaction with customers and internal engineers to understand the possibilities for user queries and trained the natural language processor accordingly.

The CQ platform further solves this problem by building a vocabulary specific to the domain of electronic components which distinctly mirrors the vocabulary used by engineers who are the primary customers of the CQ platform (in one embodiment). The CQ platform also uses this dictionary/vocabulary to better understand the intent and entities within user queries, to improve the accuracy of the natural language understanding for further operation. The CQ platform, in some examples, may leverage phrase lists, which may act as a dictionary of keywords. The phrase list may be used to store items such as category names, manufacturer names and topic names. The phrase list may enable the natural language processor to identify entities from the search queries more accurately.

The CQ platform also improves the efficiency of comprehension of the chat bot to understand the intent of a user query and to extract pertinent entities within them to be searched within relevant repositories of information. Importantly, the chat bot may be dependent on the natural language processor for identifying the intent of a user query and extracting entities for querying from the intent. To improve the accuracy of the natural language processor response, it was trained with a large number of utterances which covers different ways a question can be asked.

Because of the challenges that the CQ platform are able to overcome, the CQ platform may present electronic component information in a conversational environment using a conversation tree, to provide a more user friendly environment to navigate, for example, millions of electronic component products on offer in a catalog.

The CQ platform also customizes a standard bot framework to include more features and user interface (UI) elements in order to provide a rich user experience. A natural language processor connector component is customized to support the chat bot on different sites of the CQ platform (e.g., avnet.com, hackster.io and element14.com). A custom extension to the natural language processor root dialog component is created, to include logic based on the site where the chat bot is hosted. A custom regular expression pattern is introduced in the code to identify part numbers. A WebChat client html component is customized to store and retrieve a chat bot conversation identifier from a browser cookie, and allows the user to connect to the existing conversations. In some examples, a WebChat ReactJS component is customized to support overlays, emojis, interstitial windows etc.

Because of the CQ platform's customization, the CQ platform may shorten the amount of time it takes for users to access information, thereby increasing the number of projects delivered on time. The CQ platform may streamline the user experience through a combination of AI and direct interface with experts. Users may initially interact with an automated assistant (i.e., the chat bot) for fast answers to everyday questions related to a components search or product design. In cases where a specialist is best suited to support the user, the chat bot can immediately connect the user to the relevant expert. The CQ platform may provide on-demand assistance that helps navigate the electronic component distribution ecosystem.

Turning now to FIG. 1, FIG. 1 is a functional block diagram illustrating example network architecture 100 configured to provide querying of one or more content sources 128 via an automated interactive conversational environment, according to aspects of the present disclosure. Network architecture 100 may include conversational querying (CQ) platform 102, client device 108 associated with user 106, administrator console 116 associated with administrator (admin) 114, at least one live agent server 120 associated with live agent 118, analytics server 122 and one or more content sources 128. Each of CQ platform 102, client device 108, administrator console 116, live agent server 120, analytics server 122 and content source(s) 128 may comprise one or more computing devices, including a non-transitory memory storing computer-readable instructions executable by a processing device to perform the functions described herein.

Although the description herein describes network architecture 100 having one client device 108 and one administrator console 116, in some examples, network architecture 100 may include one or more client devices 108 and/or may include one or more administrator consoles 116. Moreover, although the description herein describes network architecture 100 having one live agent 118 in communication with one live agent server 120, in some examples, network architecture 100 may include one or more live agents 118 and/or one or more live agent servers 120. In some examples, live agent 118 may communicate with live agent server 120 directly. In some examples, live agent 118 may communicate with live agent server 120 via a separate computing device (not shown), such as a desktop computer, a laptop, a smartphone, tablet, a live agent console device or any other computing device known in the art that is configured to communicate with live agent server 120 and client device 108.

CQ platform 102, client device 108, administrator console 116, live agent server 120, analytics server 122 and content source(s) 128 may be communicatively coupled via at least one network 104. Network 104 may include, for example, a private network (e.g., a local area network (LAN), a wide area network (WAN), intranet, etc.) and/or a public network (e.g., the internet). In general, CQ platform 102 may provide server-side functionality via network 104 to user 106 associated with client device 108.

Client device 108 may comprise, without being limited to, a desktop computer, a laptop, a notebook computer, a smartphone, a mobile phone, a tablet, a portable digital assistant (PDA), a multi-processor system, a microprocessor-based or programmable consumer electronic device, or any other communication device that user 106 may utilize to interact with CQ platform 102, content source(s) 128 and live agent server 120. User 106 may interact with client device 108, for example, via a graphical user interface (not shown) displayed on any type of display device including, without being limited to a computer monitor, a smart-phone or mobile phone screen, tablet, a laptop screen, a consumer device screen or any other device providing information to user 106. In general, client device 108 may include any suitable user interface, user input component(s), output component(s), and communication component(s) for interaction with CQ platform 102, live agent server 120 and websites having one or more web pages (including, in some examples, websites among content source(s) 128).

Client device 108 may include web client 110 (e.g., a browser, such as the Internet Explorer® browser developed by Microsoft® Corporation of Redmond, Wash.) and one or more client applications 112. Client applications 112 may include a web browser, a messaging application, electronic mail (email) application, and the like.

While the client-server-based network architecture 100 shown in FIG. 1 employs a client-server architecture, the present disclosure is of course not limited to such an architecture, and could equally well find application in a distributed, peer-to-peer, architecture system, or any other networked environment. Further, in some examples, the network architecture 100 may be deployed using a virtual private cloud including, for example, frontend sever(s), backend server(s), and database server(s) in the cloud.

Figure 16A:
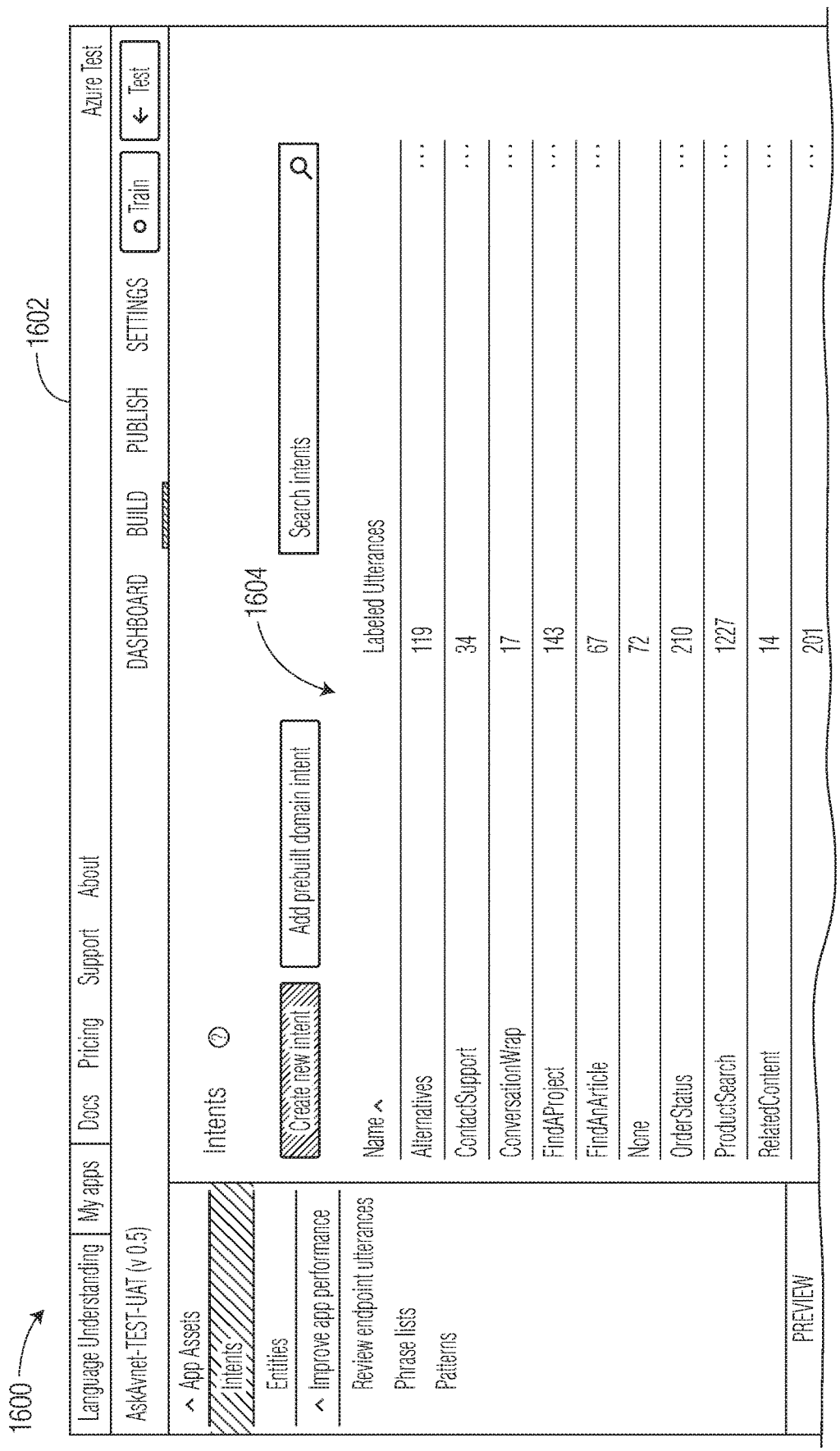
FIGS. 16A, 16B and 16C are example screen shots of an administrator console display of an administrator console for training the intent analysis system of the CQ platform associated with the network architecture shown in FIG. 1, according to an aspect of the present disclosure.
Figure 16B:
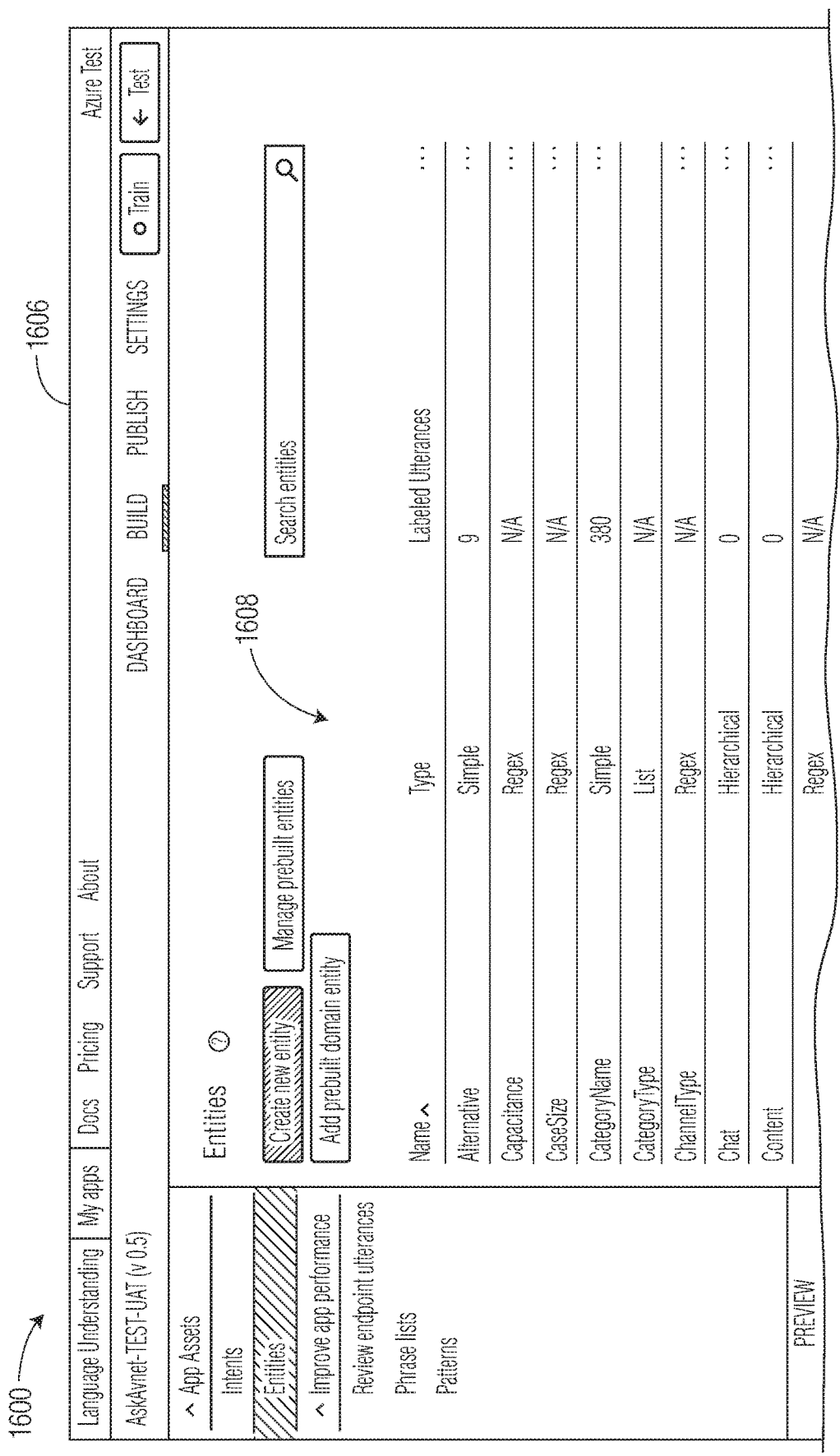
Figure 16C:
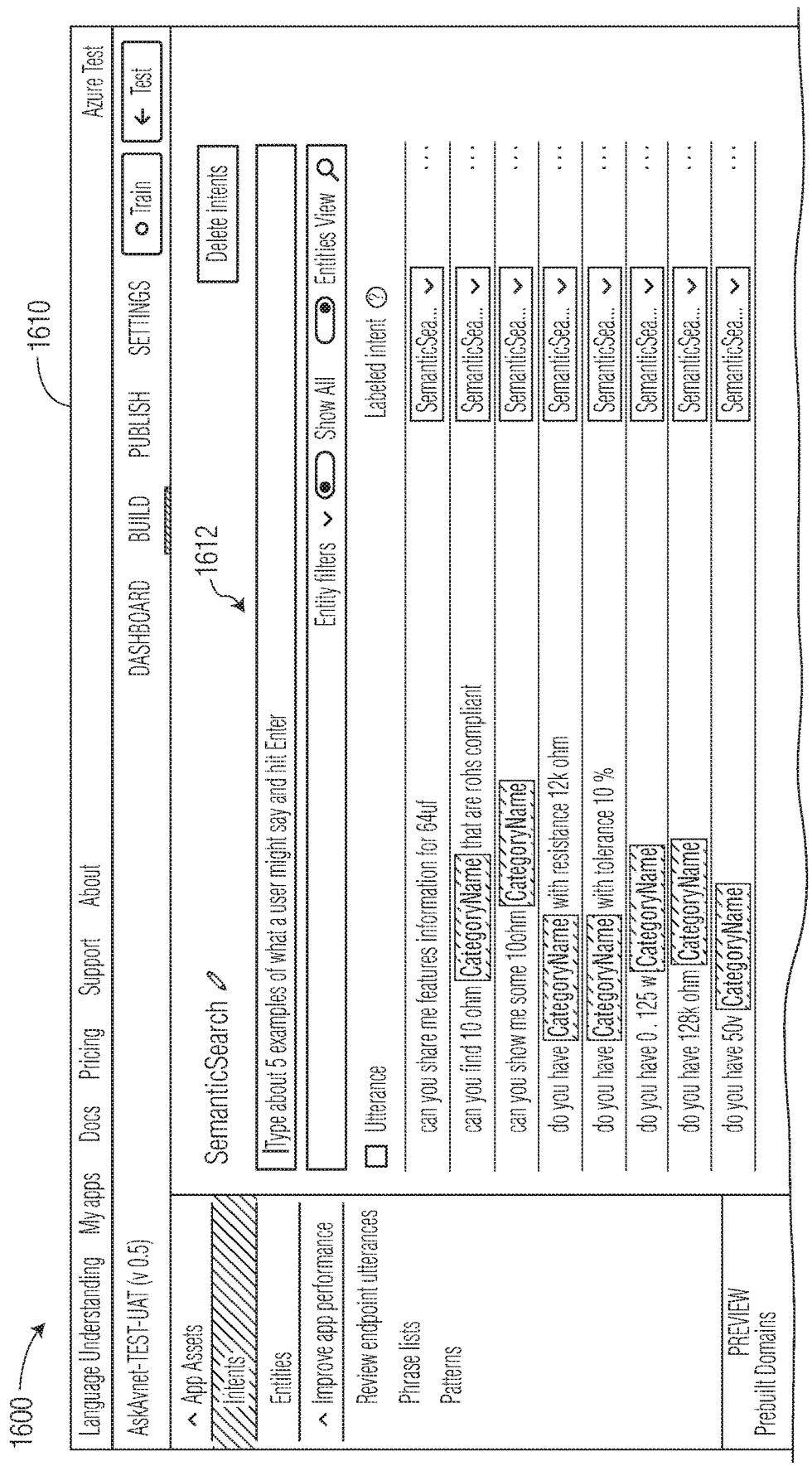

Administrator console 116 may comprise, without being limited to, a desktop computer, a laptop, a notebook computer, a smartphone, a mobile phone, a tablet, a portable digital assistant (PDA), a multi-processor system, a microprocessor-based or programmable consumer electronic device, or any other communication device that administrator 114 may utilize to interact with CQ platform 102 and analytics server 122. Administrator 114 may interact with administrator console 116, via a graphical user interface (not shown) displayed on any type of display device. FIGS. 16A-16C provide example screen shots of an administrator console display 1600 that may be provided by administrator console 116. As discussed further below with respect to FIG. 2, administrator 114, via administrator console 116, may be configured to interact with intent analysis system 136 of CQ platform 102, such as for training of intent analysis system 136. Administrator 114, via administrator console 116, may also be configured to interact with analytics server 122, such as for analysis of the performance of CQ platform 102 with various users. For example, as shown in FIG. 16A, display 1600 may include webpage 1602 for training intent analysis system 136 with respect to intents 1604. As shown in FIG. 16B, display 1600 may also include webpage 1606 for training intent analysis system 136 with respect to entities 1608. As shown in FIG. 16C, display 1600 may also include webpage 1610 for training intent analysis system 136 with respect to semantic search 1612.

Live agent server 120 may be configured to communicatively connect user 106 associated with client device 108 with live agent 118, for human interaction with live agent 118 via a live chat. In general, live agent server 120 may receive a request from CQ platform 102 to initiate a live chat between user 106 of client device 108 and a live agent among live agent(s) 118 associated with live agent server 120. The request for a live chat may include user information (e.g., user name, email address, internet protocol (IP) address, etc.), information regarding a type of service requested for the live chat (e.g., service related to an account, purchasing, pending orders, technical questions, etc.) and a history of automated conversational querying between user 106 and CQ platform 102. In some examples, the type of service requested may be associated with different agents 118. For example, an account type service may be assigned to a first live agent (such as a customer support expert) and a technical question service may be assigned to a different, second live agent (such as a technical support expert). Live agent server 120 may identify a suitable live agent 118 based on the information received in the request for live chat from CQ platform 102, and may initiate connection between the selected live agent 118 and client device 108.

As discussed further below, chat bot 132 of CQ platform 102 may generate an instance of a chat bot interface 150 (e.g., chat bot interface window 1302 shown in FIG. 13A) on one or more websites displayed on client device 108 (e.g., via web client 110). Chat bot interface 150 (also referred to herein as bot interface 150) may include an option for user 106 to request to chat with live agent 118 (e.g., by selecting a 'Contact Support' option in a selectable menu on chat bot interface 150). Chat bot interface 150 may allow user 106 to contact live agent 118 directly without navigating to any other applications, web pages or websites. In some examples, CQ platform 102 may automatically suggest contact with live agent 118, through chat bot interface 150, based upon user input during automated conversational querying and/or through monitoring user actions on website(s). For example, chat bot interface 150 may provide a contact support option when a query asked by user 106 is unable to be answered by CQ platform 102 or answered with a confidence below a predetermined threshold. Responsive to user selection of a live chat option (via chat bot interface 150), CQ platform 102 may generate and send a request to initiate a live chat to live agent server 120.

Figure 15:
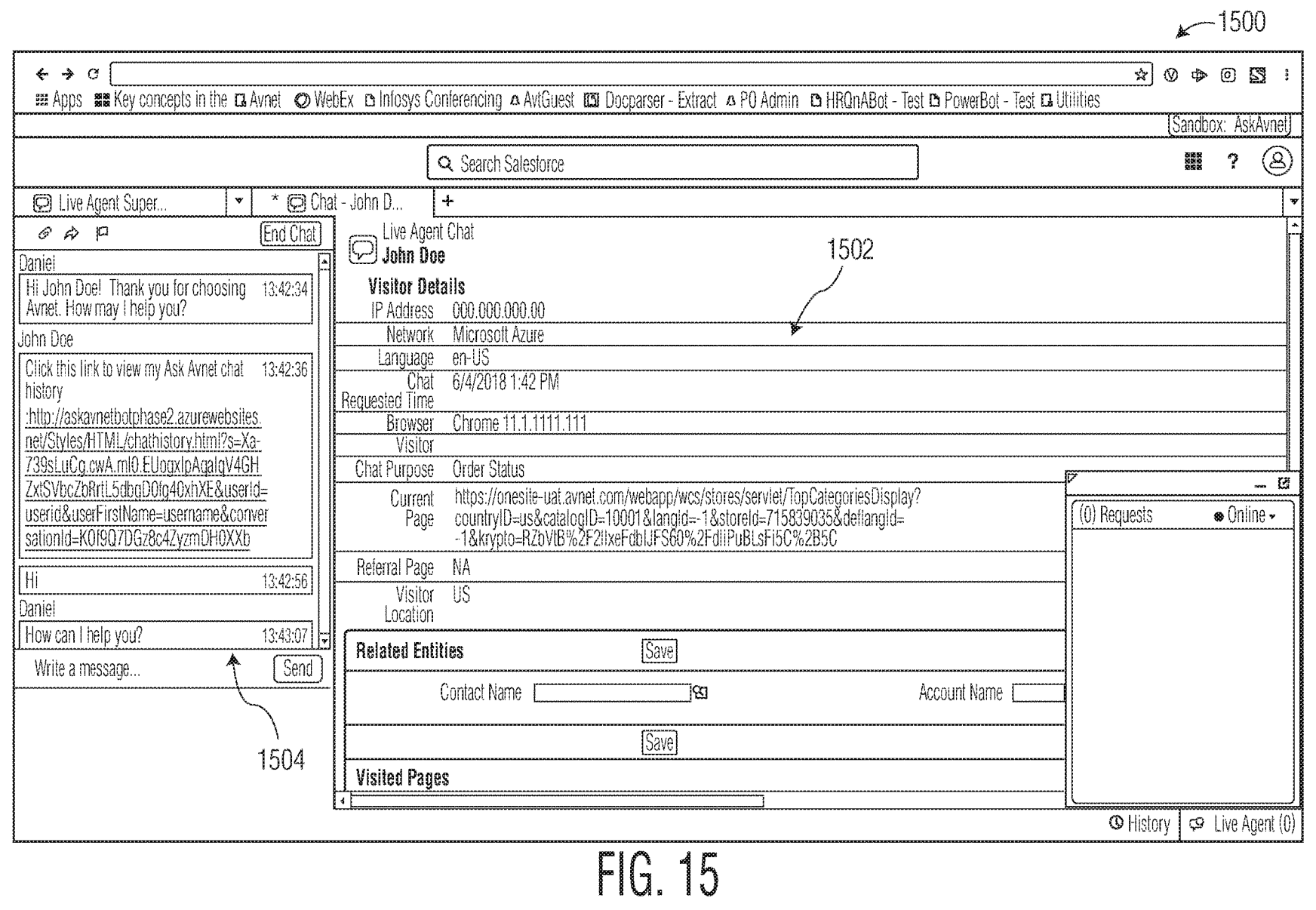

In addition to initiating a connection between live agent 118 and client device 108, live agent server 120 may be configured to generate a live agent console display for the selected live agent 118 (e.g., on live agent server 120 or on a computing device connected to live agent server 120). An example screen shot of a live agent console display 1500 is shown in FIG. 15. Live agent console display 1500 may be configured to display information related to the user (including information in the received request), generally illustrated as user information region 1502. Live agent console display 1500 may also provide live agent 118 the ability to access to additional information from among content source(s) 128 for responding to user 106. Live agent console display 1500 may also provide an interface for live agent to chat with user 106, generally illustrated as chat area 1504. In general, a live agent console display may provide suitable information and data in one or more interactive windows to allow live agent 118 to communicate and provide information to user 106.

Live agent server 120 may also be configured to provide the live chat between live agent 118 and client device 110 via chat bot 132, through chat bot interface 150. Thus, upon user selection of a live chat option (by user 106) and selection of live agent 118 (via live agent server 120), chat bot interface 150 may display the available (selected) agent, and user 106 may start chatting with live agent 118 through chat bot interface 150. In some examples, live agent 118 may transfer the live chat to a different live agent, for example, via live agent console display 1500. For example, the first live agent 118 may be a customer service expert, and may determine that user 106 has a technical question that may be better answered by a second live agent that is a technical service expert. The first live agent may contact the second live agent via live agent server 120, transfer information associated with the user during the live chat (e.g., information displayed on live agent console display 1500) to the second live agent, and transfer the connection to client device 108 from the first live agent to the second live agent.

Because the live chat is provided via chat bot 132 of CQ platform 102, CQ platform 102 may continue to monitor user communications and update its records during the live chat. Such monitoring may allow CQ platform 102 to update its algorithms for automated conversational querying, to reduce instances of handoff to live agent server 120. Such monitoring may also allow CQ platform 102 to provide a seamless transition from the live chat with live agent 118 to automated conversation with internet 132.

In a non-limiting example embodiment, CQ platform 102 may be configured to communicate with live agent server 120 using one or more rest application program interfaces (APIs). In some examples, rest API(s) may be exposed by live agent server 120 to check for agent availability, to start and end a live chat, to send and receive messages, etc. In some examples, CQ platform 102 may use a live chat application, including a cloud-based application such as Salesforce LiveAgent developed by Salesforce of San Francisco, Calif.).

Analytics server 122 may be configured to receive data collected by CQ platform 102 (e.g., user input, user request data, response data generated by CQ platform 102, conversation details of automated conversations with chat bot 132, live chat with live agent 118), and may generate one or more metrics based on the received data. Analytics server 122 may include dashboard 124 configured to display generated metrics and data lake 126 for storing the received data.

Data lake 126 may be configured to store, for example, information and data collected from CQ platform 102 relating to automated chats (i.e., via chat bot 132) and live agent chats (i.e., via live agent 118). The information may include, for example, conversational details (e.g., one or more user inputs, one or more user intents identified by CQ platform 102, one or more query results obtained by CQ platform 102) over one or more automated conversations and/or live chats with one or more users. In some examples, the collected information may also include user actions on one or more websites during automated and/or live chat conversations. The collected information may also include, in some examples, feedback from user 106 (received, e.g., via client device 108 and/or via chat bot 132) relating to CQ platform 102. In some examples, the collected information may also include messages from client device 108 directed to live agent server 120. In general, data lake 126 may be configured to store data/information of any size, shape and speed. Data lake 126 may include a database or datastore that stores a massive scale and variety of data in its native raw state and/or in an interpreted state. For example, as CQ platform 102 generates raw data, that raw data may be stored within data lake 126 for later consumption, use, or interpretation by analytics server 122. Data lake 126 may include multiple separate databases and/or datastores that together make up data lake 126, or data lake 126 may be a singular datastore.

Figure 17A:
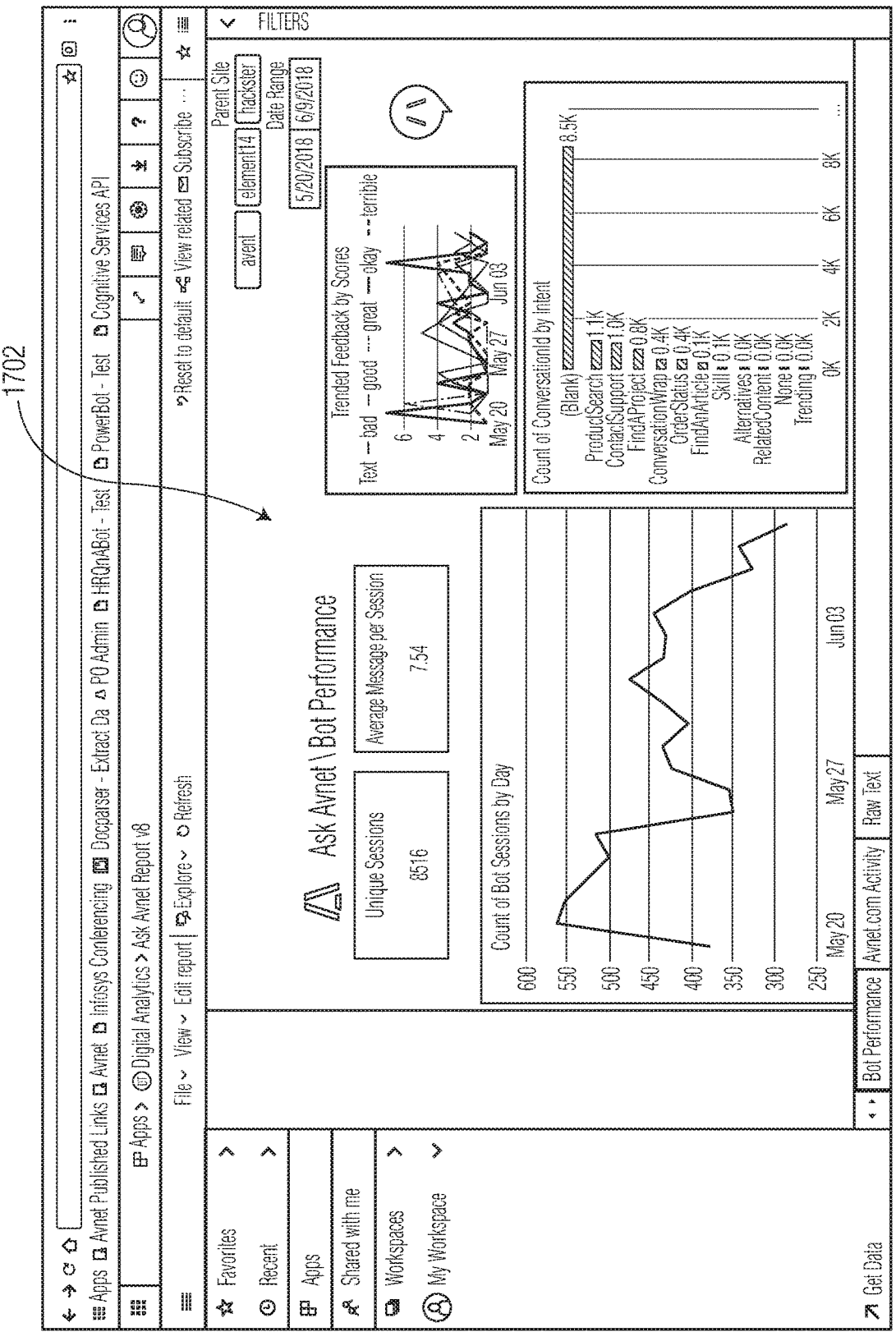
FIGS. 17A and 17B are example screen shots of a dashboard of an analytics server associated with the network architecture shown in FIG. 1, according to an aspect of the present disclosure.
Figure 17B:
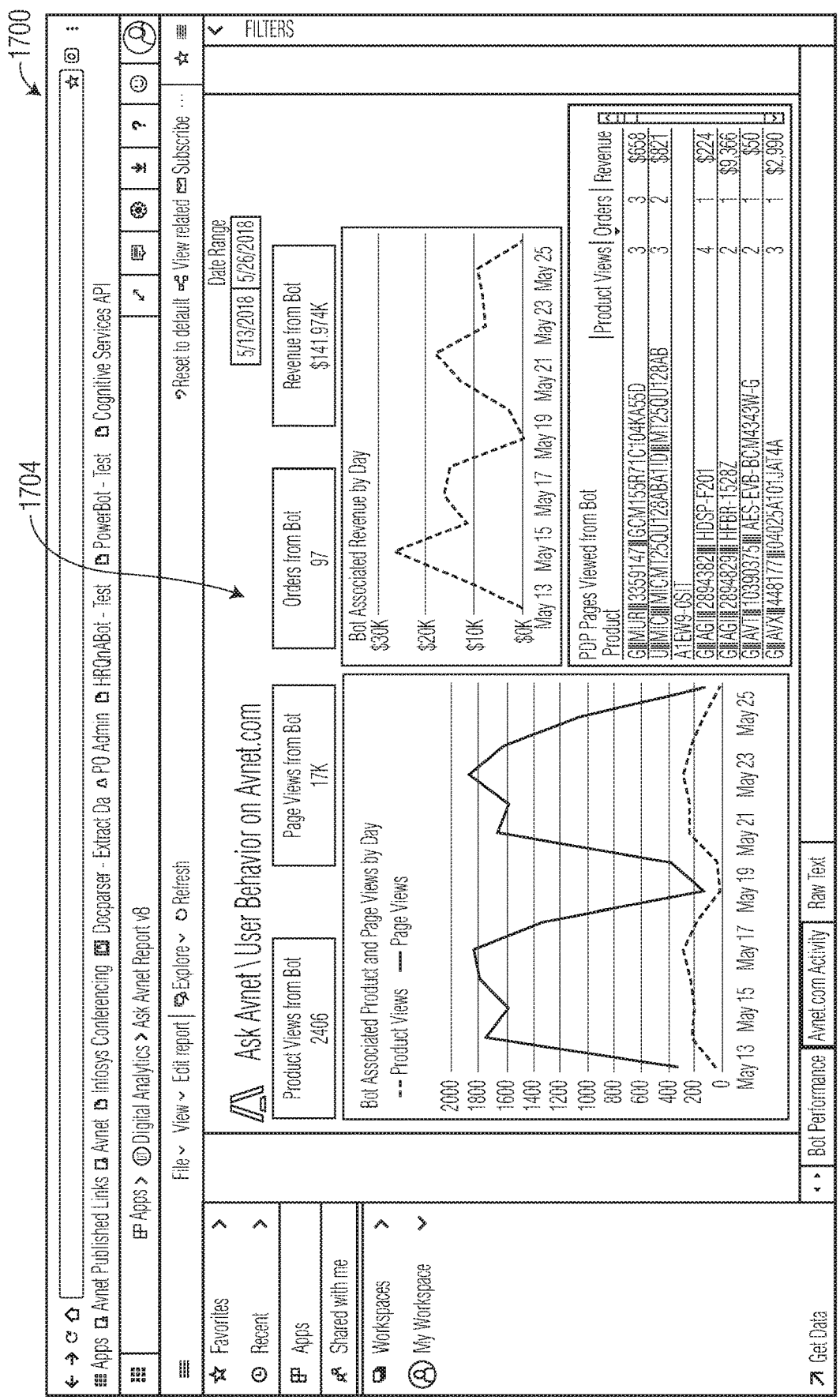

Dashboard 124 may be configured to provide an interactive user interface (e.g., for display on a display device) for displaying various metrics associated with the collected information/data stored in data lake 126. Example screenshots of dashboard 1700 is shown in FIGS. 17A and 17B. For example, as shown in FIG. 17A, dashboard 1700 may include webpage 1702 providing various chat bot performances metrics. As shown in FIG. 17B, dashboard 1700 may also include webpage 1704 providing various user behavior metrics. Analytics server 122 may be configured to provide administrator 114 or any other suitable authorized user with access to dashboard 124 and/or data lake 126.

In some examples, analytics server 122 may include a structured query language (SQL) server for managing and processing the information/data stored in data lake 126. In general, analytics server 122 may be configured to process and analyze the stored information/data across various platforms and various languages. Analytics server 122 may include an analytics module (not shown) for creating dashboard 124. In one non-limiting example, the analytics module may include PowerBI® developed by Microsoft® Corporation of Redmond, Wash. Non-limiting examples of metrics and reports that may be determined by analytics server 122 and provided to dashboard 124 may include most popular intents, a count of bot Sessions by day, bot Helpfulness (e.g., based on user feedback), demographic reports, user messages grouped by intent, product and orders view by day, a total count of bot sessions, a count of queries and an average of a score of intent analysis system 136 by identified intent (intents are discussed further below with respect to FIG. 2).

Content source(s) 128 may be embodied on one or more computing devices housed in one or more related or independent facilities that are configured to include information/data that may be useful to user 106. Some content source(s) 128 may store information associated with user 106 (e.g., account information). Other content sources(s) 128 may include information unrelated to user 106 (e.g., a website associated with electronics distribution). In general, content source(s) 128 may include one or more of databases, servers, websites (having one or more web pages), applications, online communities, blogs, news sites, electronic journals, social networks, etc. Content source(s) 128 may include public resources and private resources.

In one example embodiment, content source(s) 128 may include one or more of product database(s), order database(s), account databases, and one or more online communities. In one non-limiting example, the online communities may include Hackster and/or Element14 (or any other suitable sources), which may include articles and/or community discussion content that may be useful for querying by CQ platform 102.

CQ platform 102 may include web channel 130, chat bot 132, message controller 134, intent analysis system 136, query system 138, one or more databases 140, administrator (admin) portal 142, web server 144, API server 146 and, optionally, authentication server 148. Although not shown, one or more of components of CQ platform 102 may be coupled with a data and control bus. It may be appreciated that, in some examples, one or more components of CQ platform 102 may be distributed across one or more locations (e.g., such as across one or more virtual machines (VMs)) and may be communicatively connected via one or more networks (not shown).

In general, CQ platform 102 may be configured to interface with client device 108, to provide an automated conversational querying interface (i.e., a chat bot interface) for communicating with user 106 to identify querying intents and to provide results of querying to user 106. CQ platform 102 may be configured to interface with content sources(s) 128, to retrieve relevant content for a query based on the identified intent and configure the results for presentation to client device 108. CQ platform 102 may also be configured to interface with live agent server 128, to initiate and provide live agent chat to client device via live agent 118. retrieve relevant content for a query based on the identified intent and configure the results for presentation to client device 108. CQ platform 102 may also be configured to interface with analytics server 122, to provide conversational detail information/data for further analysis.

Although FIG. 1 illustrates live agent server 120 and analytics server 122 as being separate from CQ platform 102, in some examples, live agent server 120 and/or analytics server 122 may be configured to be part of CQ platform 102. In some examples, integration of live agent server 120 and/or analytics server 122 into CQ platform 102 may improve the ability of CQ platform 102 to manage data flow, storage and processing of data/information via the components of CQ platform 102, for improved operation of CQ platform 102.

In some examples, CQ platform 102 may be configured as a cloud-based platform comprising one or more virtual machines, with the ability to scale the number of virtual machines based on a current load (e.g., application usage) on CQ platform 102. In this manner, CQ platform 102 may ensure optimum resource utilization, and CQ platform 102 may easily scale up or scale out its resources as the application usage grows. In some examples, CQ platform 102 may be configured to support Infrastructure as a Service (IaaS) cloud computing service. In one non-limiting example, CQ platform 102 may be build based on a Microsoft® Bot Framework on a Microsoft® Azure® cloud platform (developed by Microsoft® Corporation of Redmond, Wash.).

Web channel 130 may be configured to provide web chat control for CQ platform 102, to enable communication between chat bot 132 and client application(s) 112 of client device 108. In one non-limiting example, web channel 130 may include an embeddable web chat control such as Web Chat for a Microsoft® Bot Framework using, for example, a DirectLine API. In general, Web Chat is a React component built with TypeScript using Redux for state management and RxJS for wrangling async. DirectLine API includes a set of APIs for communication between chat bot 132 and client application 112. Web channel 130 may include one or more APIs (such as DirectLine API) that may be exposed, for example, to start a conversation, send a message, receive a message etc.

In an example embodiment, a client component of web channel 130 may include a hypertext markup language (HTML) file with JS and CSS files included in a website associated with CQ platform 102 (referred to as the platform website). The JS and CSS files may be included in the platform web site (avnet.com/huckster.io/element14.com) in an HTML iframe to enable chat bot 132 in the website. Based on the target website, the styling may be changed but all of the JS/CSS files may connect to the same instance of chat bot 134 deployed by CQ platform 102.

Chat bot 132 may include an artificial intelligence (AI) (e.g., machine learning) engine configured to conduct an automated conversation with user 106 via text-based communication such as text messages in a chat interface. CQ platform 102, via chat bot 132, may be able to handle at least an initial portion of a query session with user 106, for example, to determine an intent for the query, so that user 106 may be properly routed to live agent 118 to handle the intent. In other cases, CQ platform 102, via chat bot 132, may provide sufficient information or resolution to user 106 without involving live agent 118. In some cases, AI-generated content segments may be distributed throughout a chat session.

Chat bot 132 may be configured to generate chat bot interface 150 on web page(s) of one or more websites, for providing an automated conversational chat session with user 106. In an example embodiment, chat bot 132 may be configured as a plug-n-play model, such that chat bot 132 may be plugged into any web page, by including an <iframe> within a <div> of an HTML document. Chat bot 132 may be configured to manage a conversation using one or more dialogs. Each chat with chat bot 132 may be associated with a conversation identifier (e.g., ConversationID). When a user initiates a chat with chat bot 132, a ConversationID may be generated. The ConversationID may be used to maintain a chat history across various websites. Chat bot 132 may be configured to read and analyze user input via chat bot interface 150, and generate conversational answer(s) to the user input, by further processing via intent analysis system 136 and query system 138.

Message controller 134 may be configured to direct messages between client device 108 and internet bot 132. Message controller 134 may post messages to internet bot 132 (from CQ platform 102) and may obtain messages from internet bot 132 (from chat interface 150). Message controller 134 may also be configured to direct messages received from internet bot 132 to intent analysis system 136.

Intent analysis system 136 may be configured receive a message including user input from message controller 134. Intent analysis system 136 may be configured to identify an intent and entity(s) from the user input. Intent analysis system 136 may transmit the identified intent and entity(s) to query system 138.

Query system 138 may be configured receive the identified intent and entity(s) from message intent analysis system 136. Based on the intent/entity(s), query system 138 may be configured to determine whether to perform an automated search or to initiate handoff of communication to live agent server 120. Query system 138 may also be configured to perform an automated search of relevant content among content source(s) 128 upon a determination to proceed with the automated search. Query system 138 may also be configured to format any search results for display on chat bot interface 150.

Intent analysis system 136 and query system 138 are described further below in respective FIGS. 2 and 3.

Database(s) 140 may be configured to store automated chat conversation dialog for a conversation session. In some examples, database(s) 140 may store state data related to the conversation dialog (e.g., ConversationID, user selections, web page/website information, user actions on a web page during the conversation session, etc.) In some examples, database(s) 140 may store conversation dialog for a live agent chat during the conversation session, as well as any suitable state data. In some examples, database(s) 140 may include a NoSQL database (e.g., a non-relational or not only relational) database, such as a multi-model NoSQL database. In other examples, database(s) 140 may include a relational database (e.g., a SQL database). In one non-limiting example, database(s) 140 may include an Azure Cosmos DB® (developed by Microsoft® Corporation of Redmond, Wash.).

Admin portal 142 may be configured as an interface for communication between admin console 116 and one or more components of CQ platform 102, including intent analysis system 136. Administrator 114 may interact with one or more components of CQ platform via admin portal 142, for example to adjust parameters of intent analysis system (or other components) for identifying intents from user input.

Web server 144 may be configured to interface with client device 108 via web client 110. API server 146 may be configured to interface with content source(s) 128 and live agent server 120 via one or more APIs.

CQ platform 102 may, optionally, include authentication server 148. Authentication 148 may be configured to authenticate user 106, to enable user 106 to interact with CQ platform 102. In some examples, CQ platform 148 may request that user 106 register with CQ platform 102 prior to initiating chat bot interface 150, the first time user 106 visits the platform website. CQ platform 148 may store the user information in database(s) 140 (for example) upon registration, such as user identity, email, account information, etc.

Figure 2:
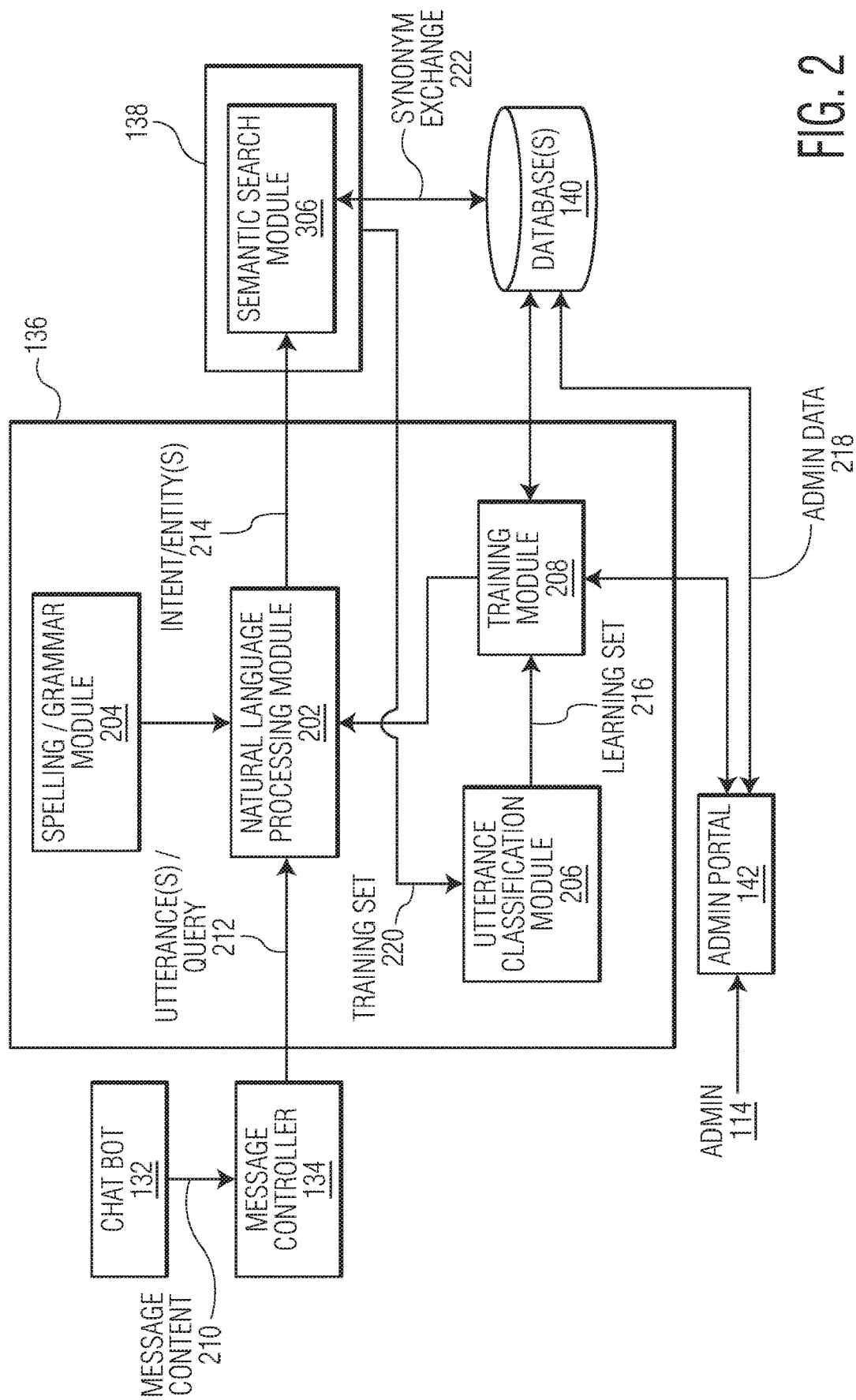
FIG. 2 is a functional block diagram of an example intent analysis system of the CQ platform shown in FIG. 1, according to an aspect of the present disclosure.

FIG. 2 is a functional block diagram of intent analysis system 136 of CQ platform 102, according to an aspect of the present disclosure. Intent analysis system 136 may include natural language processing (NLP) module 202, spelling and grammar (also referred to herein as spelling/grammar) module 204, utterance classification module 206 and training module 208. In some examples, modules 202-208 may execute on one or more processors (e.g., processing device 1802 shown in FIG. 18). In general, modules 202-208 may be embodied in specialized software, firmware, specially-configured hardware or any combinations thereof.

In general, chat bot 132 may obtain input from client device 102 (via chat bot interface 150), including message content 210. Message controller 134 may parse message content 210 to identify one or more utterances and/or query input 212. In general, an utterance represents user input to be interpreted by intent analysis system 136. Message controller 134 may transmit utterance(s)/query input 212 to NLP module 202.

NLP module 202 may be configured to receive utterance(s)/query input 212 from message controller 134 and may be configured to identify an intent and one or more related entities (i.e., intent/entity(s)) 214. The intent may represent, for example, a desired task or action by user 106 (e.g., perform a product search, learn about a particular topic, check account information, etc.). The entity(s) may include, for example, one or more search keywords and/or one or more attributes). For example, utterance 212 may be "LM324." NLP module 202 may identify the intent as "product search" and may identify the entity as electronics part "LM324." In some examples, NLP module 202 may be trained with key attributes associated with a particular type of content (e.g., content related to electronic parts). For example, NLP module 202 may identify intent/entity(s) 214 from utterance(s) 212 such as "100 ohm 1206 case ¼ W 5%" or "capacitor 10 uF 25V 10% 0603 case." NLP module 202 may include one or more pre-built and/or custom-trained language models, to understand a user's intent/related entity(s) 214. In one non-limiting example, NLP module 202 may include or incorporate language understanding as a service, such as the Language Understanding Intelligent Service (LUIS) developed by Microsoft® Corporation. NLP module 202 may transmit identified intent/entity(s) 214 to query system 138.

It may be appreciated that NLP module 202 may also generate a confidence level along with intent/query(s) 214. The confidence level (or score, probability, or other indication) may indicate a likelihood that the intent is correct and appropriate for utterance/query 212 identified via chat bot 132. Query system 138 and chat bot 132 may determine an appropriate action based on the confidence level, as well as intent/query(s) 214.

Spelling/grammar module 204 may be configured to perform contextual grammar and spell checking. For example, spelling/grammar module 204 may identify and correct spelling errors, recognize differences among names, brand names, and slang, as well as understand homophones, even as message content 210 is being generated by user 106 on chat bot interface 150. NLP module 202 may interact with spelling/grammar module 204 to facilitate identification of intent/entity(s) 214 with higher accuracy and higher confidence level. In one non-limiting example, may incorporate a contextual spelling application program, such as the Bing Spell Check API developed by Microsoft® Corporation.

Utterance Classification module 206 may be configured to develop learning set 216 for training module 208. Classification module 206 may develop learning set 216 through interaction with administrator 114 via administrator portal 142. In some examples, classification module 206 may obtain training set 220 via semantic search module 306. In some examples, learning set 216 may be determined based on the performance of CQ platform 102 for providing relevant query results. The performance of CQ platform 102 may be determined, for example, via analytics server 122.

In general, training of NLP module 202 may be an ongoing process. However, as more and more utterances are fed into chat bot 132, continuously training the language model during normal operation (e.g., during a production instance) may become difficult. To address this issue, intent analysis system 136 may include utterance classification module 206 and a set of authoring APIs under training module 208. This defines a learning loop solution, which may include a training instance where training of NLP module 202 may be automated. In one example, the training approach may include feeding the output (214) of NLP module 202 and/or the output (220) of semantic search module 306 to utterance classification module 206. Utterance classification module 206 may classify different utterances by intents, using a set of industry-specific rules using, for example, an intent score, a sentiment score and entity density, and may call corresponding authoring APIs to enhance learning set 216 and train the training instance of NLP module 202. Results of the training instance may be reviewed by administrator 114 and then pushed to a production instance. In this manner, NLP module 202 may enhance its knowledge base and improve intent/entity recognition in future conversations.

Training module 208 may be configured to train the language model(s) of NLP module 202. Language model(s) of NLP module 202 may be continuously trained through its operation. However, as more utterances 212 are fed into NLP module 202, continuously training the model may become more difficult. Training module 208 may define a learning loop, where a predetermined set of rules (e.g., minimum returned scores, entity density) may be used to at least partially automate the training process. In addition, platform-curated data may be reviewed by one or more administrators 114 (e.g., a product owner, a business administrator) to train and/or retrain chat bot 132 as well as NLP module 202, understand usage patterns and/or identify new feature specifications for CQ platform 102. The trained/retrained data may be fed back to a production instance for future user queries.

Administrator 114 may interact with training module 208 using administrator console 116 via administrator portal 142. Administrator 114 may also store and/or retrieve administrator data 218 via database(s) 140. Administrator data 218 may include, without being limited to, learning data, facts, synonyms exchange, usage data, etc. Training module 208 may also communicate with database(s) 140 to store and/or retrieve data.

In some examples, semantic search module 306 may interact with NLP module 202 and perform synonym exchange 222 via synonyms stored in database(s) 140, to identify attributes that may not be matched by NLP module 202 from utterance/query 212. Semantic search module 306 may be configured to identify possible keywords based on the identified attributes and synonyms.

Figure 3:
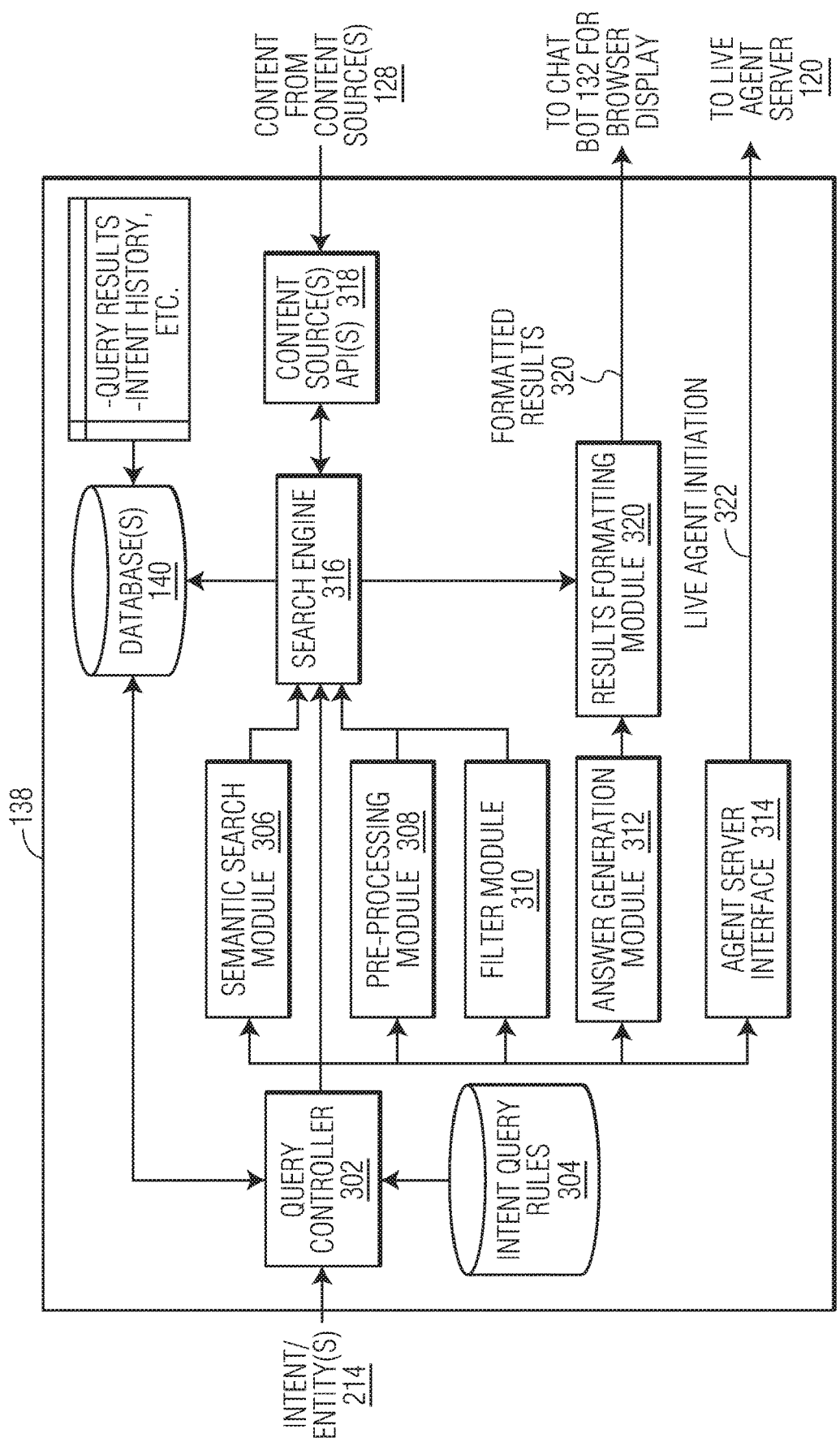
FIG. 3 is a functional block diagram of an example query system of the CQ platform shown in FIG. 1, according to an aspect of the present disclosure.

FIG. 3 is a functional block diagram of query system 138 of CQ platform 102, according to an aspect of the present disclosure. Query system 138 may include query controller 302, intent query rules 204, semantic search module 306, pre-processing module 308, filter module 310, answer generation module 312, agent server interface 314, search engine 316, content source(s) API(s) 318 and results formatting module 320. In some examples, modules 306-312 and 320 may execute on one or more processors (e.g., processing device 1802 shown in FIG. 18). In general, modules 306-312 and 320 may be embodied in specialized software, firmware, specially-configured hardware or any combinations thereof.

Query controller 302 may be configured to receive intent/entity(s) 214 from intent analysis system 136 and to identify whether to respond to intent/entity(s) 214 via initiation of automated querying (by CQ platform 102) or to initiate handoff of the conversation session to live agent server. Query controller 302 may be configured to identify selection of automated querying or handoff based on set of intent query rules 304. Query controller 302 may further control selection and activation of one or more of modules 306-312 and 320 and search engine 316, as well as exposure of one or more content source(s) API's 318, based on intent query rules 304. Although FIG. 3 illustrates query controller 302 as being a separate component, in some examples, query controller 302 may be integrated with chat bot 132. Query controller 302 may include, for example, a processor, a microcontroller, a circuit, software and/or other hardware component(s) specially configured to control operation of semantic search module 306, pre-processing module 308, filter module 310, answer generation module 312, agent server interface 314, search engine 316, content source(s) API(s) 318, results formatting module 320 and database(s) 140.

Intent query rules 304 may be stored in database(s) 140 or may be stored in a separate database. Intent query rules 304 may include one or more specific and predetermined rules for identifying one or more actions to be performed by one or more components of CQ platform, depending upon intent/entity(s) 214, as well as, in some examples, a confidence level of the received intent 214 determined by NLP module 202 (FIG. 2). In some examples, intent query rules 304 may also consider an intent history to identify action(s) and/or component(s) to perform the action(s) by CQ platform 102. Intent query rules 304 may be developed for a specific environment for querying. For example, intent querying rules 304 may be different for different types of content and/or different desired querying results. For example, intent querying rules 304 may be different for home improvement, travel, online shopping, self-learning and electronics distribution environments.

Semantic search module 306 may be configured to identify and extract attributes that are not matched by NLP module 202 to identify one or more keywords. Semantic Search module 306 may provide more accurate results (compared to NLP module 202 alone) to user queries input to chat bot 132. For example, a user query such as Show me all [capacitor] with [Nominal] [Cap.] Range [1 µF] [to] [1500 µF]. Semantic search module 306 may be configured to identify one or more attributes and related value(s) from utterance input 212 (FIG. 2). In some examples, semantic search module 306 may improve the ability of user 106 to search for parts (or other items) according to a descriptive and/or attribute based search criteria. Semantic search module 306 may include artificial intelligence and specially configured custom logic to understand complex user queries and provide relevant results. Search engine module 306 may transmit the identified keywords to search engine 316.

Pre-processing module 308 may be configured to identify some understanding of identified search entity(s) 214 prior to performing a query. For example, pre-processing module 308 may perform an analysis of entity(s) 214 (e.g., part numbers, categories, etc.) in order to refine the query, such that search engine 316 may perform a more accurate query. Pre-processing module 308 may transmit intent/entity(s) 214 as refined by the processing of pre-processing module 308. In some examples, pre-processing module 308 may be configured to transform entity(s) and/or keyword(s) received from user input and NLP module 202 to terms in a more API-friendly format, in order to retrieve relevant and accurate information. For example, if user input from user 106 includes "I am looking for a 10NF 50V caps", pre-processing module 308 may transform or normalize the entity values in the request (e.g., 10NF, 50V, Capacitor) into a query to a product search API with parameters of Capacitance Value=10000 (as all capacitance values are normalized into PF); Operating Voltage=50 and Product Category= "Capacitor"; which may aid the API in obtaining more relevant results.

Filter module 310 may be configured to apply one or more predetermined filter parameters to intent/entity(s) 214 associated with one or more selectable filters and transmit the filter parameters to search engine 316. In some examples, the filters may be related to parts querying (e.g., in stock only, manufacturer, not obsolete, no end of life (EOL) notice, restriction of hazardous substances (RoHS) compliant, fast search attributes (e.g., capacitance, voltage, resistance), etc.) and types of projects (e.g., by difficulty, by type (e.g., showcase, tutorial, work in progress, etc.).

Answer generation module 312 may be configured to extracts all possible pairs of questions and answers from user provided content, such as frequently answered questions (FAQs) (e.g., via FAQ URLs), documents and editorial content. Answer generation module 312 may be configured to respond to user questions in a more natural, conversational way. In one non-limiting embodiment, answer generation module 312 may incorporate a conversational question answering web-based service, such as the QnA Maker developed by Microsoft® Corporation.

Agent server interface 314 may be configured to transmit live agent initiation 322 to live agent server 120. Live agent initiation 322 may initiate handoff to live agent server 120, for interaction between user 106 and live agent 118 (FIG. 1). Agent server interface 314 may include one or more APIs, that may be exposed, for interaction with live agent server 120. In general, agent server interface 314 may include, for example, a processor, a microcontroller, a circuit, software and/or other hardware component(s) specially configured to interact with live agent server 120 (e.g., for initiating handoff, initiating a conversation with live agent 118, posting messages from user 106, obtaining messages from live agent 118). Agent server interface 314 may call a specific API for each interaction between user 106 and live agent 118. For example, whenever a user types a question, an application of agent server interface 314 may read the question and invoke a chat API to post the question to live agent 118 (via live agent server 120). Although agent server interface 314 is shown, in FIG. 3, as being a separate component, in some example, agent server interface may be may be integrated with chat bot 132.

In an example embodiment, one or more types of agent groups may be created. For example, two agent groups may be created, one group for customer service agents and another group for technical support agents. Based on a selection by user 106 (e.g., via chat bot interface 150), one or more group identifiers (e.g., a parameter button identifier and/or organization identifier) may be passed in the API requests to live agent server 120. Live agent server 120 may use the group identifier(s) to route requests to corresponding agent groups.

In an example, agent server interface 314 may include at least one of a create session API, a check availability API, an agent image API, an initiate chat API, a post message API and a get message API. In operation, the create session API may be called initially to retrieve an API token to be appended on further calls. The check availability API may be called to check an availability of any agent. If no agents are available, agent server interface 314 may cause a message to be displayed to the user (via chat bot interface 150). The agent image API may be called to retrieve an image uniform resource locator (URL) of an agent. CQ platform 102 may cause the agent's name and/or image to be displayed on chat bot interface 150. The chat API may be called in order to initiate the conversation with live agent 118. Information such as an API key, user details etc. may be passed in the chat API request to live agent server 120. The post message API may be called to post a message from client device 108 (of user 106) to live agent 118. The API key and the message input by user 106 (via chat bot interface 150) may be sent as request parameters. The get messages API may be called to retrieve messages from live agent 118 to client device 208 of user 106. Agent server interface 314 may invoke the get messages API periodically (e.g., in a periodic interval), (i.e., polling) to get messages from live agent 118. Examples of API responses from live agent 118, during polling, may include "agent typing" (if live agent 118 may be typing a message), "end chat" (if live agent 118 ends the chat) and "transfer chat" (if live agent 118 transfers the chat to another live agent).

In operation, when user 106 requests for a hand-off to a live chat, agent server interface 314 may first establish a connection to (a live agent application) of live agent server 120. Agent server interface 314 may generate a token with the application and establish a secure connection between client device 108 of user 106 and live agent 118 (i.e., via a computing device of live agent 118 or live agent server 120 directly). Live agent 118 and client device 108 may then begin a live chat session. User 106 and/or live agent 118 may end a live chat. When the end chat option is selected, the application expires the session that was created when the live chat was initiated.

Search engine 316 may be configured receive entity(s) 214 (i.e., search keyword(s) and attribute(s)) for querying and may query one or more content source(s) 128. In some examples, search engine 316 may arrange the keywords and attributes in a particular configuration and/or format for querying particular content source(s0 128. Search engine 316 may receive entity(s) 214, for example, from query controller 302, semantic search module 306, pre-pre-processing module 308 and/or filter module 310. In general, search engine 316 may generate a search request, search content source(s) 128 for the most relevant content related to the requested entity(s) 214 and retrieve relevant content to form query results. Search engine 316 may transmit the query results to database(s) 140, such that database(s) 140 may store, for example, the query results, an intent history (as well as conversation dialogs, etc.).

In an example embodiment, search engine 316 may index the attributes (such as product attributes) as separate fields. Each attribute may be queried by the attribute name in the search query. For example, the search term "looking for lm324 with 16V" may pass "lm324" as a part number keyword and "16V" as a Voltage attribute that are sent in a query field, to retrieve accurate search result. In another example, in order to increase the number of search results, search engine 316 may format entity(s) 214 in an index as a single field containing all technical attributes. In the search request, any attribute value(s) may be passed along with the part number as a new field and that may perform a query against the consolidated attributes field. By indexing the attribute and value(s) to a single field, search engine 316 may search in a single field for faster response time. In a non-limiting example, search engine 316 may include an enterprise search platform, such as Apache Solr™ developed by Apache® Software Foundation of Forest Hill, Md.

Content source(s) API(s) 318 may include one or more REST APIs for searching, filtering, finding alternative information, articles, discussions, etc. via interaction with content sources 128. Search engine 316 may invoke one or more content source(s) API(s) to search content source(s) 128 and retrieve query results. For example, some REST APIs may connect search engine 316 to one or more content source(s) 128 for product and/or order data. Articles and/or community discussion contents may be fetched via other APIs (e.g., Hackster and Element14 APIs).

Results formatting module 320 may be configured to format the query results from search engine 316 for display on chat bot interface 150. In one example, results formatting module 120 may format the query results in a JSON format. The JSON formatted data is then rendered for display via chat bot 132.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in specialized software, firmware, specially-configured hardware or any combinations thereof.

Those skilled in the art will appreciate that CQ platform 102 may be configured with more or less modules to conduct the methods described herein with reference to FIGS. 4, 5A-5D, 6 and 8-12. As illustrated in FIGS. 4, 5A-5D, 6 and 8-12, the methods shown may be performed by processing logic that may comprise hardware (e.g., circuitry, dedicated logic, programmable logic, microcode, etc.), software (such as instructions run on a processing device), or a combination thereof. In one embodiment, the methods shown in FIGS. 4, 5A-5D, 6 and 8-12 may be performed by one or more specialized processing components associated with components 130-148 of CQ platform 102 of FIG. 1. FIGS. 4, 5A-5D, 6 and 8-12 are described below with respect to FIGS. 1-3. It is understood that although method steps are shown, in FIGS. 4, 5A-5D, 6 and 8-12, as representing separate operations, it is understood that one or more operations may be performed concurrently, and the order of operations is not limited to the order shown in FIGS. 4, 5A-5D, 6 and 8-12.

Referring next to FIG. 4, FIG. 4 is a flowchart diagram of an example method of performing automated conversational querying of intents on content source(s) 128 via bot interface 150 associated with CQ platform 102, according to an aspect of the present disclosure. At step 400, CQ platform 102 may receive an indication of user 106, via client device 108, initiating access to a platform-associated website, for example, via web server 144. At optional step 402, CQ platform 102 may authenticate user 106, for example by optional authentication server 148. In some examples, authentication server 148 may authenticate user credentials of user 106, prior to initiating chat bot interface 150. In some examples, authentication server 148 may authenticate user credentials of user 106, to provide a personalized chat dialog with user 106. In some examples, CQ platform 102 may register user 106 with the platform-associated website, if CQ platform 102 determines that user 106 has not been previously registered (e.g., a new user).

At step 404, CQ platform 102 may create an identifier and associate the identifier with user 106. For example, CQ platform 102 may create a ConversationID associated with user 106, and CQ platform 102 may use the identifier to maintain a chat history across various websites with (specific) user 106. At step 406, CQ platform 102, via chat bot 132, may initiate chat bot interface 150 on the initial website accessed by user 106 (at step 400). At step 408, chat bot 132 may monitor any user actions across one or more web pages of one or more websites, while maintaining chat bot interface 150 on the web page(s) of each website.

At step 410, chat bot 132 may receive a message indicating user input via chat bot interface 150. At step 412, message controller 134 may extract an utterance/query from the received message. At step 414, intent analysis system 136 may identify an intent and related entity(s) in the utterance, as well as, in some examples, a confidence value of the intent. At step 416, query controller 302 of query system 138 may determine a further action based on the identified intent (step 414) based on a set of intent query rules 304.

At step 418, query controller 302 may determine whether to initiate a platform-based response or to initiate hand-off to live agent server 120, for example, based on set of intent query rules 304.

When query controller 302 determines to initiate a platform-based response, step 418 proceeds to step 420, and query controller 302 may determine whether to perform a platform-based search (e.g., using search engine 316), according to the identified intent and based on set of intent query rules 304.

When query controller 302 determines to perform a platform-based search, step 420 proceeds to step 422. At step 422, query system 138 may perform an automated search with content source(s) 128 based on the intent and entity(s) (identified in step 414, for example, via at least search engine 316 and content source(s) API(s) 318. In some examples, query system 138 may further activate at least one of semantic search module 306, pre-processing module 308 and filter module 310 as part of the automated search process. The automated search by search engine 316 may include querying content source(s) 128 via content source(s) API(s) 318, receiving content in response to the query from among content source(s) 128 and identifying relevant content among the received content, to form query results.

At step 424, query engine 316 may store the query results in database(s) 140, and database(s) 140 may update the intent history for user 106. At step 426, results formatting module 320 may format the results for display on a web browser, and chat bot 132 may display the results on chat bot interface 150. Step 426 may proceed to step 408.

When query controller 302 determines not to platform-based search, step 420 proceeds to step 428. At step 428, query system 138 may generate a conversational response based on predefined frequently answered questions FAQs), via answer generation module 312. Step 428 may proceed to step 424.

When query controller 302 determines to initiate hand-off to live agent server 120, step 418 proceeds to step 430. At step 430, query system 138 may initiate hand-off to live agent server 120, via agent server interface 314. Responsive to hand-off, CQ platform 102 may direct communication between client device 108 of user 106 and live agent 118 via chat bot interface 150. At step 432, after the hand-off and during a live chat between user 106 and live agent 118, chat bot 132 may continue to monitor user actions on a currently active website and maintain chat bot interface 150 on web pages of each website being accessed by user 106. At step 434, CQ platform 102 (e.g., via agent server interface 314) may receive and store results of communication (i.e., a live chat) between live agent 118 and user 106. At step 436, CQ platform 102 (e.g., via agent server interface 314) may receive an indication of termination of communication between user 106 and live agent 118, via live agent server 120. Step 436 may proceed to step 408.

FIG. 4 illustrates a general example of CQ platform for any application where automated conversational querying may be useful. FIGS. 5A-12 illustrates an example embodiment of CQ platform 102 for an application directed to an electronics components distribution website and querying of electronics parts.

FIGS. 5A-5D are flowchart diagrams of an example method of processing various intents according to an example set of intent query rules 304 associated with CQ platform 102, for an example electronics components distribution query environment, according to an aspect of the present disclosure. In FIGS. 5A-5D, query controller 302 causes query system 138 to perform various actions, according to example intent query rules 304, based on intent/entity(s) 214 received from intent analysis system 136.

Referring to FIG. 5A, when intent 214 is identified as "none," query controller 302 may activate answer generation module 312, causing chat bot 132, at step 500, to display one or more predefined questions (e.g., frequently asked questions (FAQs)) on chat bot interface 150. At step 502, it is determined whether a suggested question is selected on chat bot interface 150, e.g., via answer generation module 312. When a suggested question is selected, chat bot 132, at step 504, may generate an answer message based on the selection of the suggested question. Step 504 may proceed to step 424 (FIG. 4). At step 502, when a suggested question is not selected, step 502 may proceed to step 506, and answer generation module 312 may update the predefined questions. Step 506 may proceed to step 500.

When intent 214 is identified as "product search," query controller 302 may activate pre-processing module 308, to perform pre-processing of the identified search query information (e.g., to refine the search). At step 510, search engine 316, in conjunction with content source(s) API(s) 318, may search one or more content source(s) 128 for relevant parts related to the product. At step 512, it is determined whether one or more parts are available, for example, by chat bot 132. When one or more parts are determined to be available, a results message may be generated, at step 514, for example, by chat bot 132. Step 514 may proceed to step 424. At step 512, when it is determined that no parts are available, a no results available message may be generated, at step 516, for example, by chat bot 132. Step 516 may proceed to step 424.

In some examples, the "product search" intent may aid user 106 in searching for a part with a partial or full part number. In some examples, the results displayed on chat bot interface 150 may include a predetermined number of part results, (e.g., the six most relevant) with a view all link to a search results page. The results may also display a search results card showing part information such as part number, description, manufacturer name, stock, lead time etc. The results card may also provide one or more attributes of the product, such as price reduction, export control classification number (ECCN), ROHs compliance, etc. In some examples, the "product search" intent may also provide a filter products option, to filter search results by predetermined categories, such as in stock, ROHs compliance, EOL, etc.

When intent 214 is identified as "order status," query controller 302, at step 518, may initiate search engine 316, and search engine 316, in conjunction with content source(s) API(s) 318, may search one or more content source(s) 128 for any available orders. At step 520, it is determined whether orders are available, for example, by chat bot 132. When one or more orders are determined to be available, step 520 may proceed to step 514, and step 514 may proceed to step 424. At step 520, when it is determined that no orders are available, step 520 may proceed to step 516, and step 516 may proceed to step 424.

Referring next to FIG. 5B, when intent 214 is identified as "alternative product," query controller 302, at step 526, may initiate search engine 316, and search engine 316, in conjunction with content source(s) API(s) 318, may search one or more content source(s) 128 for any available alternative parts. In some examples, the "alternative product" intent may aid user 106 in searching for alternative parts for a particular product. At step 528, it is determined whether alternative parts are available, for example, by chat bot 132. When one or more alternative parts are determined to be available, step 528 may proceed to step 514, and step 514 may proceed to step 424. At step 528, when it is determined that no alternative parts are available, step 528 may proceed to step 516, and step 516 may proceed to step 424.

When intent 214 is identified as "project," query controller 302, at step 530, may initiate search engine 316, and search engine 316, in conjunction with content source(s) API(s) 318, may search one or more content source(s) 128 for any available projects. At step 532, it is determined whether projects are available, for example, by chat bot 132. When one or more projects are determined to be available, step 532 may proceed to step 514, and step 514 may proceed to step 424. At step 532, when it is determined that no orders are available, step 532 may proceed to step 516, and step 516 may proceed to step 424.

When intent 214 is identified as "project with filter," query controller 302, at step 534, may activate filter module 310, to apply a predetermined filter (e.g., parameters) for querying. Step 534 may proceed to step 530.

When intent 214 is identified as "project with browse," query controller 302, at step 536, may initiate a browse popular indication for querying. Step 536 may proceed to step 530.

Figure 5C:
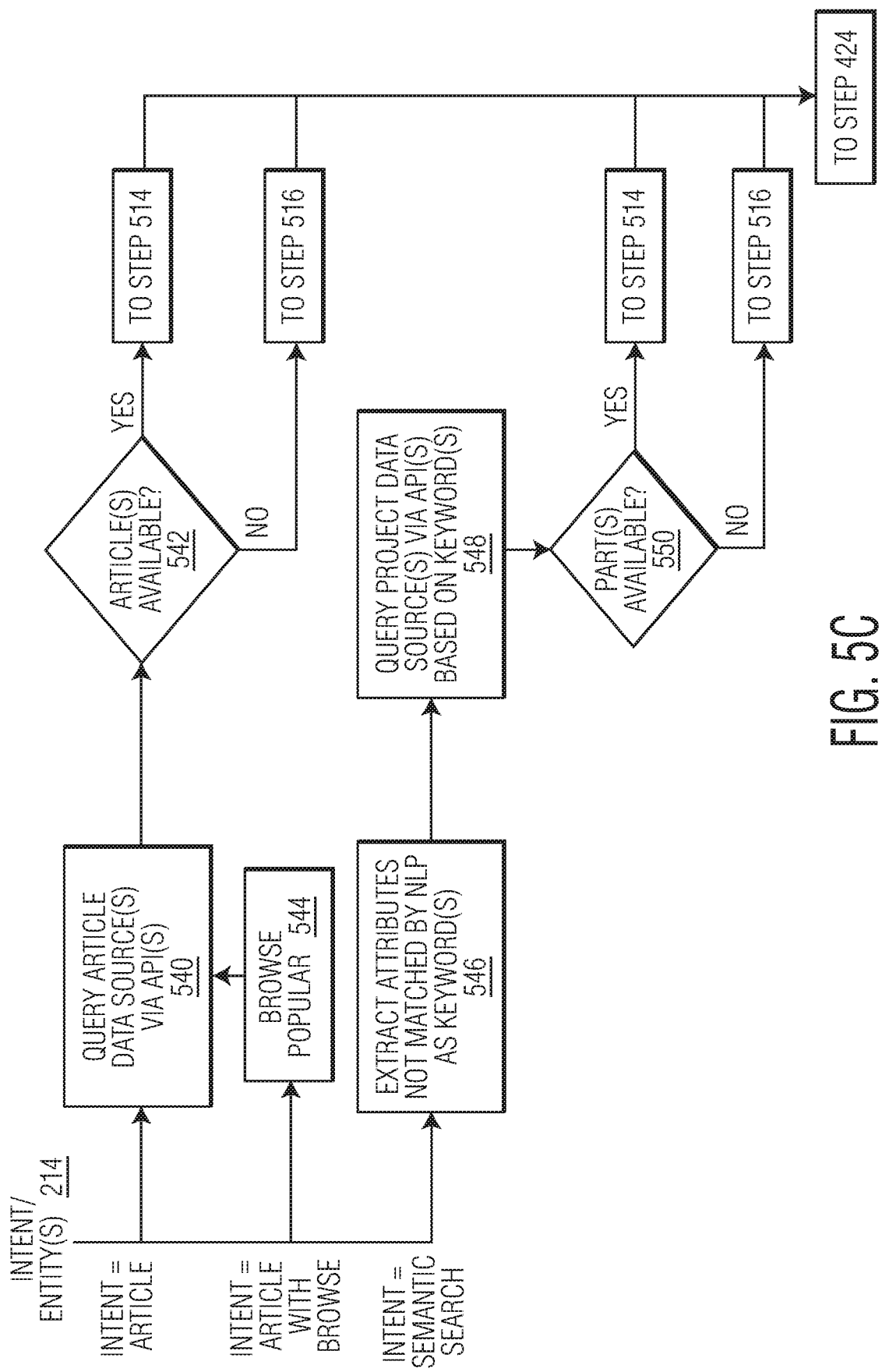

Referring to FIG. 5C, when intent 214 is identified as "article," query controller 302, at step 540, may initiate search engine 316, and search engine 316, in conjunction with content source(s) API(s) 318, may search one or more content source(s) 128 for any available articles. At step 542, it is determined whether articles are available, for example, by chat bot 132. When one or more articles are determined to be available, step 542 may proceed to step 514, and step 514 may proceed to step 424. At step 542, when it is determined that no articles are available, step 532 may proceed to step 516, and step 516 may proceed to step 424.

When intent 214 is identified as "article with browse," query controller 302, at step 544, may initiate a browse popular indication for querying. Step 544 may proceed to step 540.

In general, "project" and "article" intents may cause CQ platform 102 to fetch projects and articles from, for example, community sites such as Hackster and Element14. In some examples, CQ platform 102 may display a predetermined number of highest ranking results that may be relevant, with links to the original sites. In some examples, CQ platform 102 may include a view all link, in chat bot interface 150, that may redirect user 102 to the contents search results page of respective community sites, such as, Hackster or Element14.

When intent 214 is identified as "semantic search," query controller 302 may activate semantic search module 306, at step 546, to extract one or more attributes not matched by NLP module 202 and to create keyword(s) from the extracted attribute(s). At step 548, search engine 316, in conjunction with content source(s) API(s) 318, may search one or more content source(s) 128 for relevant parts related to the product based on the keyword(s). At step 550, it is determined whether one or more parts are available, for example, by chat bot 132. When one or more parts are determined to be available, step 550 may proceed to step 514, and step 514 may proceed to step 424. At step 550, when it is determined that no parts are available, step 550 may proceed to step 516, and step 516 may proceed to step 424.

Figure 5D:
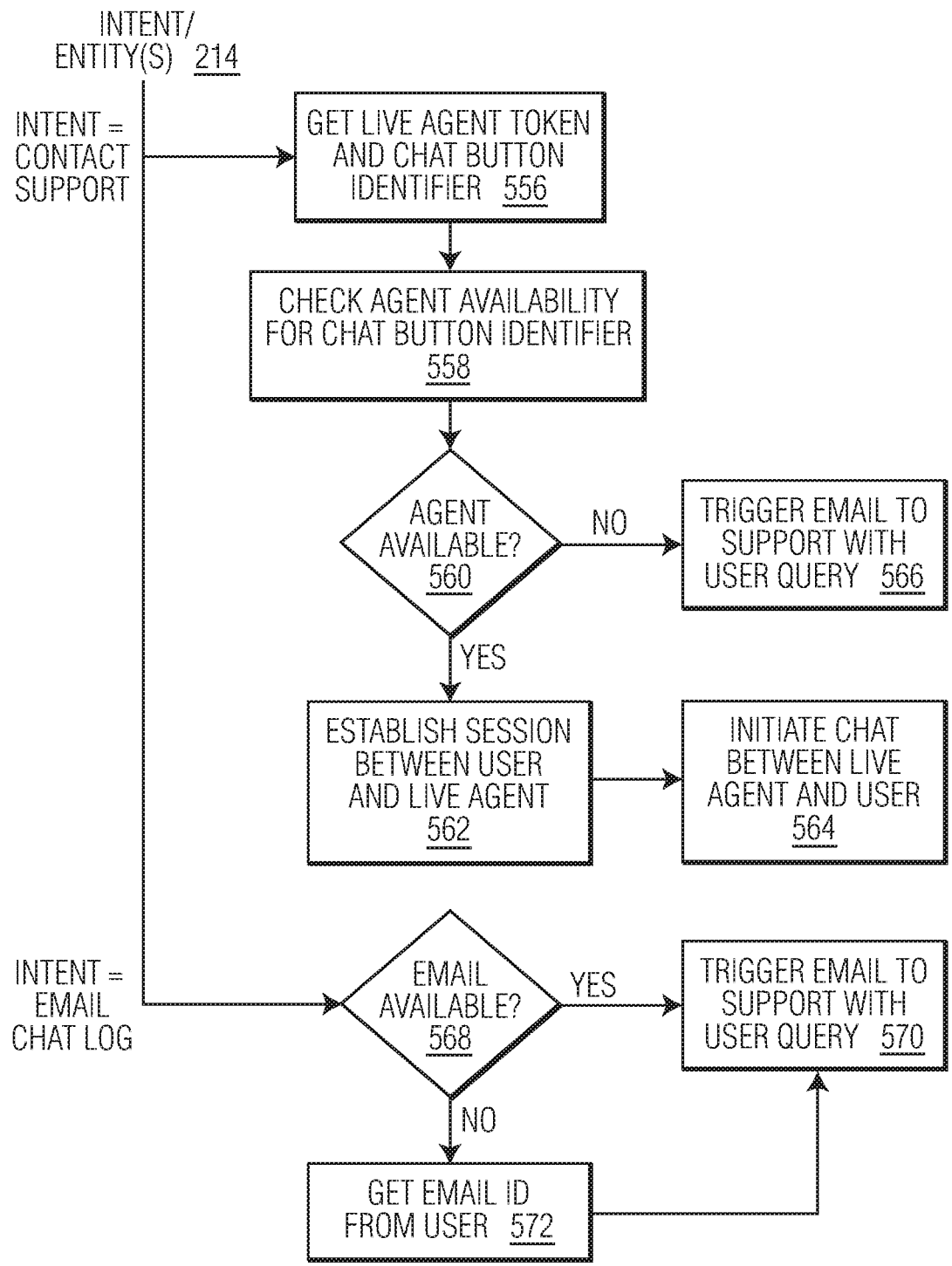

Referring to FIG. 5D, when intent 214 is identified as "contact support," query controller 302 may activate agent server interface 312, at step 556, to get a live agent token and a chat button identifier (e.g., a chat group identifier) via communication with live agent server 120, as part of a hand-off to live agent server 120 (for live chat with live agent 118). At step 558, agent server interface 312 may check for an agent availability for the chat button identifier via communication with live agent server 120. At step 560, it is determined whether an agent (associated with the chat button identifier) is available, for example, by communication between agent server interface 312 and live agent server 120. When an agent is determined to be available, step 560 may proceed to step 562, and agent server interface 312 may establish a session between client device 108 of user 106 and the available agent (e.g., live agent 118). At step 564, CQ platform 102 may initiate a live chat between live agent 118 and user 106 via chat bot interface 150. At step 560, when it is determined that no agents (associated with the chat button identifier) are available, step 560 may proceed to step 566, and agent server interface 312 may trigger an email to a suitable support contact of live agent server 120 with a user query obtained via chat bot interface 150. In general, the "contact support" intent may help user 106 to chat with live agent 118 through chat bot interface 150.

When intent 214 is identified as "email chat log," query controller 302 may activate agent server interface 312, and agent server interface 312 may determine whether an email of user 106 is available (e.g., via user information stored in a user account). When it is determined that an email of user 106 is available, step 568 may proceed to step 570, and agent server interface 312 may trigger an email to a suitable support contact of live agent server 120 with a user query (obtained via chat bot interface 150). The "email chat log" intent may allow CQ platform 102, for example, to send a copy of the conversation dialogs (e.g., chat bot dialog and/or live chat dialog) to the support email. When it is determined that an email of user 106 is not available, step 568 may proceed to step 572, and an email identifier (ID) may be obtained from user 106, for example, via chat bot interface 150. Responsive to receiving the email identifier, step 572 may proceed to step 570.

Figure 6:
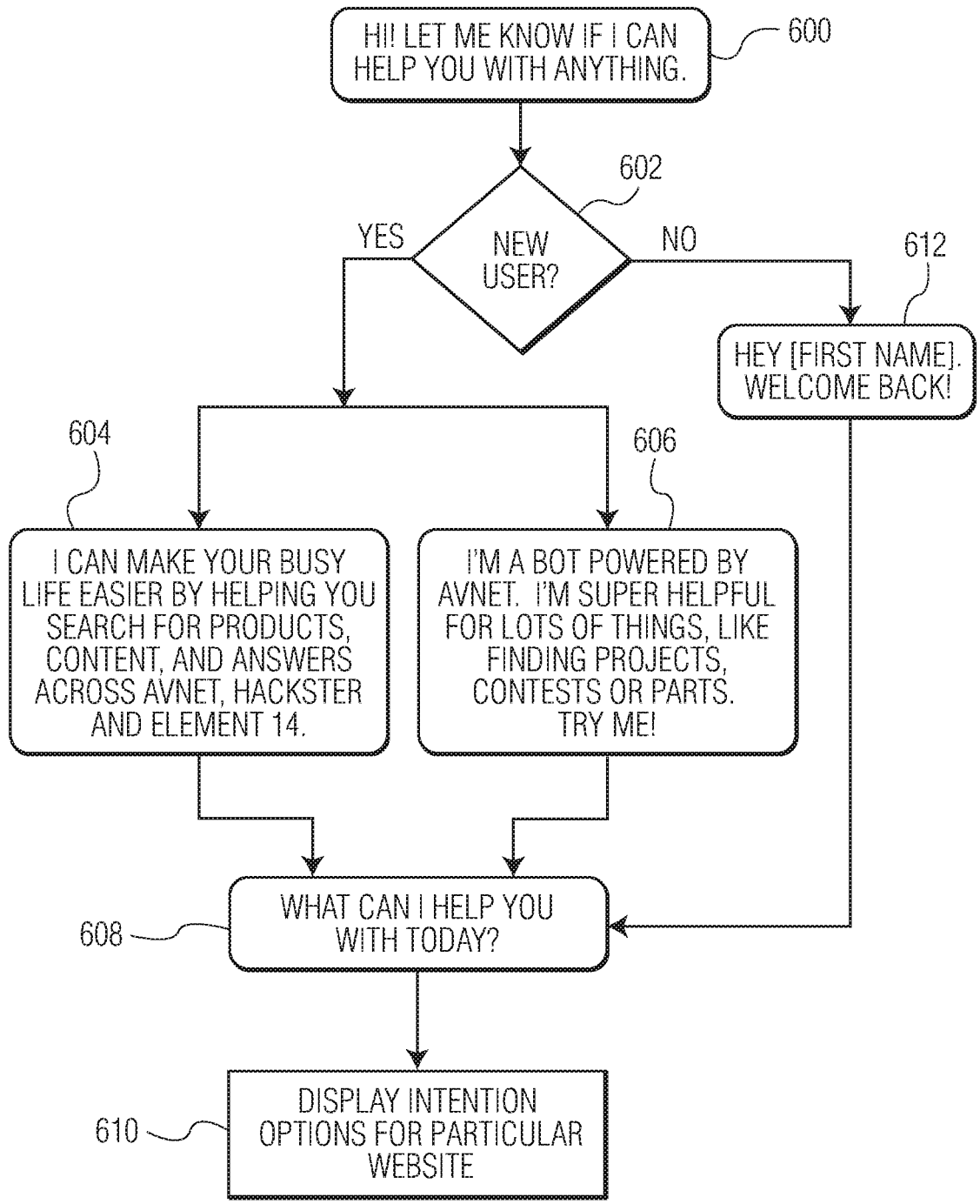
FIG. 6 is a flowchart diagram of an example method of initiating a chat bot interface for automated conversational querying associated with the CQ platform shown in FIG. 1, according to an aspect of the present disclosure.
Figure 7:
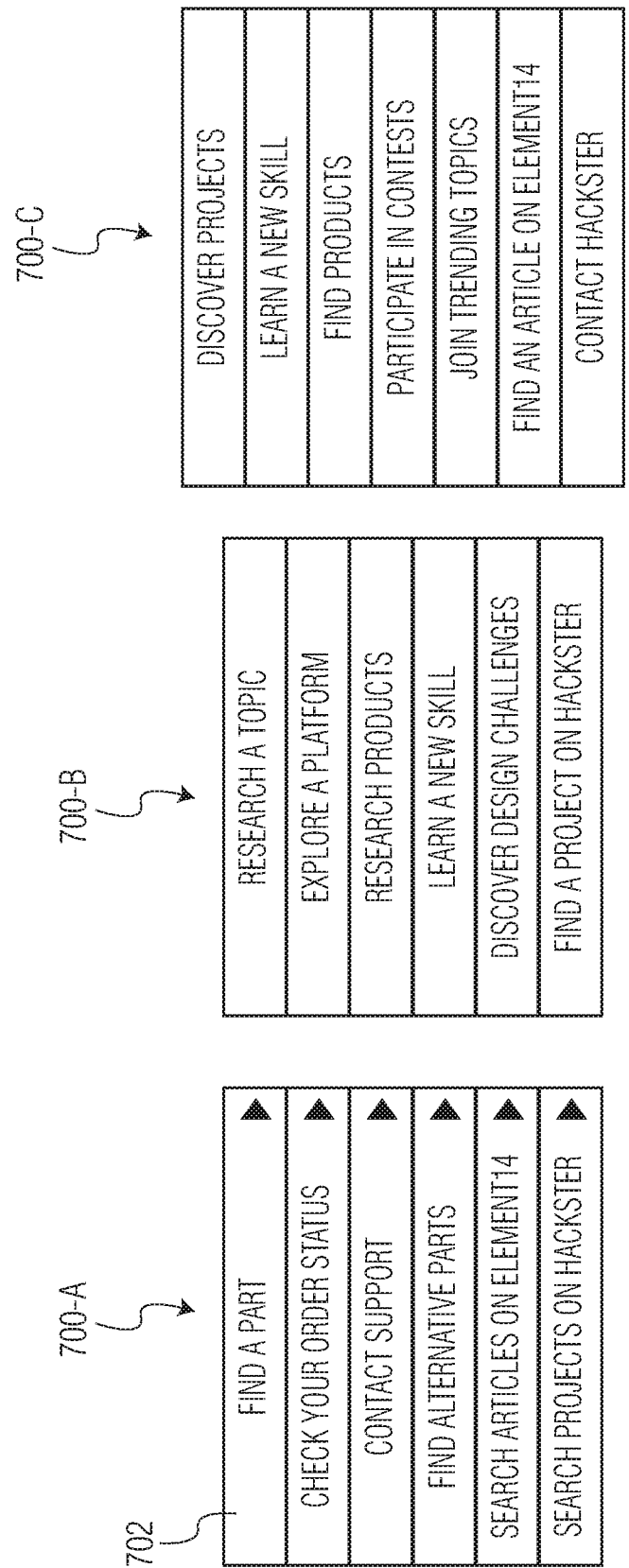
FIGS. 7A, 7B and 7C are example portions of a chat bot interface indicating intention options that may be displayed based on a particular website a user is currently navigating, upon initiation of the chat bot interface shown in FIG. 6, according to an aspect of the present disclosure.

FIG. 6 is a flowchart diagram of an example method of initiating chat bot interface 150 for automated conversational querying associated with CQ platform 102, according to an aspect of the present disclosure. In FIG. 6, it is assumed that chat bot 132 has created chat bot interface 150 on a currently displayed website of client device 108. At step 600, chat bot 132 may display a welcome message on chat bot interface 150. At step 602, chat bot 132 may determine whether user 106 is a new user (or a returning user). If it is determined that user 106 is a new user (e.g., based on previously stored user account information), step 602 proceeds to step 604 (or 606) and an introductory message may be displayed in chat bot interface 150. The introductory message may depend on the currently displayed website. For example, the introductory message in step 604 may be displayed for one particular website, while the introductory message in step 606 may be displayed for another website. Step 604 (or 606) may proceed to step 608, and a prompt message may be displayed on chat bot interface 150. At step 610, chat bot 132 may display intention options in chat bot interface 150 that may be website specific.

If it is determined, at step 602, that user 106 is not a new user (i.e., user is a returning user), step 602 may proceed to step 612 and an welcome message including user information specific to user 106 (e.g., user name) may be displayed in chat bot interface 150. Step 612 may proceed to step 608.

Figure 13A:
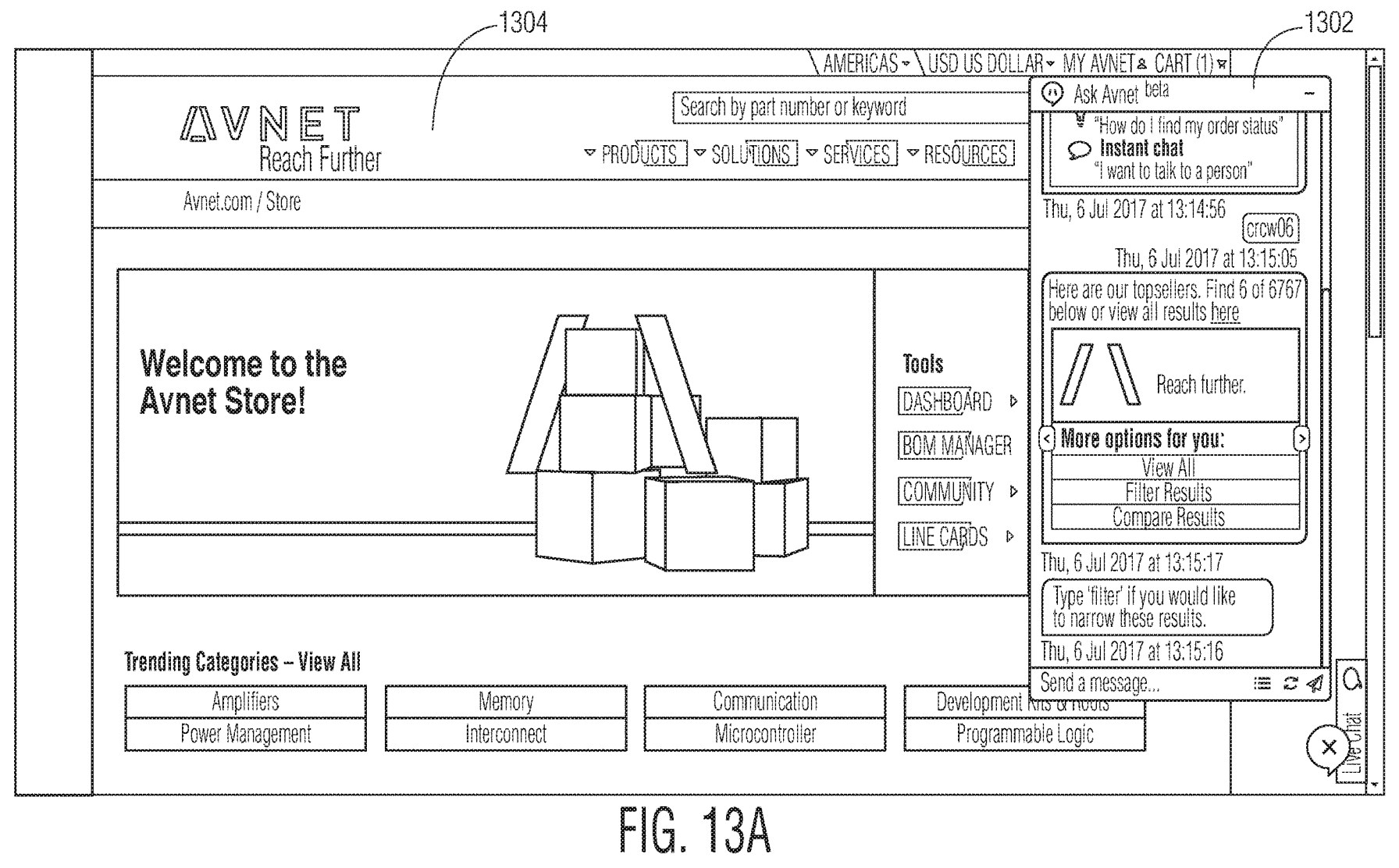
Figure 13B:
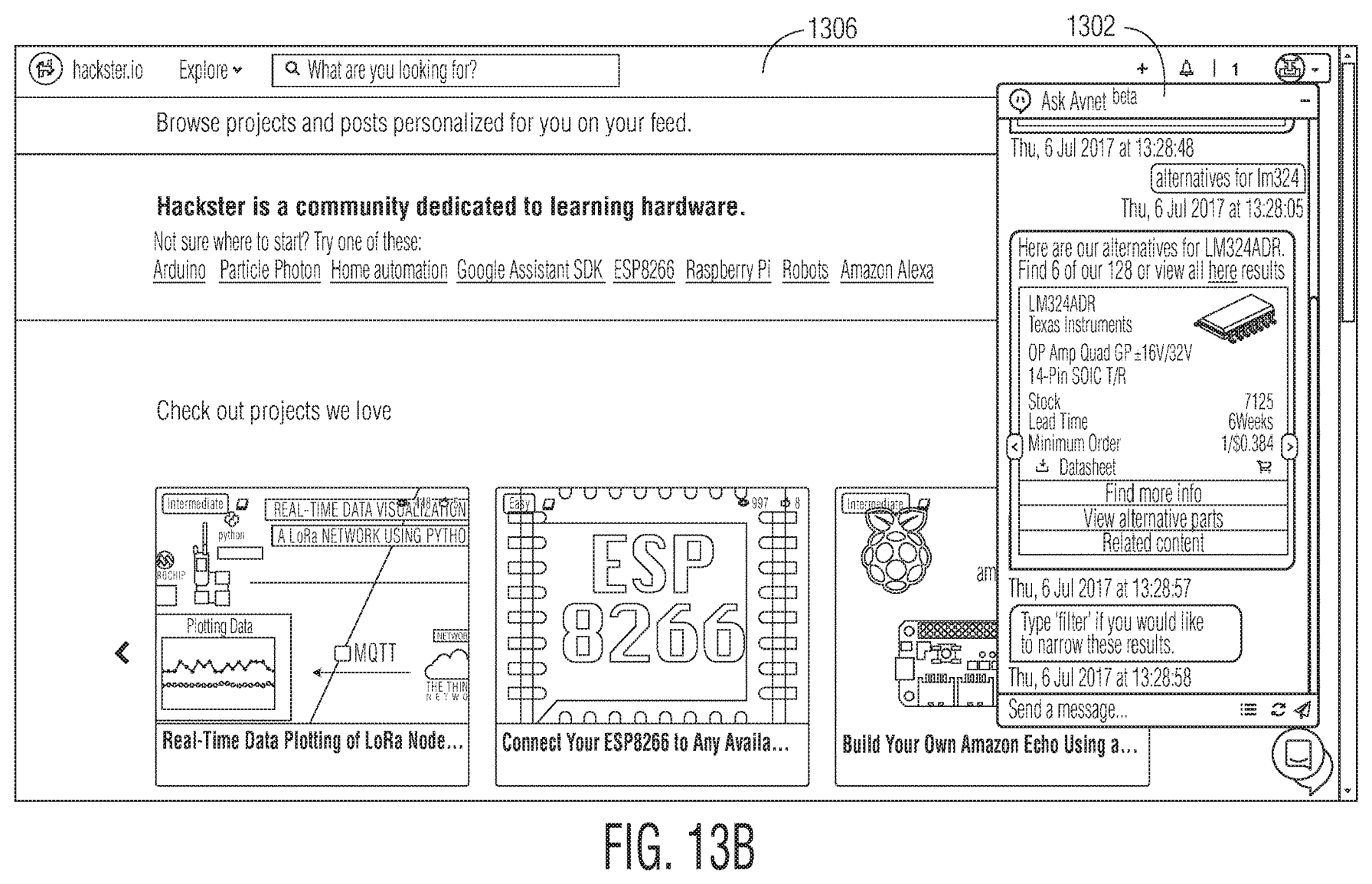
Figure 13C:
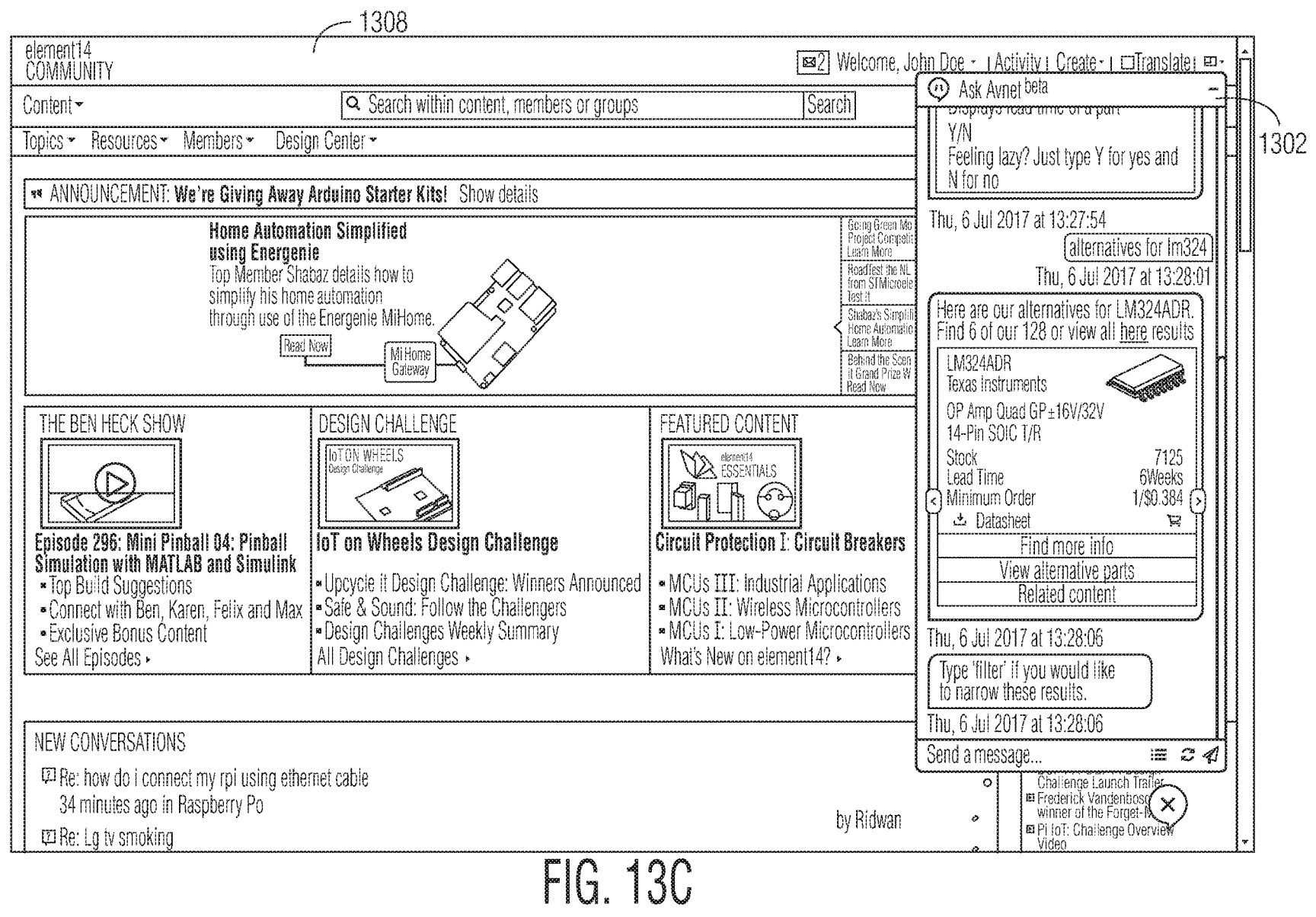

The display of chat bot interface 150 and intent options on various websites is described with respect to FIGS. 7A-7C and 13A-13C. In particular, FIGS. 7A-7C are example portions of chat bot interface 150, indicating example intention options that may be displayed (at step 610), based on a specific current website a user is navigating; and FIGS. 13A-13C are example screen shots of chat bot interface 150, generated on a web browser of client device 108, as chat bot interface window 1302 is positioned on three different and unconnected websites 1304, 1306 and 1308. More specifically, chat bot 132 may be configured to overlay and maintain chat bot interface window 1302 on each of independent websites 1304-1308 as user 106 navigates across websites 1304-1308.

For example, website 1304 may be associated with a platform-based website. Websites 1306 and 1308 represent two independent (i.e., non-platform associated), stand-alone websites (e.g., Hacskster community site 1306 and Element14 community site 1308). In other words, websites 1304, 1306 and 1308 are separately accessible by user 106, but are not associated with each other (i.e., websites 1304-1306 are unconnected websites). User 106 can separately navigate each website 1304-1308. However, without chat bot interface window 1302, user may only obtain information from each of websites 1304-1308, separately.

With chat bot interface window 1302, chat bot 132 may continue to identify user intent and provide information to user 106 from one or more content source(s) 128, even as user 1302 navigates across independent websites 1304-1308. In addition, chat bot 132 may provide different intent options depending on the website. For example, intent options 700-A (FIG. 7A) may be included in chat bot interface window 1302 as presented on website 1304 (FIG. 13A). In contrast, intent options 700-B (FIG. 7B) may be included in chat bot interface window 1302 as presented on website 1306 (FIG. 13B). Yet further, intent options 700-C (FIG. 7C) may be included in chat bot interface window 1302 as presented on website 1308 (FIG. 13C).

In addition, chat bot 132, via intent options 700, such as intention options 700-A (FIG. 7A), may provide links to one or more other independent websites for further information (while maintaining (single) chat bot interface window 1302 across different websites). Yet further, chat bot 132, through chat bot interface 150 (such as chat bot interface window 1302), may provide an automated conversational dialog with user 106 to better anticipate and identify user intent, for example, to provide more accurate query results. In this manner, CQ platform 102 may provide relevant and accurate information, as well as additional information that may be useful to user 106; while reducing the amount of time to identify relevant information and while reducing the need to hand-off communication to live agent 118.

Referring next to FIGS. 8-12, examples of conversational querying between client device 108 and CQ platform 102 are described, for respective examples of product querying, alternate product querying, article querying, project querying and general querying.

Figure 8:
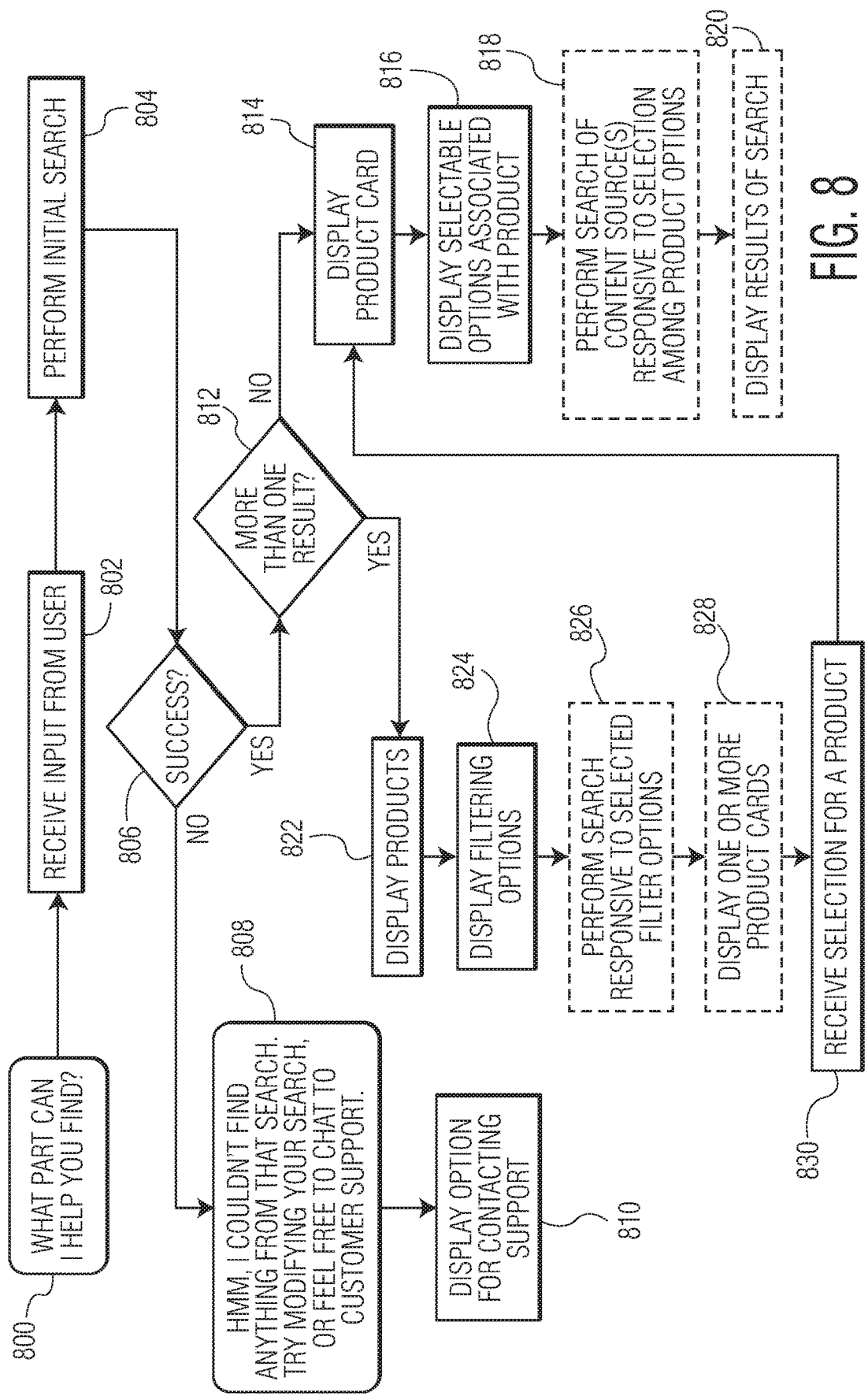
FIG. 8 is a flowchart diagram illustrating an example method of automated conversational querying between the client device and the CQ platform shown in FIG. 1, for product querying, according to an aspect of the present disclosure.

FIG. 8 is a flowchart diagram illustrating an example method of automated conversational querying between client device 108 and CQ platform 102, for product querying, according to an aspect of the present disclosure. At step 800, in response to identifying a product search intent, chat bot 132 may display a query request message in chat bot interface 150. At step 802, chat bot 132 may receive input from user 106, via chat bot interface 150. At step 804, CQ platform 102, via query system 138, may perform an initial search (as discussed above).

At step 806, CQ platform 102 may determine whether the search was successful (i.e., at least one result is determined). If, at step 806, it is determined that no results were identified (i.e., the search was unsuccessful), step 806 may proceed to step 808, and chat bot 132 may display a message on chat bot interface 150 indicate the unsuccessful search. At step 810, chat bot 132 may display an option for contacting support, on chat bot interface 150.

If, at step 806, it is determined that the search was successful, step 806 may proceed to step 812, and CQ platform 102 may determine whether more than one result is identified. If, only one result is identified, step 812 may proceed to step 814, and chat bot 132 may display a product card for the identified product, on chat bot interface 150. At step 816, chat bot 132 may further display selectable options associated with the product on chat bot interface 150, such as, without being limited to, a product page, attributes and related parts and content. Selection of one option may provide further selectable options such as related projects, articles and/or alternative products.

At optional step 818, query system 138 may perform a search of content source(s) 128 responsive to selection by user 106 of a product option (displayed in step 816). At optional step 820, results of any additional search, responsive to optional step 820, may be displayed on chat bot interface 150.

If at step 812, more than one result is identified, step 812 may proceed to step 822, and chat bot 132, via chat bot interface 150, may display the products identified by the search. At step 824, chat bot 132 may display one or more filtering options on chat bot interface 150. For example, filter options may include, without being limited to, in stock products, products without EOL notices, ROHS compliant products, products by manufacturer, products that are non-obsolete. At optional step 826, query system 138 may perform a search of content source(s) 128 responsive to selection by user 106 of a filter option (displayed in step 824). At optional step 828, one or more products resulting from any additional search, responsive to selection of filtering options, may be displayed on chat bot interface 150. At step 830, chat bot 150 may receive a selection for a product among the products displayed on chat bot interface 150. Step 830 may proceed to step 814.

Figure 9:
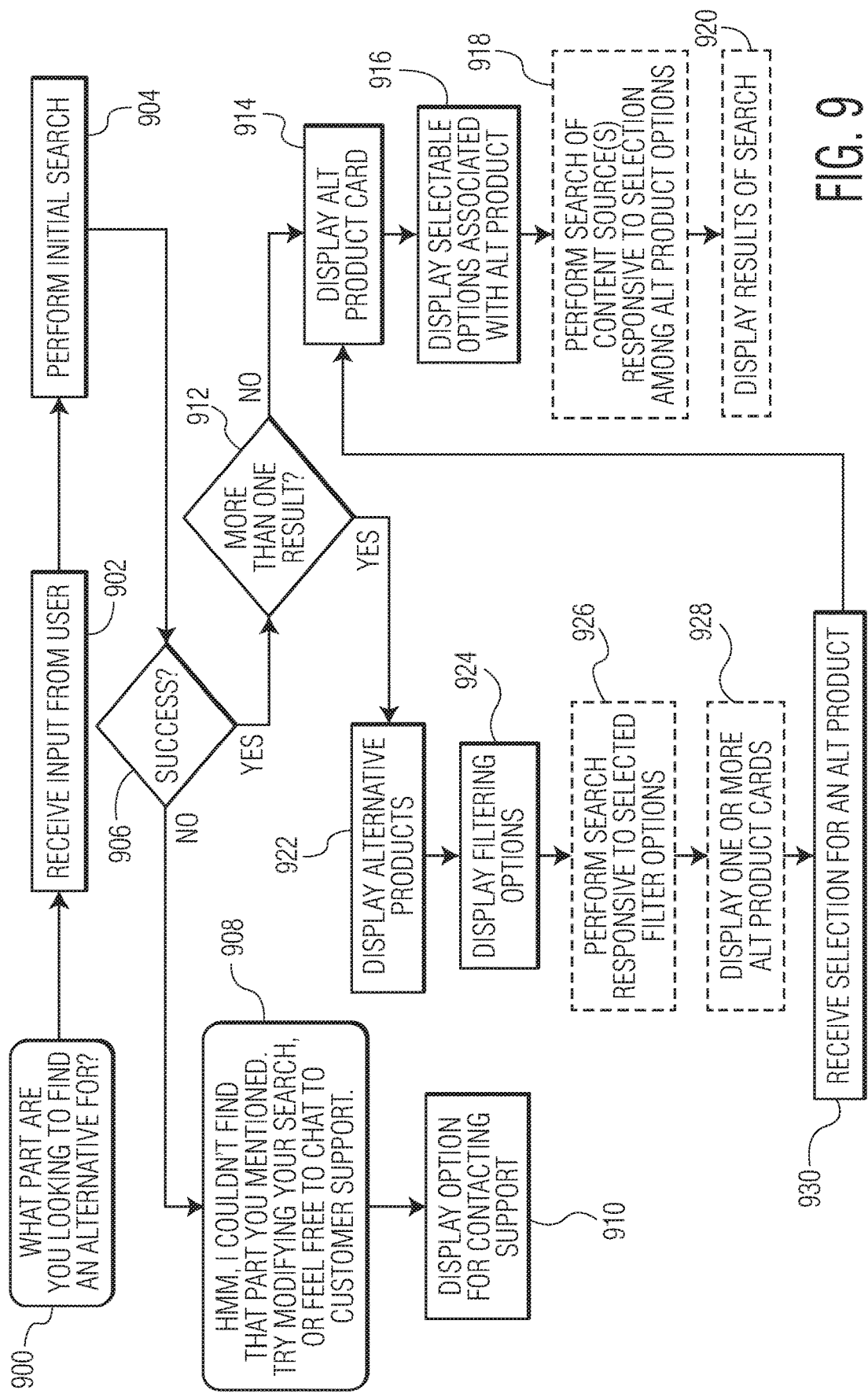
FIG. 9 is a flowchart diagram illustrating an example method of automated conversational querying between the client device and the CQ platform shown in FIG. 1, for alternative product querying, according to an aspect of the present disclosure.

FIG. 9 is a flowchart diagram illustrating an example method of automated conversational querying between client device 108 and the CQ platform 102, for alternative product querying, according to an aspect of the present disclosure. Steps 900-930 are similar to steps 800-830 (FIG. 8), except that steps 900-930 allow user 106 to query alternative parts for a product.

Figure 10:
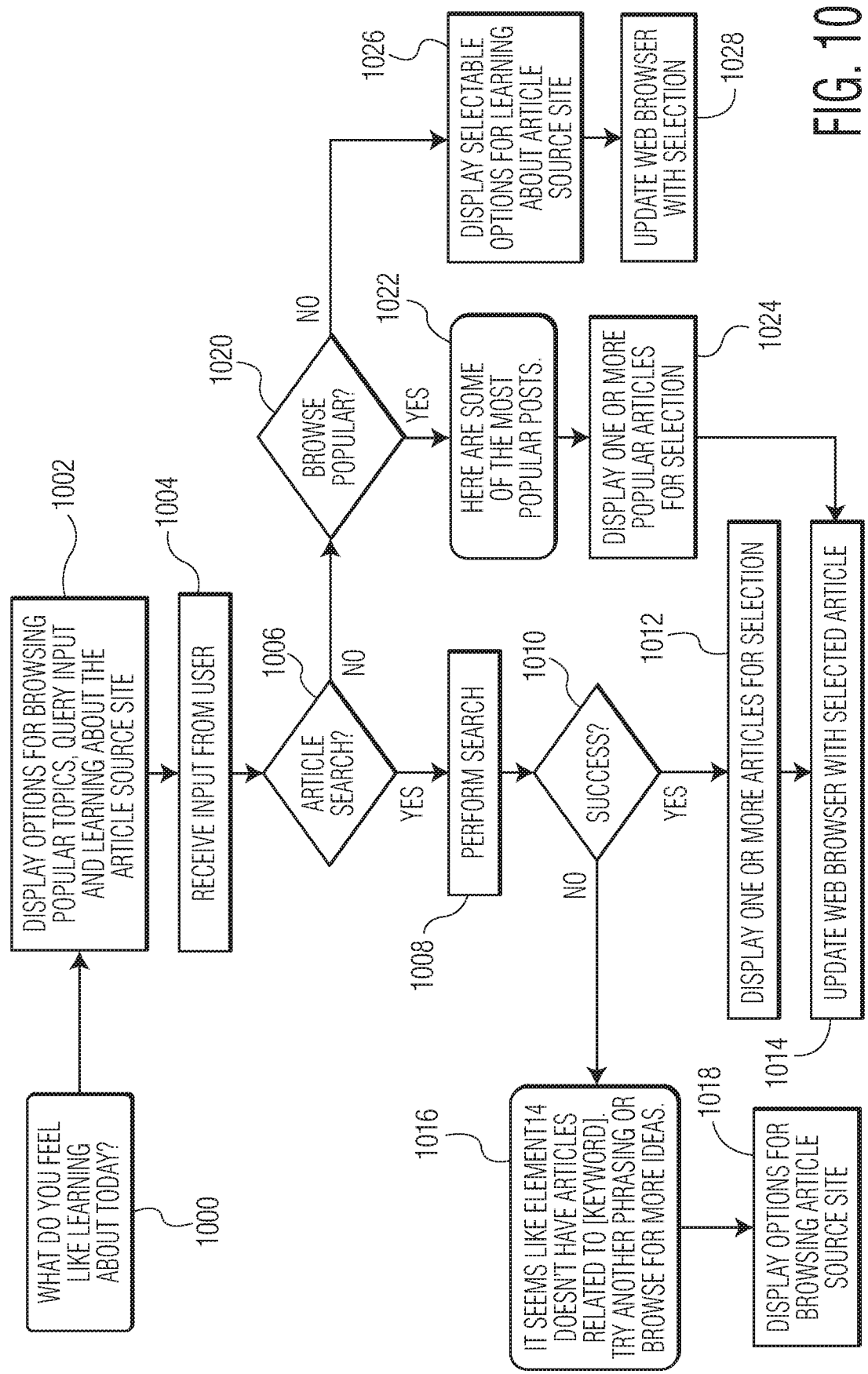
FIG. 10 is a flowchart diagram illustrating an example method of automated conversational querying between the client device and the CQ platform shown in FIG. 1, for article querying, according to an aspect of the present disclosure.

FIG. 10 is a flowchart diagram illustrating an example method of automated conversational querying between client device 108 and CQ platform 102, for article querying, according to an aspect of the present disclosure. At step 1000, in response to identifying an article search intent, chat bot 132 may display a query request message in chat bot interface 150. At step 1002, chat bot 132 may display options, for example, for browsing popular topics, query input and learn about article source website on chat bot interface 150. At step 1004, chat bot 132 may receive input from user 106, via chat bot interface 150, responsive to a selection of a displayed option.

At step 1006, query CQ platform 102 may determine whether the selected option relates to an article search. If, at step 1006, it is determined that the selected option relates to an article search, step 1006 may proceed to step 1008, and query system 138 may perform a search of content source(s) 128 for related articles.

At step 1010, CQ platform 102 may determine whether the search was successful (i.e., at least one article is identified). If, at step 1010, it is determined that the search was successful, step 1010 may proceed to step 1012, and CQ platform 102 may display one or more articles for selection on chat bot interface 150. At step 1014, chat bot 132 may update a web browser of client device 108 responsive to user input indicating an article selection.

If, at step 1010, it is determined that no articles were identified (i.e., the search was unsuccessful), step 1010 may proceed to step 1016, and chat bot 132 may display a message on chat bot interface 150 indicating an unsuccessful search. At step 1018, chat bot 132 may display one or more options for browsing at least one article source site, on chat bot interface 150.

If, at step 1006, it is determined that the selected option relates does not relate to an article search, step 1006 may proceed to step 1020. At step 1020, CQ platform 102 may determine whether the selected option relates to a browse popular selection, If, at step 1020, it is determined that the selected option relates to a browse popular option, step 1020 may proceed to step 1022. At step 1022, chat bot 132 may display a message indicating popular posts, and chat bot 132, at step 1024, may display one or more popular articles for selection on chat bot interface 150. Step 1024 may proceed to step 1014.

If, at step 1020, it is determined that the selected option does not relate to a browse popular option (i.e., the selected option may relate to a learning option), step 1020 may proceed to step 1026. At step 1026, chat bot 132 may display selectable options for learning about an article source website, on chat bot interface 150. At step 1028, chat bot 132 may update a web browser of client device 108 responsive to user input for a displayed selected option.

Figure 11:
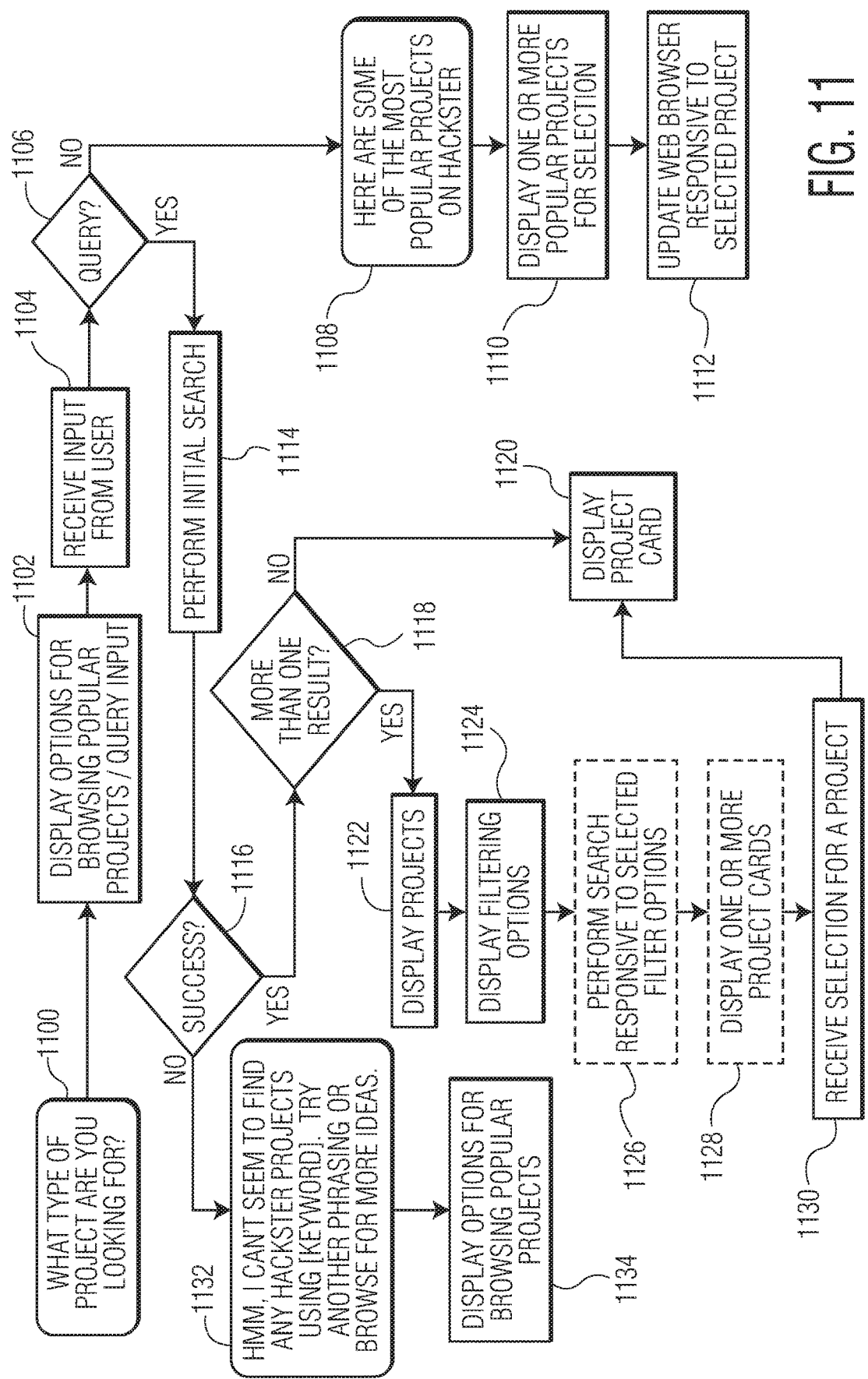
FIG. 11 is a flowchart diagram illustrating an example method of automated conversational querying between the client device and the CQ platform shown in FIG. 1, for project querying, according to an aspect of the present disclosure.

FIG. 11 is a flowchart diagram illustrating an example method of automated conversational querying between client device 108 and CQ platform 102, for project querying, according to an aspect of the present disclosure. At step 1100, in response to identifying a project search intent, chat bot 132 may display a query request message in chat bot interface 150. At step 1102, chat bot 132 may display options, for example, for browsing popular topics and query input, on chat bot interface 150. At step 1104, chat bot 132 may receive input from user 106, via chat bot interface 150, responsive to a selection of a displayed option.

At step 1106, query CQ platform 102 may determine whether the selected option relates to a query (i.e., a project search). If, at step 1106, it is determined that the selected option does not relates to a query, step 1106 may proceed to step 1108. At step 1108, chat bot 132 may display a message indicating popular projects, and chat bot 132, at step 1110, may display one or more popular projects for selection on chat bot interface 150. At step 1112, chat bot 132 may update a web browser of client device 108 responsive to user input for a displayed selected option.

If, at step 1106, it is determined that the selected option relates to an project search, step 1106 may proceed to step 1114, and query system 138 may perform a search of content source(s) 128 for related projects. At step 1116, CQ platform 102 may determine whether the search was successful (i.e., at least one project is identified).

If, at step 1116, it is determined that the search was successful, step 1116 may proceed to step 1118, and CQ platform 102 may determine whether more than one result is identified. If, only one result is identified, step 1118 may proceed to step 1120, and chat bot 132 may display a project card for the identified project, on chat bot interface 150. User 106 may select the project card to obtain additional inform regarding the project.

If at step 1118, more than one result is identified, step 1118 may proceed to step 1122, and chat bot 132, via chat bot interface 150, may display the projects identified by the search. At step 1124, chat bot 132 may display one or more filtering options on chat bot interface 150. For example, filter options may include, without being limited to, filtering by difficulty (e.g., easy, intermediate, advanced, hard, etc.) and/or by type of project (e.g., showcase, protip, teardown, tutorial, work in progress, etc.). At optional step 1126, query system 138 may perform a search of content source(s) 128 responsive to selection by user 106 of a filter option (displayed in step 1124). At optional step 1128, one or more projects resulting from any additional search, responsive to selection of filtering options, may be displayed on chat bot interface 150. At step 1130, chat bot 150 may receive a selection for a project among the projects displayed on chat bot interface 150. Step 1130 may proceed to step 1120.

Figure 12:
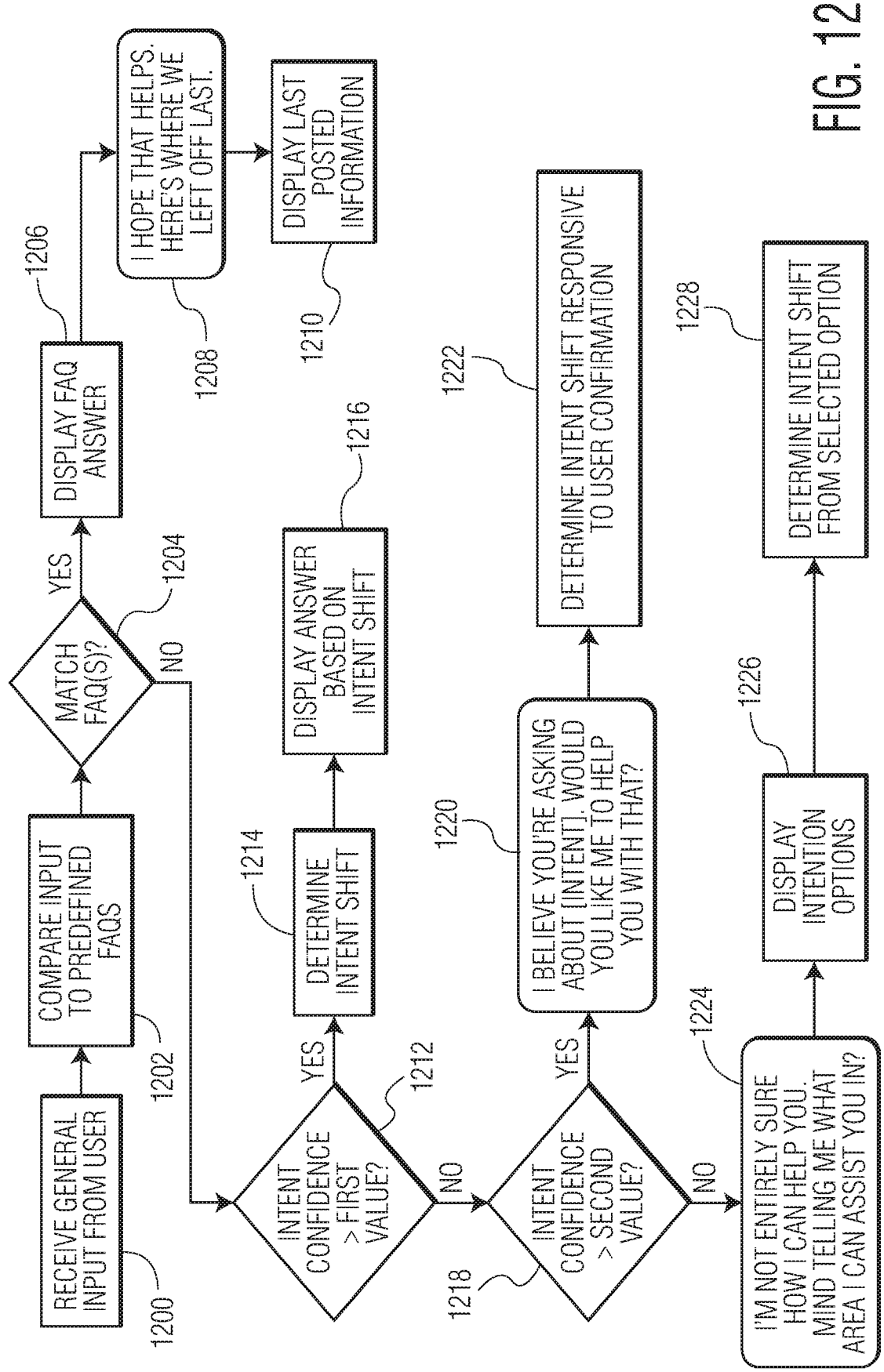
FIG. 12 is a flowchart diagram illustrating an example method of automated conversational querying between the client device and the CQ platform shown in FIG. 1, for general intent querying, according to an aspect of the present disclosure.

FIG. 12 is a flowchart diagram illustrating an example method of automated conversational querying between client device 108 and CQ platform 102, for general intent querying, according to an aspect of the present disclosure. At step 1200, chat bot 132 may receive general input from user 106, via chat bot interface 150. Query system 138 may identify the intent as being none (e.g., not matching a predetermined type of intent), and may proceed to step 1202. At step 1202, query system 138 may compare the general input to predefined frequently asked questions (e.g., via answer generation module 312). At step 1204, CQ platform 102 may determine whether the general input matches any predefined frequently asked questions.

If, at step 1204, it is determined that a match exists, step 1204 may proceed to step 1206, and chat bot 132 may display a corresponding answer to the matched frequently asked question, in chat bot interface 150. At step 1208, chat bot 132, via chat bot interface 150, may display a transition message and, at step 1210, may display last posted information on chat bot interface 150, based on an intent history for user 106.

If, at step 1204, it is determined that a match does not exist, step 1204 may proceed to step 1212. At step 1212, CQ platform 102 may compare a confidence value (or level or other suitable measure), determined by intent analysis system 136, to a first value. If, at step 1212, CQ platform 102 determines that the confidence value is greater than a first value, step 1212 may proceed to step 1214. In one non-limiting example, the first value may be about 90%. At step 1214, CQ platform 102 may determine an intent shift based on the general input, and may determine an answer based on the intent shift. At step 1216, chat bot 132 may display the answer on chat bot interface 150.

If, at step 1212, CQ platform 102 determines that the confidence value is less than the first value, step 1212 may proceed to step 1218, and CQ platform 102 may determine whether the confidence value is greater than a second value (that is less than the first value).

If, at step 1218, CQ platform 102 determines that the confidence value is greater than the second value, step 1218 may proceed to step 1220. In one non-limiting example, the second value may be about 50%. At step 1220, CQ platform 102 display a message on chat bot interface 150 providing a guess of the user's intent. At step 1222, CQ platform 102 may determine an intent shift responsive to user confirmation of the guessed user intent.

If, at step 1218, CQ platform 102 determines that the confidence value is less than the second value, step 1218 may proceed to step 1224. At step 1224, chat bot 132 may display a message indicating that CQ platform 102 is unsure of the user's intent and, at step 1226, chat bot 132 may display one or more intention options on chat bot interface 150. At step 1228, CQ platform 102 may determine an intent shift responsive to user selection of an intention option.

FIGS. 14A-14Q show example screen shots of chat bot interface window 1302, for various example user intents. FIGS. 14A-14Q also illustrate that a conversation dialog over a communication may be scrollable by user 106 on chat bot interface window 1302. In this manner, a user can review the communication session history.

Figure 14D:
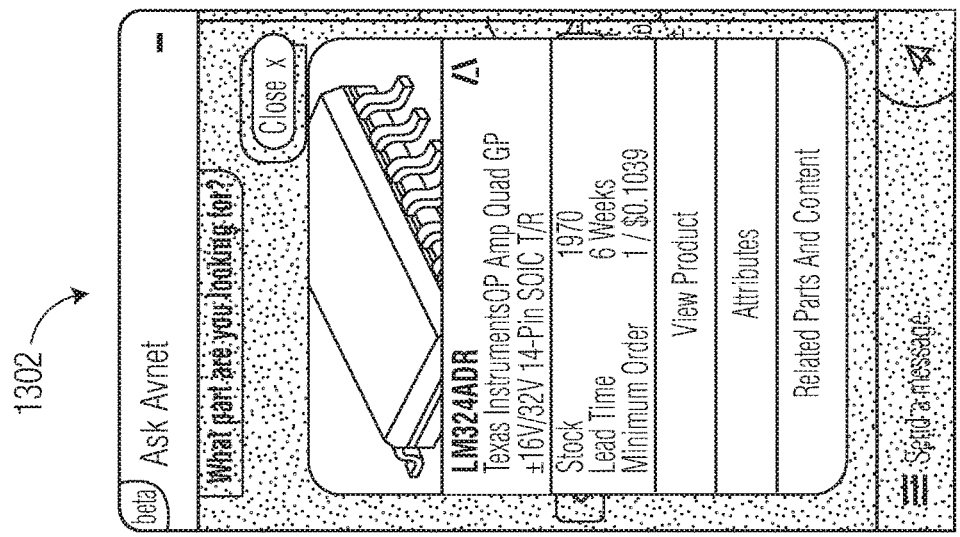

FIG. 14A illustrates chat bot interface window 1302 with a welcome message 1402 and intent options 1404, as may be displayed as a pop-up window on website 1304, for example, when user 106 clicks on a chat bot icon on platform-based website 1304. Chat bot interface window 1302 may provide information on services provided by CQ platform 102, useful commands and short cuts etc. FIG. 14B illustrates an example product search results display on chat bot interface window 1302 for a product query, including product information 1406 and filter selector 1408. FIG. 14C illustrates an example product search display on chat bot interface window 1302 with example filter options, after selection of filter selector 1408. FIG. 14B illustrates an example product search results display for product query, including product information 1406 and filter option 1408. FIG. 14D illustrates an example product view display on chat bot interface window 1302.

Figure 14E:
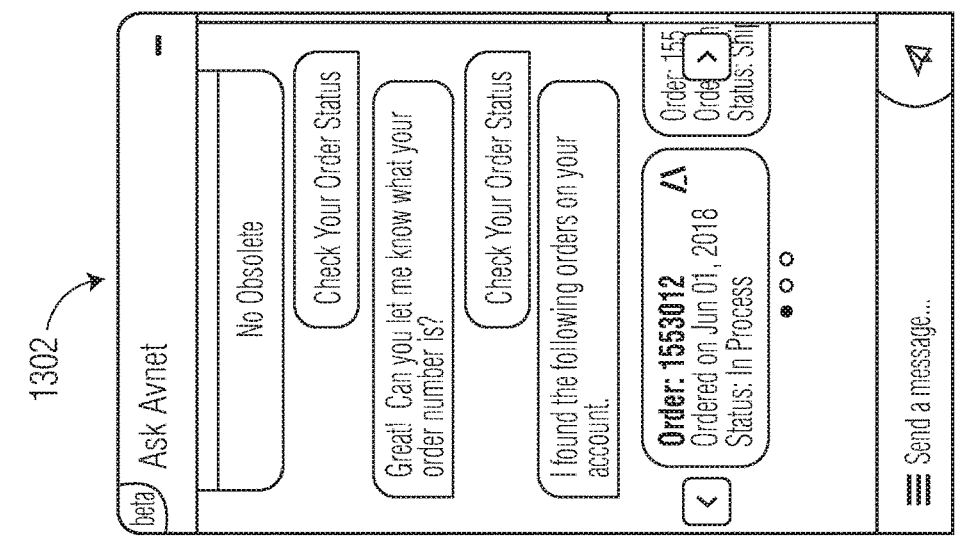
Figure 14F:
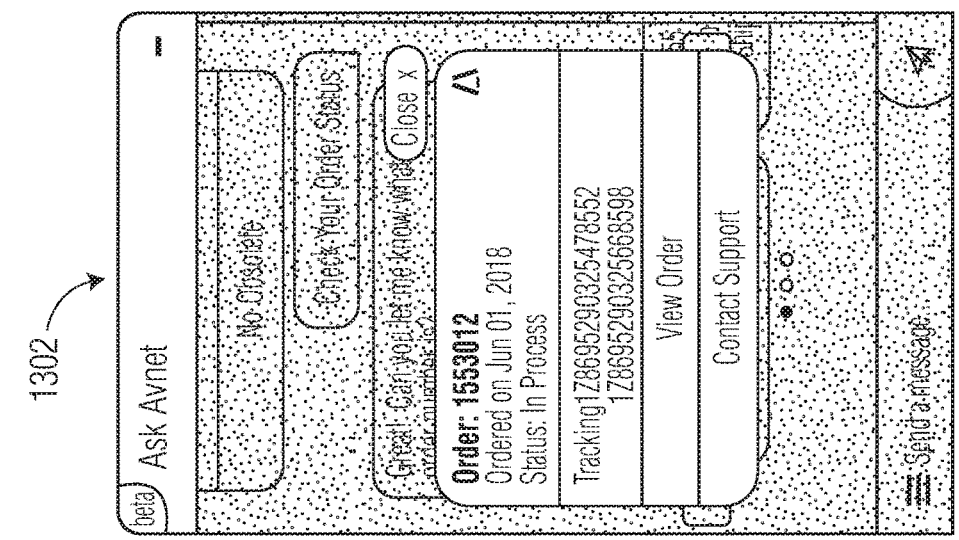
Figure 14G:
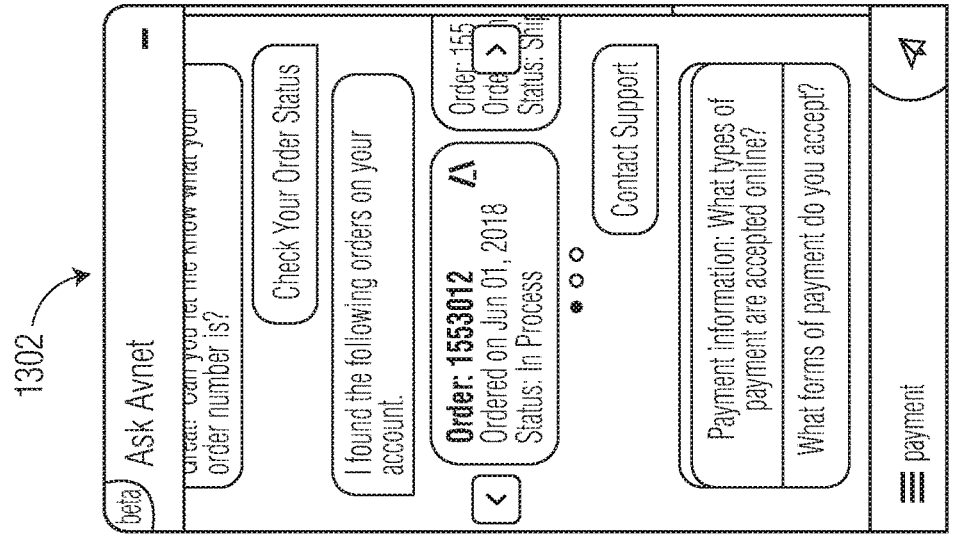

FIG. 14E illustrates an example order status display on chat bot interface window 1302 for an order status query. FIG. 14F illustrates an example order status display on chat bot interface window 1302 for an order status query, illustrating example order details. FIG. 14G illustrates an example frequently answer questions automatic suggestions display on chat bot interface window 1302.

Figure 14H:
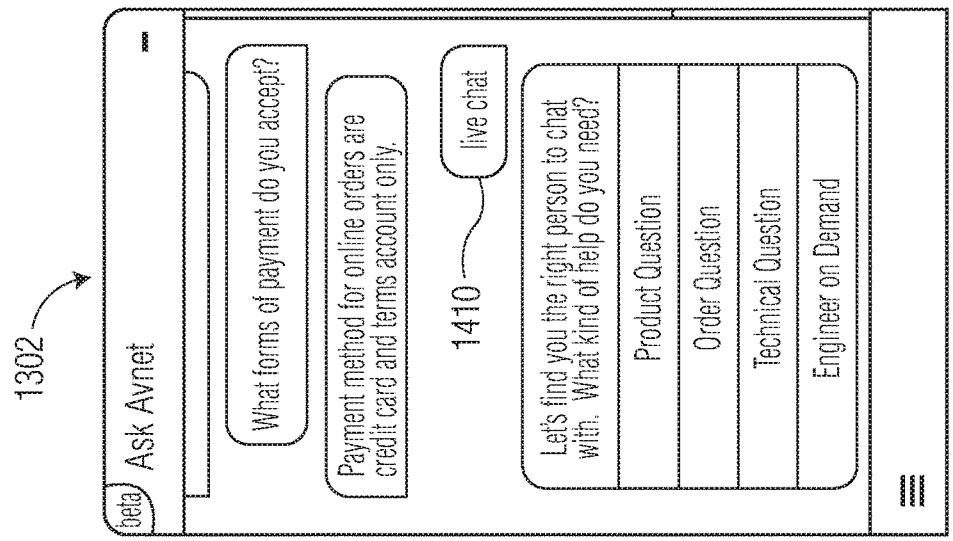
Figure 14I:
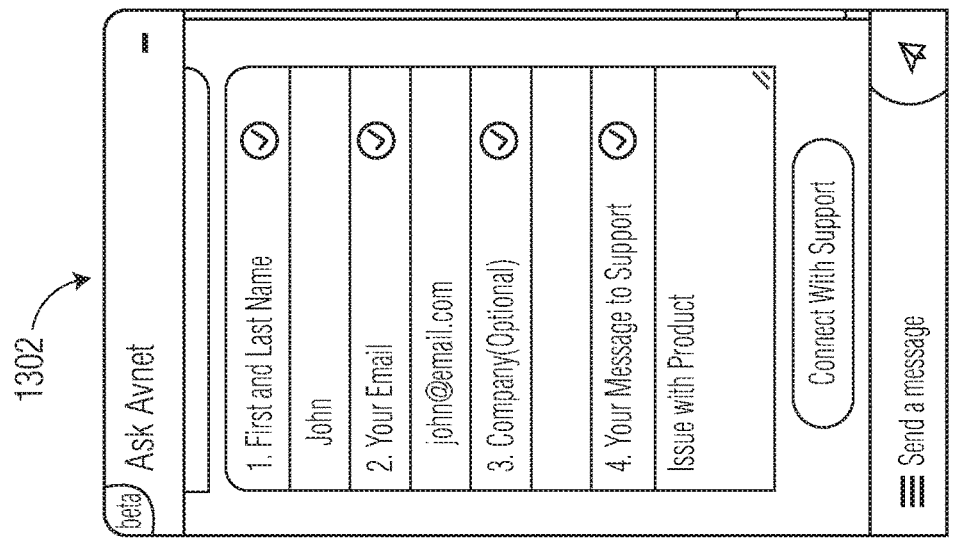

FIG. 14H illustrates an example display on chat bot interface window 1302 when live chat button 1310 is selected. FIG. 14I illustrates an example live chat form displayed on chat bot interface window 1302 after live chat is selected, for input of user information and information for discussion in the live chat. FIG. 14J illustrates an example display on chat bot interface window 1302 during establishment of a live chat connection. FIG. 14K illustrates an example live chat display on chat bot interface window 1302 during a live chat session with live agent 118. FIG. 14K also illustrates end live chat button 1412 by which user 106 may end the live chat.

Figure 14L:
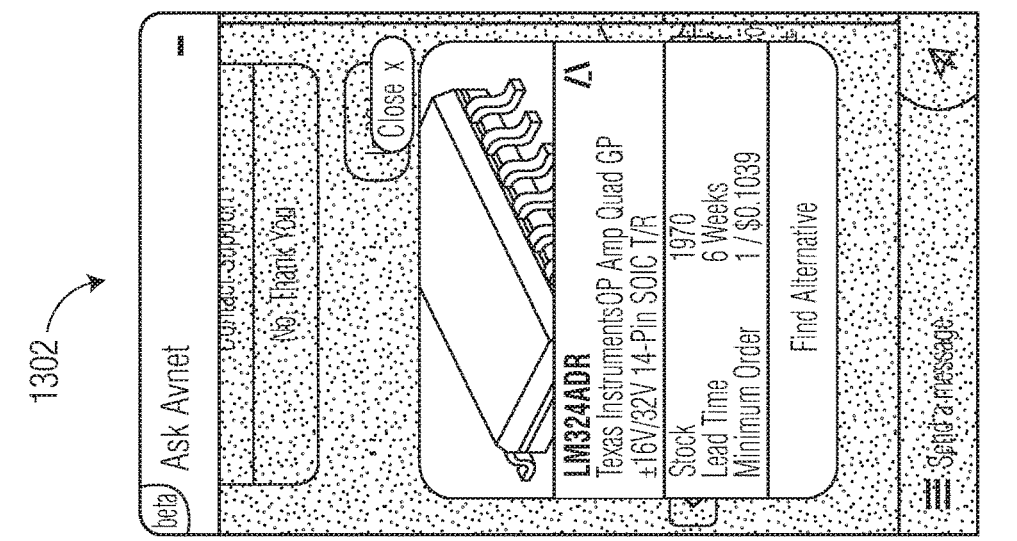
Figure 14K:
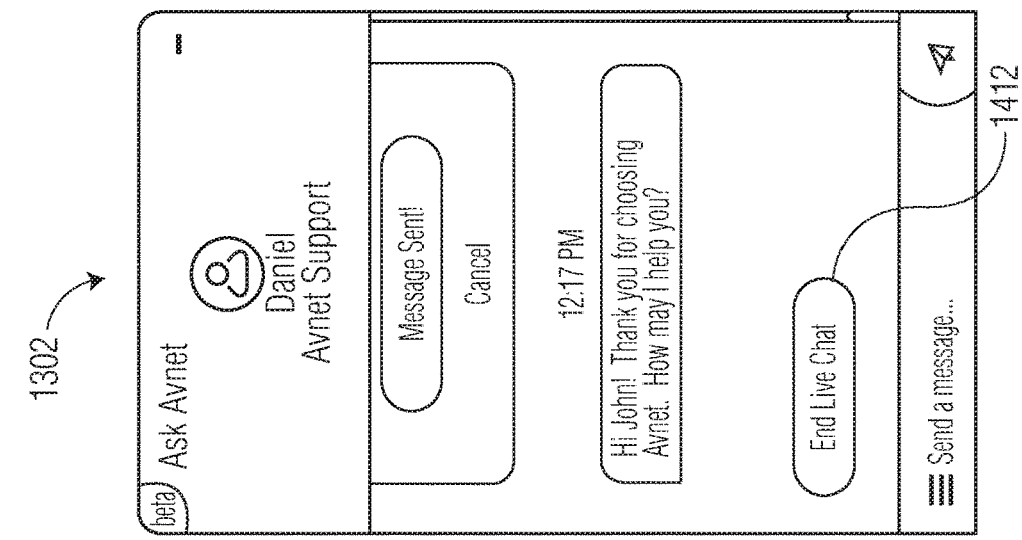
Figure 14J:
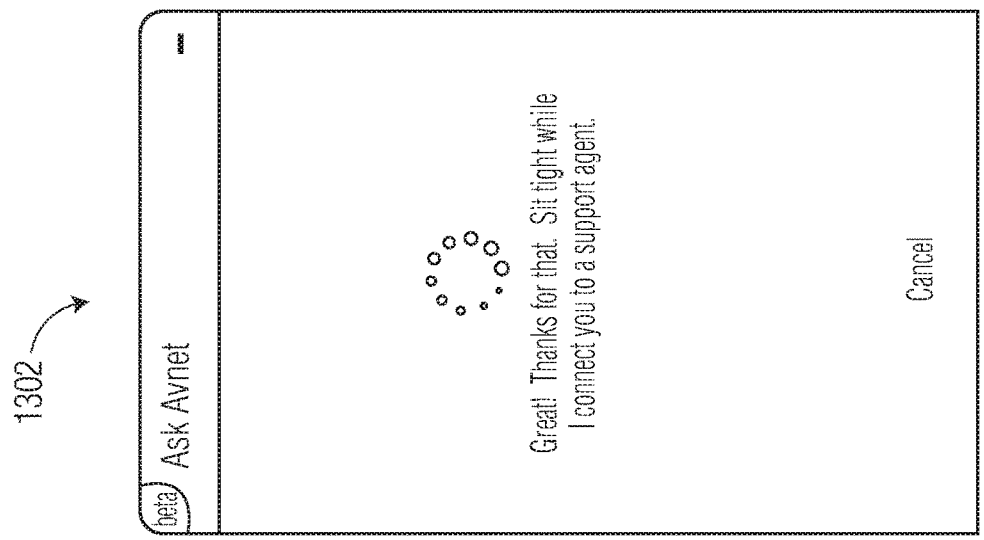
Figure 14M:
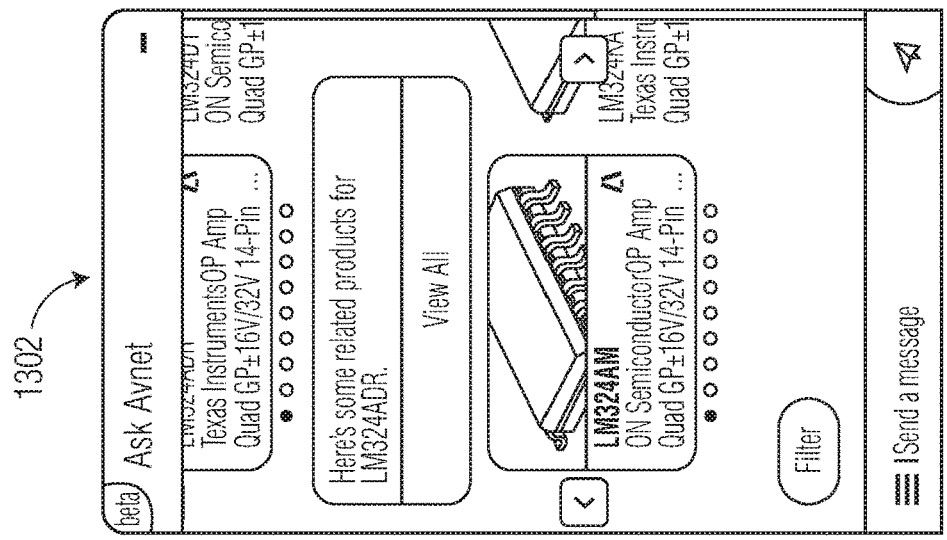

FIG. 14L illustrates an example find alternatives selection option on chat bot interface window 1302 for finding alternative products for a product. FIG. 14M illustrates a find alternatives display on chat bot interface window 1302 for an alternative products query.

Figure 14N:
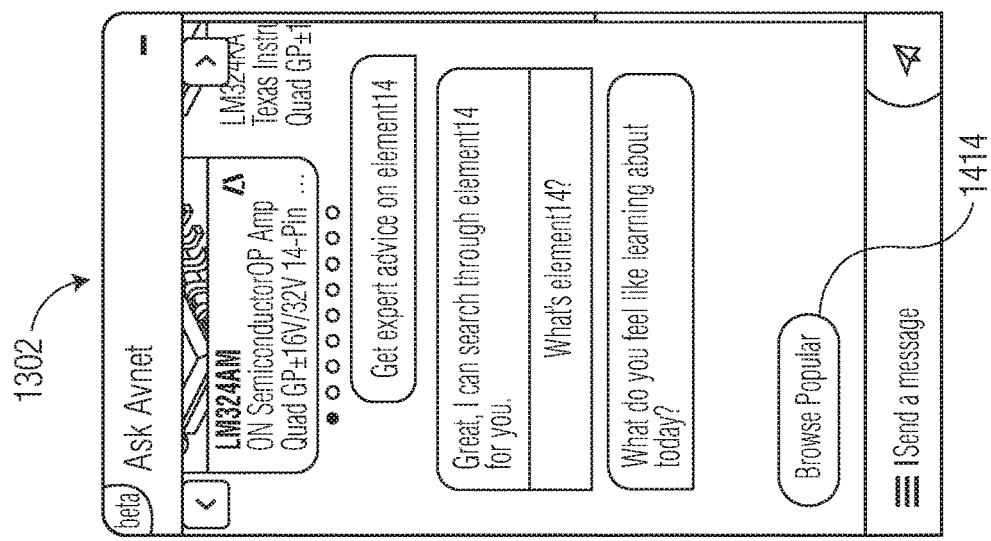
Figure 14O:
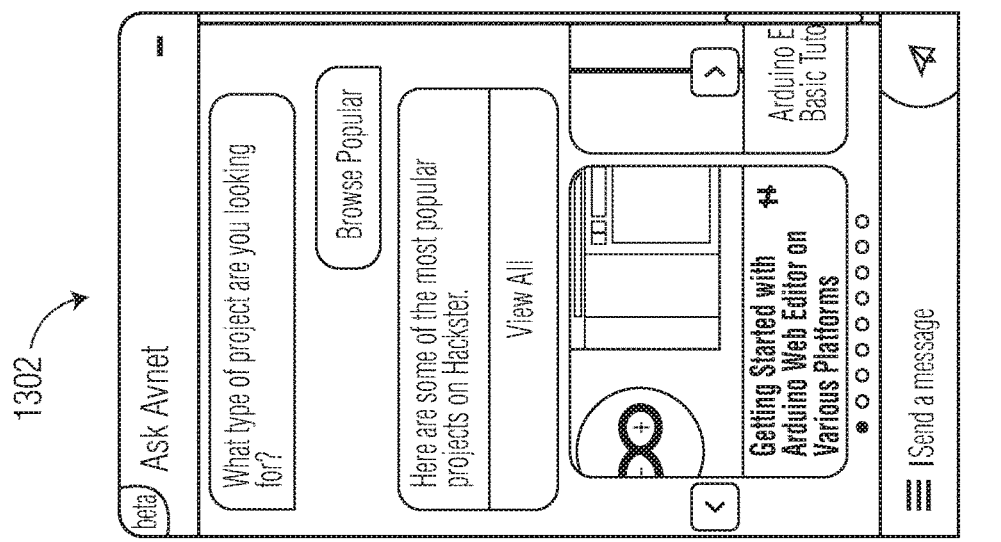

FIG. 14N illustrates an example find articles query display on chat bot interface window 1302 for finding relevant articles. FIG. 14N also indicates browse popular selection option 1414 for browsing popular articles. FIG. 14O illustrates an example find project query display on chat bot interface window 1302 for finding relevant projects.

FIG. 14P illustrates example feedback buttons 1416 on chat bot interface window 1302 for providing feedback to chat bot 132 regarding CQ platform 102 (e.g., relevancy of results, ability of chat bot 132 to identify intents, etc.). FIG. 14Q illustrates example selection of positive feedback 1418-1 and negative feedback 1418-2 on chat bot interface window 1302.

Systems and methods of the present disclosure may include and/or may be implemented by one or more specialized computers or other suitable components including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, personal computers (PCs), mobile devices, and other terms. It will be understood by those of ordinary skill that those terms used herein are interchangeable, and any special purpose computer capable of performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) and/or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic exchange system, such as any device capable of receiving, transmitting, processing and/or using data and information. The computer may comprise a server, a processor, a microprocessor, a personal computer, such as a laptop, palm PC, notebook computer, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television or any other computing and/or communication device.

The term "network" shall refer to any type of network or networks, including those capable of being utilized in connection with the conversational querying platform described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Figure 18:
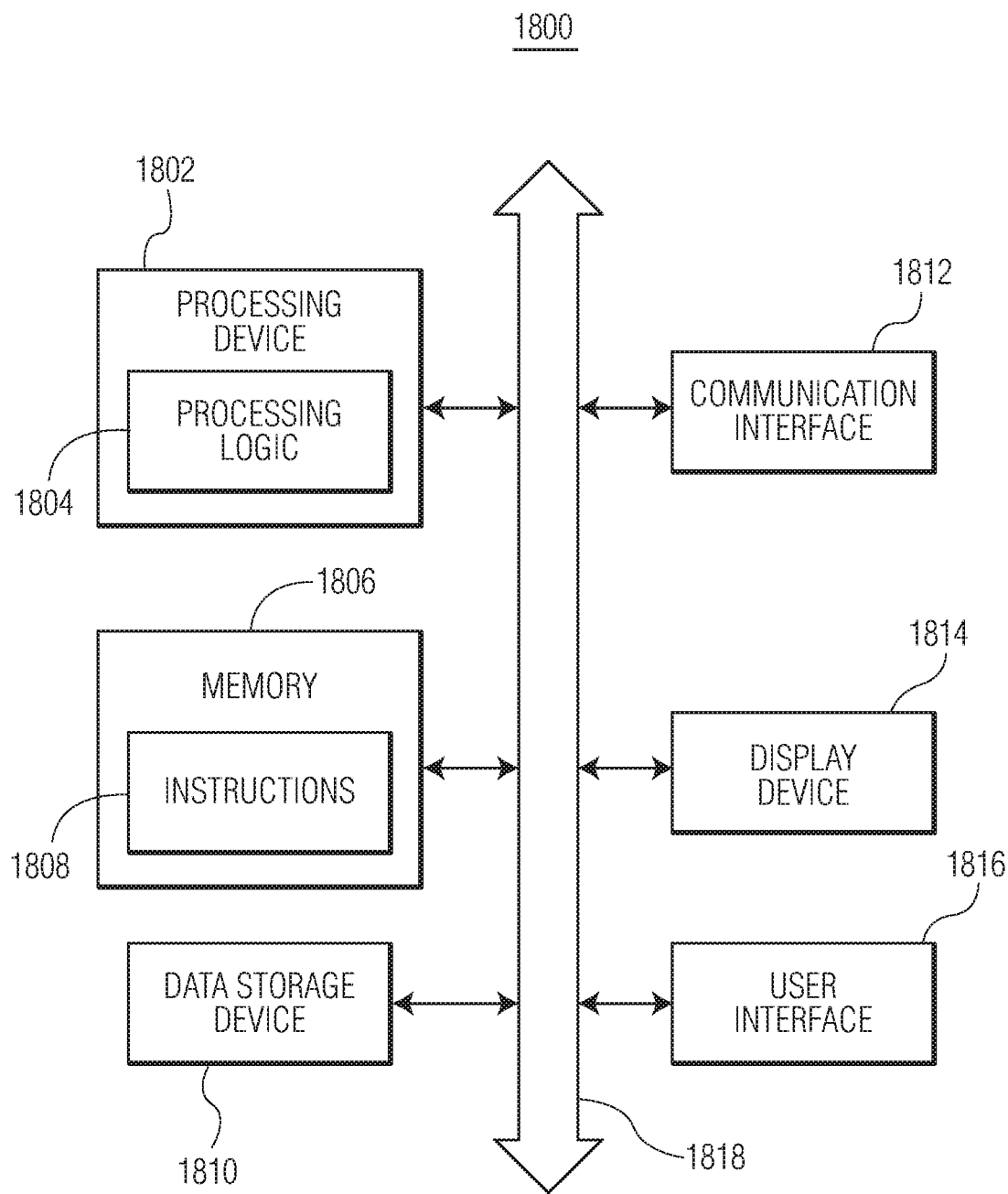
FIG. 18 is a functional block diagram of an example computer system, according to an aspect of the present disclosure.

FIG. 18 illustrates a functional block diagram of a machine in the example form of computer system 1800 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, CQ platform 102, client device 108, administrator console 116, live agent server 120, analytics server 122 and/or content sources 128 (FIG. 1) may be implemented by the example machine shown in FIG. 18 (or a combination of two or more of such machines).

Example computer system 1800 may include processing device 1802, memory 1806, data storage device 1810 and communication interface 1812, which may communicate with each other via data and control bus 1818. In some examples, computer system 1800 may also include display device 1814 and/or user interface 1816.

Processing device 1802 may include, without being limited to, a microprocessor, a central processing unit, an application specific integrated circuit (ASIC), a field programmable gate array (FPGA), a digital signal processor (DSP) and/or a network processor. Processing device 1802 may be configured to execute processing logic 1804 for performing the operations described herein. In general, processing device 1802 may include any suitable special-purpose processing device specially programmed with processing logic 1804 to perform the operations described herein.

Memory 1806 may include, for example, without being limited to, at least one of a read-only memory (ROM), a random access memory (RAM), a flash memory, a dynamic RAM (DRAM) and a static RAM (SRAM), storing computer-readable instructions 1808 executable by processing device 1802. In general, memory 1806 may include any suitable non-transitory computer readable storage medium storing computer-readable instructions 1808 executable by processing device 1802 for performing the operations described herein. Although one memory device 1806 is illustrated in FIG. 18, in some examples, computer system 1800 may include two or more memory devices (e.g., dynamic memory and static memory).

Computer system 1800 may include communication interface device 1812, for direct communication with other computers (including wired and/or wireless communication) and/or for communication with a network. In some examples, computer system 1800 may include display device 1814 (e.g., a liquid crystal display (LCD), a touch sensitive display, etc.). In some examples, computer system 1800 may include user interface 1816 (e.g., an alphanumeric input device, a cursor control device, etc.).

In some examples, computer system 1800 may include data storage device 1810 storing instructions (e.g., software) for performing any one or more of the functions described herein. Data storage device 1810 may include any suitable non-transitory computer-readable storage medium, including, without being limited to, solid-state memories, optical media and magnetic media.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system for automated conversational querying, the system comprising:
   a client device associated with a user, the client device comprising a web client and graphical user interface;
   one or more content sources, at least one of the content sources including a website;
   a conversational query platform associated with the website, the conversational query platform embodied on at least one computing device comprising memory and a processor executing instructions stored in the memory, the conversational query platform in communication with the client device, and the one or more content sources via at least one network, the conversational query platform comprising:
      a chat bot comprising a machine learning engine, the chat bot configured to generate an interface window, such that the interface window is overlaid on the website when the website is displayed on the graphical user interface of the client device via the web client, the chat bot configured to generate an automated conversational dialog with the user via the interface window, and to receive user input from the client device via the interface window, responsive to the automated conversational dialog,
      an intent analysis system configured to identify an intent from the user input received from the client device, and
      a query system configured to automatically query at least one source among the one or more content sources and obtain query results, based on the identified intent, the chat bot configured to display the query results on the interface window,
   wherein the website includes at least a first website and a second website that is unconnected to the first website, the conversational query platform being configured to position the interface window over a portion of each of the first website and the second website when a web browser displays a current website among the first website and the second website, such that a same interface window is overlaid on each of the first website and the second website and displays the query results from among the one or more content sources regardless of the currently displayed website.

2. The system according to claim 1, wherein the one or more content sources includes an unconnected further website, the conversational query platform being configured to automatically overlay the interface window on the further website when the client device navigates from the website to the further website via the web client.

3. The system according to claim 2, where the conversational query platform is configured to modify selectable content displayed on the interface window in accordance with one of the website and the further website displayed on the client device.

4. The system according to claim 1, wherein the interface window comprises at least one of one or more selectable intent options, a text box for text input, a region for displaying the query results, text message dialog provided by the chat bot, a live chat selection option, a selectable related content option and a user feedback button.

5. The system according to claim 1, wherein the interface window provides a scrollable history of communication between the chat bot and the user, any query results determined by the conversational query platform and actions by the user on the interface window.

6. The system according to claim 1, wherein the intent analysis system includes a natural language processor configured to identify the intent from the user input and at least one entity associated with the intent, based on a predefined vocabulary specific to a predetermined querying domain which mirrors a vocabulary of one or more types of users associated with the querying domain.

7. The system according to claim 6, wherein the query system includes a semantic search module configured to identify one or more additional attributes not identified by the natural language processor from the user input, the query system automatically querying the at least one source based on at least the one or more additional attributes.

8. The system according to claim 1, wherein the query system includes a pre-processing module configured to refine query information from the identified intent, based on one or more predetermined parameters, prior to automatically querying the at least one source.

9. The system according to claim 1, wherein the query system includes an answer generation module configured to further match the user input to one or more predetermined questions, when the identified intent includes a predefined type, and to determine the query results based on one or more predetermined answers to the one or more predetermined questions.

10. The system according to claim 1, wherein the conversational query platform is configured to store an intent history of identified intents of the user over a conversation session between the chat bot and the user, and the conversational query platform is configured to generate the automated conversational dialog based on at least one of one or more user actions on the website, the identified intent, the intent history and the query results.

11. The system according to claim 1, the conversational query platform further comprising an agent server interface configured to communicate with a live agent server associated with a live agent, for directing communication between the live agent server and the client device via the interface window.

12. The system according to claim 11, wherein the interface window displays a live chat between the live agent associated with the live agent server and the client device, and stores a history of the live chat.

13. A method for automated conversational querying, the method comprising:

displaying, on a graphical user interface of a client device associated with a user, a website via a web client of the client device;

generating, by a chat bot of a conversational query platform associated with the website, an interface window, such that the interface window is overlaid on the website displayed on the graphical user interface of the client device, the chat bot comprising a machine learning engine, the conversational query platform embodied on at least one computing device comprising memory and a processor executing instructions stored in the memory, the conversational query platform in communication with the client device, and one or more content sources via at least one network;

generating, by the chat bot, an automated conversational dialog with the user via the interface window, the automated conversational dialog including a prompt for user input based on at least a current action of the user on at least one of the interface window and the website;

receiving, by the chat bot, via the interface window, user input from the client device responsive to the prompt in the automated conversational dialog;

identifying, by an intent analysis system of the conversational query platform, an intent from the user input received from the client device;

automatically querying, by a query system, at least one source among the one or more content sources and obtaining one or more query results, based on the identified intent; and displaying, by the chat bot, on the interface window, at least a portion of the one or more query results as part of the automated conversational dialog, wherein the website includes at least a first website and a second website that is unconnected to the first website, the method further comprising positioning, by the conversational query platform, the interface window over a portion of each of the first website and the second website when a web browser displays a current website among the first website and the second website, such that a same interface window is overlaid on each of the first website and the second website and displays the query results from among the one or more content sources regardless of the currently displayed website.

14. The method according to claim 13, the method further comprising identifying, by the intent analysis system, the intent from the user input and at least one entity associated with the intent, according to natural language processing and based on a predefined vocabulary specific to a predetermined querying domain which mirrors a vocabulary of one or more types of users associated with the querying domain.

15. The method according to claim 13, the method further selecting a querying process by comparing the identified intent to a set of predetermined intent query rules.

16. The method according to claim 15, wherein the querying process includes at least one of:

refining query information from the identified intent, based on one or more predetermined parameters, prior to automatically querying the at least one source, identifying one or more attributes not identified by the intent analysis system from the user input, and automatically querying the at least one source based on at least the one or more additional attributes, and further matching the user input to one or more predetermined questions, when the identified intent includes a predefined type, and determining the query results based on one or more predetermined answers to the one or more predetermined questions.

17. The method according to claim 15, wherein the querying process further includes:

communicating, by the conversational query platform, with a live agent server associated with a live agent to initiate hand-off to the live agent, directing communication between the live agent server and the client device via the interface window, and displaying, on the interface window, a live chat between the live agent associated with the live agent server and the client device.

18. The method according to claim 13, the method further comprising automatically overlaying, by the chat bot, the interface window on a further website when the client device navigates from the website to the further website via the web client.

19. A computer readable medium comprising non-transitory memory storing computer-readable instructions, that, when executed by a processor, causes the processor to perform a method comprising:

generating an interface window such that the interface window is overlaid on a website displayed on a graphical user interface of a client device associated with a user, via communication of a web client of the client device with the processor over at least one network, the website associated with the processor;

generating an automated conversational dialog with the user via the interface window displayed on the client device, via a machine learning algorithm, the automated conversational dialog including a prompt for user input based on at least a current action of the user on at least one of the interface window and the website;

receiving, by the processor, via the interface window, user input from the client device responsive to the prompt in the automated conversational dialog;

identifying an intent from the user input received from the client device;

automatically querying at least one source among one or more content sources and obtaining one or more query results, based on the identified intent; and displaying, on the client device, via the interface window, at least a portion of the one or more query results as part of the automated conversational dialog, wherein the website includes at least a first website and a second website that is unconnected to the first website, the computer-readable instructions further causing the processor to position the interface window over a portion of each of the first website and the second website when a web browser displays a current website among the first website and the second website, such that a same interface window is overlaid on each of the first website and the second website and displays the query results from among the one or more content sources regardless of the currently displayed website.

* * * * *